US012434474B2

(12) United States Patent
Yanagihara

(10) Patent No.: US 12,434,474 B2
(45) Date of Patent: Oct. 7, 2025

(54) DRIVE UNIT, LIQUID EJECTING HEAD UNIT, AND LIQUID EJECTING APPARATUS

(71) Applicant: SEIKO EPSON CORPORATION, Tokyo (JP)

(72) Inventor: Hirokazu Yanagihara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 160 days.

(21) Appl. No.: 18/476,404

(22) Filed: Sep. 28, 2023

(65) Prior Publication Data

US 2024/0109309 A1 Apr. 4, 2024

(30) Foreign Application Priority Data

Sep. 30, 2022 (JP) ................................ 2022-157653

(51) Int. Cl.
*B41J 2/045* (2006.01)
*B41J 2/515* (2006.01)
*B41J 29/377* (2006.01)

(52) U.S. Cl.
CPC ....... *B41J 2/04581* (2013.01); *B41J 2/04515* (2013.01); *B41J 2/0454* (2013.01); *B41J 2/515* (2013.01); *B41J 29/377* (2013.01)

(58) Field of Classification Search
CPC ............................ B41J 2/04515; B41J 29/377
See application file for complete search history.

(56) References Cited

U.S. PATENT DOCUMENTS

| | | | | |
|---|---|---|---|---|
| 11,186,083 B2 | 11/2021 | Kondo | | |
| 2009/0038563 A1* | 2/2009 | Takarai | .................. | F01P 7/164<br>123/41.02 |
| 2019/0315138 A1* | 10/2019 | Iijima | .................... | B41J 2/0458 |
| 2021/0260899 A1* | 8/2021 | Tobita | ..................... | H01L 23/42 |

FOREIGN PATENT DOCUMENTS

| | | |
|---|---|---|
| JP | 2020-138356 A | 9/2020 |

* cited by examiner

*Primary Examiner* — Scott A Richmond
(74) *Attorney, Agent, or Firm* — Global IP Counselors, LLP

(57) ABSTRACT

A drive unit is configured to generate a drive signal for driving a liquid ejecting head unit. The drive unit includes a drive board on which a drive circuit configured to generate the drive signal is mounted; a thermal conductive material that is in contact with the drive circuit on an opposite side in relation to the drive board; a water cooling mechanism that is in contact with the thermal conductive material on an opposite side in relation to the drive circuit; a pump that causes liquid in the water cooling mechanism to flow; and a control circuit that controls operation of the pump. The control circuit switches a direction in which the pump causes the liquid to flow between a forward direction and a reverse direction that is an opposite of the forward direction.

6 Claims, 25 Drawing Sheets

| [SIH, SIL] | [1, 1] LD | [1, 0] SD | [0, 1] ND | [0, 0] BSD |
|---|---|---|---|---|
| S1 | H | L | L | L |
| S2 | L | H | L | L |
| S3 | L | L | L | H |

DRIVE UNIT, LIQUID EJECTING HEAD UNIT, AND LIQUID EJECTING APPARATUS

The present application is based on, and claims priority from JP Application Serial Number 2022-157653, filed Sep. 30, 2022, the disclosure of which is hereby incorporated by reference herein in its entirety.

BACKGROUND

1. Technical Field

Embodiments of the present disclosure relate to a drive unit, a liquid ejecting head unit, and a liquid ejecting apparatus.

2. Related Art

For high-speed printing, there exists a line head print technique with an array of heads in a sheet width direction. In order to form an image with high definition in line head printing, it is necessary to increase nozzle density in a sheet width direction. For this purpose, in a line head disclosed in JP-A-2020-138356, heads are arranged densely in a sheet width direction.

Moreover, in order to form an image with high definition, high ejection stability is required. In a line head for high-speed printing, in general, apparatus size tends to be large, a distance from a drive circuit configured to send a signal that is the basis of image data to a head tends to be long, an influence of inductance due to wiring tends to increase, which might result in a decrease in ejection stability. Therefore, in a line head for high-speed printing such as one disclosed in JP-A-2020-138356, in general, a drive circuit is disposed just above a head.

Cooling a drive unit efficiently is demanded.

SUMMARY

A drive unit according to a certain aspect of the present disclosure is a drive unit configured to generate a drive signal for driving a liquid ejecting head unit. The drive unit includes: a drive board on which a drive circuit configured to generate the drive signal is mounted; a thermal conductive material that is in contact with the drive circuit on an opposite side in relation to the drive board; a water cooling mechanism that is in contact with the thermal conductive material on an opposite side in relation to the drive circuit; a pump that causes liquid in the water cooling mechanism to flow; and a control circuit that controls operation of the pump, wherein the control circuit switches a direction in which the pump causes the liquid to flow between a forward direction and a reverse direction that is an opposite of the forward direction.

A liquid ejecting head unit according to a certain aspect of the present disclosure includes: a drive unit configured to generate a drive signal for driving the liquid ejecting head unit; and a head, the head including an ejecting orifice that, upon receiving a drive signal supplied from the drive unit, ejects liquid from a nozzle provided in a nozzle surface, and a collective board that includes a head connector, the drive unit including a drive board on which a drive circuit configured to generate the drive signal is mounted; a thermal conductive material that is in contact with the drive circuit on an opposite side in relation to the drive board; a water cooling mechanism that is in contact with the thermal conductive material on an opposite side in relation to the drive circuit; a pump that causes liquid in the water cooling mechanism to flow; and a control circuit that controls operation of the pump, wherein the control circuit switches a direction in which the pump causes the liquid to flow between a forward direction and a reverse direction that is an opposite of the forward direction.

A liquid ejecting apparatus according to a certain aspect of the present disclosure includes: a plurality of sets each including a plurality of liquid ejecting head units and a transportation unit, the liquid ejecting head unit including a drive unit and a head, the drive unit being configured to generate a drive signal for driving the liquid ejecting head unit, the head including an ejecting orifice that, upon receiving a drive signal supplied from the drive unit, ejects liquid from a nozzle provided in a nozzle surface, and a collective board that includes a head connector, the drive unit including a drive board on which a drive circuit configured to generate the drive signal is mounted; a thermal conductive material that is in contact with the drive circuit on an opposite side in relation to the drive board; a water cooling mechanism that is in contact with the thermal conductive material on an opposite side in relation to the drive circuit; a pump that causes liquid in the water cooling mechanism to flow; and a control circuit that controls operation of the pump, wherein the control circuit switches a direction in which the pump causes the liquid to flow between a forward direction and a reverse direction that is an opposite of the forward direction.

DESCRIPTION OF EMBODIMENTS

With reference to the accompanying drawings, some non-limiting preferred embodiments of the present disclosure will now be described. The drawings will be referred to in order to facilitate an explanation. The specific embodiments described below shall never be construed to unduly limit the scope of the present disclosure recited in the appended claims. Not all of components described below necessarily constitute indispensable parts of the present disclosure.

1. First Embodiment

1.1 Configuration of Liquid Ejecting Apparatus

Figure 1:
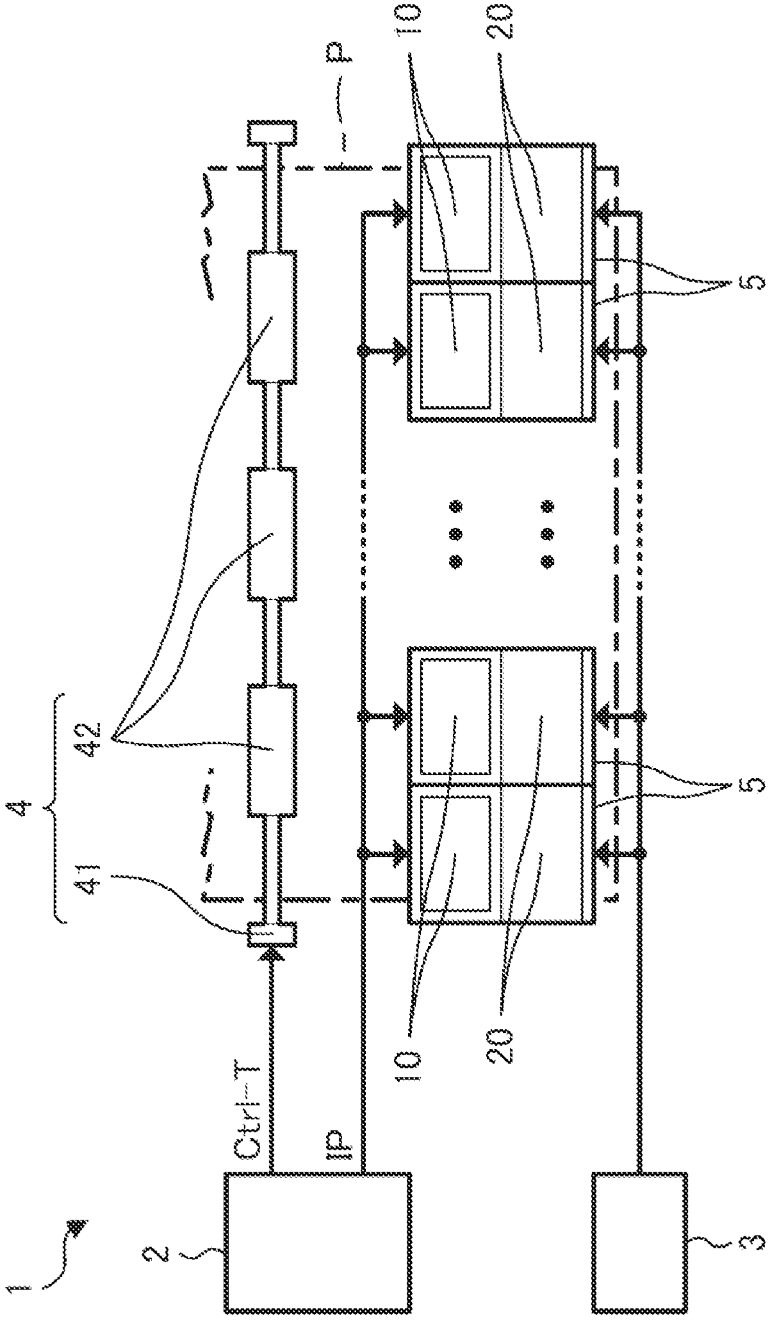
FIG. 1 is a diagram that illustrates a schematic configuration of a liquid ejecting apparatus.

FIG. 1 is a diagram that illustrates a schematic configuration of a liquid ejecting apparatus 1. As illustrated in FIG. 1, the liquid ejecting apparatus 1 is a so-called line-type ink-jet printer that forms a desired image on a medium P by ejecting ink, which is an example of liquid, at a desired timing onto the medium P transported by a transportation unit 4. In the description below, the direction in which the medium P is transported may sometimes be referred to as "transportation direction", and the direction of the width of the medium P that is transported may sometimes be referred to as "main scanning direction".

As illustrated in FIG. 1, the liquid ejecting apparatus 1 includes a control unit 2, a liquid container 3, the transportation unit 4, and a plurality of ejecting units 5.

The control unit 2 includes a processing circuit such as a central processing unit (CPU) or a field programmable gate array (FPGA) and a storage circuit such as a semiconductor memory. Based on image data supplied from a non-Illustrated external device such as a host computer provided outside the liquid ejecting apparatus 1, the control unit 2 outputs signals for controlling the components of the liquid ejecting apparatus 1.

One or more types of liquid to be supplied to the ejecting units 5 are contained in the liquid container 3. Specifically, ink of a plurality of colors to be ejected onto the medium P, for example, ink of black, cyan, magenta, yellow, red, gray, etc., is contained in the liquid container 3. Of course, black ink only may be contained, or liquid other than ink may be contained.

The transportation unit 4 includes a transportation motor 41 and a transportation roller 42. A transportation control signal Ctrl-T outputted by the control unit 2 is inputted to the transportation unit 4. Then, based on the inputted transportation control signal Ctrl-T, the transportation motor 41 operates, and the transportation roller 42 is driven to rotate by the operation of the transportation motor 41, thereby transporting the medium P in the transportation direction.

Each of the plurality of ejecting units 5 includes a head driving module 10 and a liquid ejecting module 20. To the ejecting unit 5, an image information signal IP outputted by the control unit 2 is inputted, and ink contained in the liquid container 3 is supplied. Then, based on the image information signal IP inputted from the control unit 2, the head driving module 10 controls the operation of the liquid ejecting module 20, and the liquid ejecting module 20 ejects the ink supplied from the liquid container 3 onto the medium P in accordance with the control by the head driving module 10.

The liquid ejecting modules 20 included in the plurality of ejecting units 5 respectively are arranged along the main scanning direction in a row that is not less in length than the width of the medium P such that ink can be ejected onto the entire area in the direction of the width of the medium P that is transported. With this configuration, the liquid ejecting apparatus 1 operates as a line-type ink-jet printer. The liquid ejecting apparatus 1 is not limited to a line-type ink-jet printer.

Figure 2:
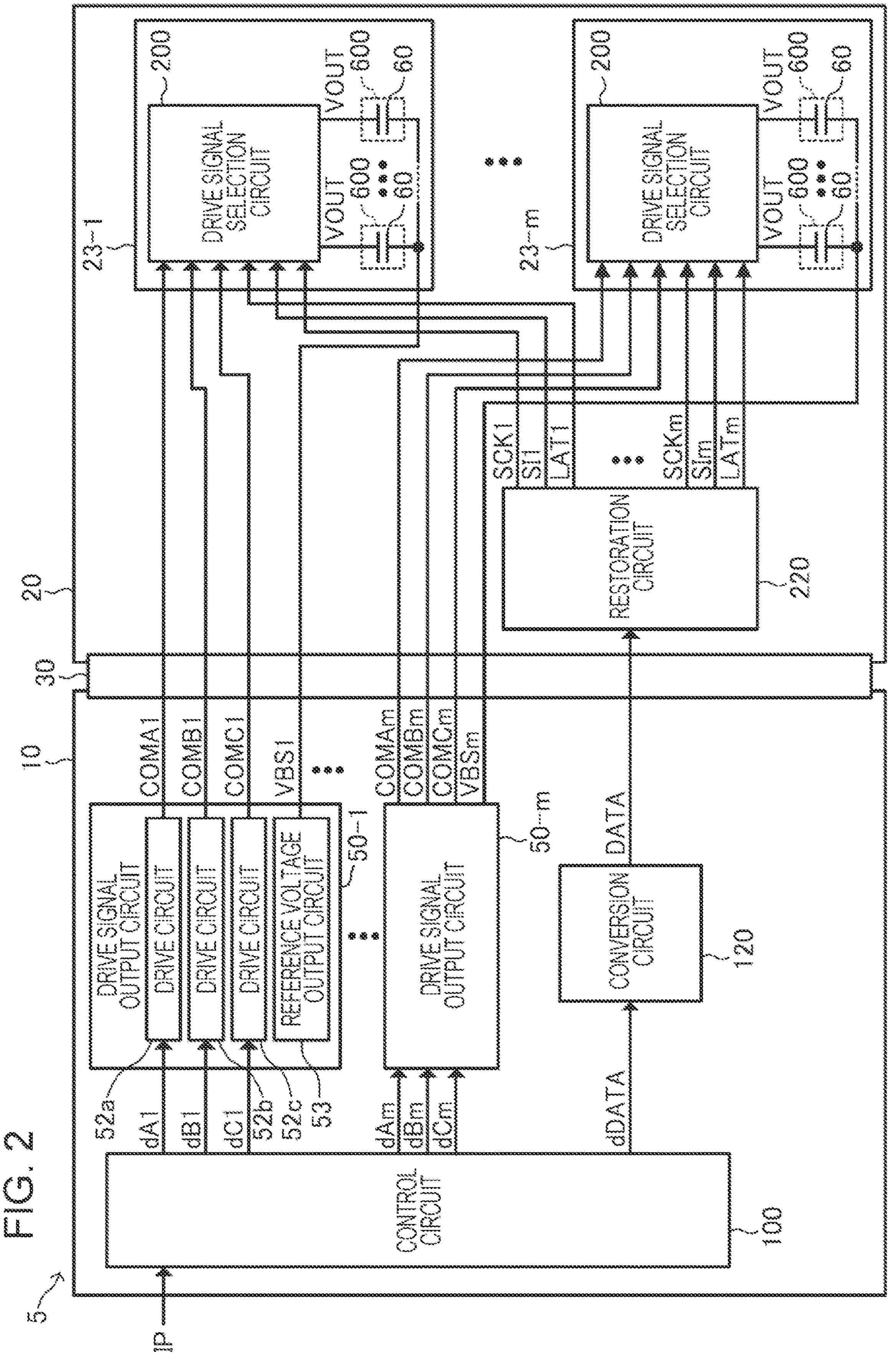
FIG. 2 is a diagram that illustrates a schematic configuration of an ejecting unit.

Next, a schematic configuration of the ejecting unit 5 will now be explained. FIG. 2 is a diagram that illustrates a schematic configuration of the ejecting unit 5. As illustrated in FIG. 2, the ejecting unit 5 includes the head driving module 10 and the liquid ejecting module 20. In the ejecting unit 5, the head driving module 10 and the liquid ejecting module 20 are electrically coupled to each other via one or more wiring members 30.

The wiring member 30 is a flexible member for electric coupling between the head driving module 10 and the liquid ejecting module 20, for example, a flexible printed circuit (FPC).

The head driving module 10 includes a control circuit 100, drive signal output circuits 50-1 to 50-*m*, and a conversion circuit 120.

The control circuit 100 includes a CPU, an FPGA, etc. The image information signal IP outputted by the control unit 2 is inputted to the control circuit 100. Based on the inputted image information signal IP, the control circuit 100 outputs signals for controlling the components of the ejecting unit 5.

Based on the image information signal IP, the control circuit 100 generates a base data signal dDATA for controlling the operation of the liquid ejecting module 20 and outputs it to the conversion circuit 120. The conversion circuit 120 converts the base data signal dDATA into a differential signal such as LVDS (Low Voltage Differential Signaling) and outputs it as a data signal DATA to the liquid ejecting module 20. The conversion circuit 120 may convert the base data signal dDATA into a differential signal of a high-speed transfer scheme other than LVDS such as LVPECL (Low Voltage Positive Emitter Coupled Logic) or CML (Current Mode Logic) and output it as the data signal DATA to the liquid ejecting module 20 or output a part or a whole of the base data signal dDATA as a single-end data signal DATA to the liquid ejecting module 20.

The control circuit 100 outputs base drive signals dA1, dB1, and dC1 to the drive signal output circuit 50-1. The drive signal output circuit 50-1 includes drive circuits 52*a*, 52*b*, and 52*c*. The base drive signal dA1 is inputted to the drive circuit 52*a*. After digital/analog conversion of the inputted base drive signal dA1, the drive circuit 52*a* performs class-D amplification to generate a drive signal COMA1 and outputs it to the liquid ejecting module 20. The base drive signal dB1 is inputted to the drive circuit 52*b*. After digital/analog conversion of the inputted base drive signal dB1, the drive circuit 52*b* performs class-D amplification to generate a drive signal COMB1 and outputs it to the liquid ejecting module 20. The base drive signal dC1 is inputted to the drive circuit 52*c*. After digital/analog conversion of the inputted base drive signal dC1, the drive circuit 52*c* performs class-D amplification to generate a drive signal COMC1 and outputs it to the liquid ejecting module 20.

It is sufficient as long as the drive circuits 52*a*, 52*b*, and 52*c* are capable of generating the drive signals COMA1, COMB1, and COMC1 respectively by amplifying the waveforms specified by the inputted base drive signals dA1, dB1, and dC1 respectively; each of these drive circuits may include a class-A amplification circuit, a class-B amplification circuit, or a class-AB amplification circuit, etc. in place of the class-D amplification circuit or in addition to the class-D amplification circuit. It is sufficient as long as each of the base drive signals dA1, dB1, and dC1 is capable of specifying the waveform of the corresponding one of the drive signals COMA1, COMB1, and COMC1 and may be an analog signal.

The drive signal output circuit 50-1 includes a reference voltage output circuit 53. The reference voltage output circuit 53 generates a reference voltage signal VBS1 of a certain constant potential indicating the reference potential of a piezoelectric element 60, which will be described later, of the liquid ejecting module 20 and outputs it to the liquid ejecting module 20. The reference voltage signal VBS1 may have, for example, a ground potential, or a certain fixed potential such as 5.5 V or 6 V. The meaning of the term "a certain fixed potential" encompasses cases where the potential is regarded as being at a substantially fixed level when the following fluctuations are taken into consideration: fluctuations in potential arising from the operation of peripheral circuits, fluctuations in potential arising from variations among circuit elements, and fluctuations caused by errors such as fluctuations in potential arising from circuit-element temperature characteristics.

The configuration of the drive signal output circuits 50-2 to 50-*m* is the same as that of the drive signal output circuit 50-1, except for a difference in an input signal and an output signal. That is, a drive signal output circuit 50-*j* (where j is any of 1 to m) includes circuits corresponding to the drive circuits 52*a*, 52*b*, and 52*c* and a circuit corresponding to the reference voltage output circuit 53, generates drive signals COMAj, COMBj, and COMCj and a reference voltage signal VBSj based on base drive signals dAj, dBj, and dCj inputted from the control circuit 100, and outputs them to the liquid ejecting module 20.

In the description below, since the drive circuit 52*a*, 52*b*, 52*c* included in the drive signal output circuit 50-1 and the drive circuit 52*a*, 52*b*, 52*c* included in the drive signal output circuit 50-*j* have the same configuration, a term "drive circuit 52" may be simply used when there is no need to distinguish them from each other. In this case, based on a base drive signal do, the drive circuit 52 generates and outputs a drive signal COM. On the other hand, when the drive circuit 52*a*, 52*b*, 52*c* included in the drive signal output circuit 50-1 needs to be distinguished from the drive circuit 52*a*, 52*b*, 52*c* included in the drive signal output circuit 50-*j*, the drive circuit 52*a*, 52*b*, 52*c* included in the drive signal output circuit 50-1 may be referred to as drive circuit 52*a*1, 52*b*1, 52*c*1, and the drive circuit 52*a*, 52*b*, 52*c* included in the drive signal output circuit 50-*j* may be referred to as drive circuit 52*aj*, 52*bj*, 52*cj*.

The liquid ejecting module 20 includes a restoration circuit 220 and ejecting modules 23-1 to 23-*m*.

The restoration circuit 220 restores the data signal DATA into a single-end signal and separates it into signals corresponding respectively to the ejecting modules 23-1 to 23-*m*, and then outputs each of these signals to the corresponding one of the ejecting modules 23-1 to 23-*m*.

Specifically, the restoration circuit 220 generates a clock signal SCK1, a print data signal SI1, and a latch signal LAT1, which correspond to the ejecting module 23-1, by performing restoration and separation of the data signal DATA, and outputs them to the ejecting module 23-1. Moreover, the restoration circuit 220 generates a clock signal SCKj, a print data signal SIj, and a latch signal LATj, which correspond to the ejecting module 23-*j*, by performing restoration and separation of the data signal DATA, and outputs them to the ejecting module 23-*j*.

As has been described above, the restoration circuit 220 restores the data signal DATA of the differential signal outputted by the head driving module 10 and separates the restored signal into signals corresponding respectively to the ejecting modules 23-1 to 23-*m*. Through this processing, the restoration circuit 220 generates clock signals SCK1 to SCKm, print data signals SI1 to SIm, and latch signals LAT1 to LATm, which correspond respectively to the ejecting modules 23-1 to 23-*m*, and outputs them to the ejecting modules 23-1 to 23-*m* corresponding thereto. Any of the clock signals SCK1 to SCKm, the print data signals SI1 to SIm, and the latch signals LAT1 to LATm outputted by the restoration circuit 220 and corresponding respectively to the ejecting modules 23-1 to 23-*m* may be a signal that is common to the ejecting modules 23-1 to 23-*m.*

Considering that the restoration circuit 220 generates the clock signals SCK1 to SCKm, the print data signals SI1 to SIm, and the latch signals LAT1 to LATm by performing restoration and separation of the data signal DATA, the data signal DATA outputted by the control circuit 100 is a differential signal corresponding to the clock signals SCK1 to SCKm, the print data signals SI1 to SIm, and the latch signals LAT1 to LATm, and the base data signal dDATA, which is the source of the data signal DATA, includes a signal corresponding to each of the clock signals SCK1 to SCKm, the print data signals SI1 to SIm, and the latch signals LAT1 to LATm. That is, the base data signal dDATA includes a signal for controlling the operation of the ejecting modules 23-1 to 23-*m* of the liquid ejecting module 20.

The ejecting module 23-1 includes a drive signal selection circuit 200 and a plurality of ejecting portions 600. Each of the plurality of ejecting portions 600 includes a piezoelectric element 60.

The drive signals COMA1, COMB1, and COMC1, the reference voltage signal VBS1, the clock signal SCK1, the print data signal SI1, and the latch signal LAT1 are inputted to the ejecting module 23-1. The drive signals COMA1, COMB1, and COMC1, the clock signal SCK1, the print data signal SI1, and the latch signal LAT1 are inputted to the drive signal selection circuit 200 of the ejecting module 23-1. Based on the input of the clock signal SCK1, the print data signal SI1, and the latch signal LAT1, the drive signal selection circuit 200 generates a drive signal VOUT by putting each of the drive signals COMM. COMB1, and COMC1 into a selected or non-selected state, and supplies it to one end of the piezoelectric element 60 of the ejecting portion 600 corresponding thereto. At this time, the reference voltage signal VBS1 is supplied to the opposite end of the piezoelectric element 60. The piezoelectric element 60 is driven due to the potential difference between the drive signal VOUT supplied to the one end and the reference voltage signal VBS1 supplied to the opposite end, and, as a result, ink is ejected from the ejecting portion 600 corresponding thereto.

Similarly, the ejecting module 23-*j* includes a drive signal selection circuit 200 and a plurality of ejecting portions 600. Each of the plurality of ejecting portions 600 includes a piezoelectric element 60.

The drive signals COMAj, COMBj, and COMCj, the reference voltage signal VBSj, the clock signal SCKj, the print data signal SIj, and the latch signal LATj are inputted to the ejecting module 23-*j*. The drive signals COMAj, COMBj, and COMCj, the clock signal SCKj, the print data signal SIj, and the latch signal LATj are inputted to the drive signal selection circuit 200 of the ejecting module 23-*j*. Based on the input of the clock signal SCKj, the print data signal SIj, and the latch signal LATj, the drive signal selection circuit 200 generates a drive signal VOUT by putting each of the drive signals COMAj, COMBj, and COMCj into a selected or non-selected state, and supplies it to one end of the piezoelectric element 60 of the ejecting portion 600 corresponding thereto. At this time, the reference voltage signal VBSj is supplied to the opposite end of the piezoelectric element 60. The piezoelectric element 60 is driven due to the potential difference between the drive signal VOUT supplied to the one end and the reference voltage signal VBSj supplied to the opposite end, and, as a result, ink is ejected from the ejecting portion 600 corresponding thereto.

In the liquid ejecting apparatus 1 according to the first embodiment having the above configuration, based on image data supplied from the non-Illustrated host computer or the like, the control unit 2 controls the transportation of the medium P by the transportation unit 4 and controls the ejection of ink from the liquid ejecting module 20 of the ejecting unit 5. By this means, the liquid ejecting apparatus 1 is capable of letting a desired amount of ink droplet land onto the medium P at a desired position, thereby forming a desired image on the medium P.

The ejecting modules 23-1 to 23-*m* of the liquid ejecting module 20 have the same configuration, except that an input signal differs. Therefore, a term "ejecting module 23" may be simply used in the description below when there is no need to distinguish the ejecting modules 23-1 to 23-*m* from one another. Moreover, in this case, the drive signals COMA1 to COMAm inputted to the ejecting module 23 may be referred to as "drive signal COMA", the drive signals COMB1 to COMBm may be referred to as "drive signal COMB", the drive signals COMC1 to COMCm may be referred to as "drive signal COMC", the reference voltage signals VBS1 to VBSm may be referred to as "reference voltage signal VBS", the clock signals SCK1 to SCKm may be referred to as "clock signal SCK", the print data signals SI1 to Sim may be referred to as "print data signal SI", and the latch signals LAT1 to LATm may be referred to as "latch signal LAT".

That is, the drive signals COMA, COMB, and COMC, the reference voltage signal VBS, the clock signal SCK, the print data signal SI, and the latch signal LAT are inputted to the ejecting module 23. The drive signals COMA, COMB, and COMC, the clock signal SCK, the print data signal SI, and the latch signal LAT are inputted to the drive signal selection circuit 200 of the ejecting module 23. Based on the input of the clock signal SCK, the print data signal SI, and the latch signal LAT, the drive signal selection circuit 200 generates a drive signal VOUT by putting each of the drive signals COMA, COMB, and COMC into a selected or non-selected state, and supplies it to one end of the piezoelectric element 60 of the ejecting portion 600 corresponding thereto. At this time, the reference voltage signal VBS is supplied to the opposite end of the piezoelectric element 60. The piezoelectric element 60 is driven due to the potential difference between the drive signal VOUT supplied to the one end and the reference voltage signal VBS supplied to the opposite end, and, as a result, ink is ejected from the ejecting portion 600 corresponding thereto.

As has been described above, the liquid ejecting apparatus 1 according to the present embodiment includes the liquid ejecting module 20 that includes the ejecting module 23 that ejects ink in accordance with driving of the piezoelectric element 60, the head driving module 10 that includes the drive signal output circuits 50-1 to 50-*m* that output the drive signals COMA, COMB, and COMC, and the wiring member 30 one end of which is electrically coupled to the head driving module 10 and the opposite end of which is electrically coupled to the liquid ejecting module 20. The piezoelectric element 60 is an example of a drive element. The ejecting module 23 that ejects ink in accordance with driving of the piezoelectric element 60, or the liquid ejecting module 20 that includes the ejecting module 23, is an example of an ejecting head. Any of the drive signal output circuits 50-1 to 50-*m* that output the drive signals COMA, COMB, and COMC, or the head driving module 10 that includes the drive signal output circuits 50-1 to 50-*m*, is an example of a head driving circuit.

1.2 Functional Configuration of Drive Signal Selection Circuit

Next, the configuration and operation of the drive signal selection circuit 200 of the ejecting module 23 will now be described. Prior to describing the configuration and operation of the drive signal selection circuit 200 of the ejecting module 23, an example of signal waveforms included in the drive signals COMA, COMB, and COMC inputted to the drive signal selection circuit 200 will now be described first.

Figure 3:
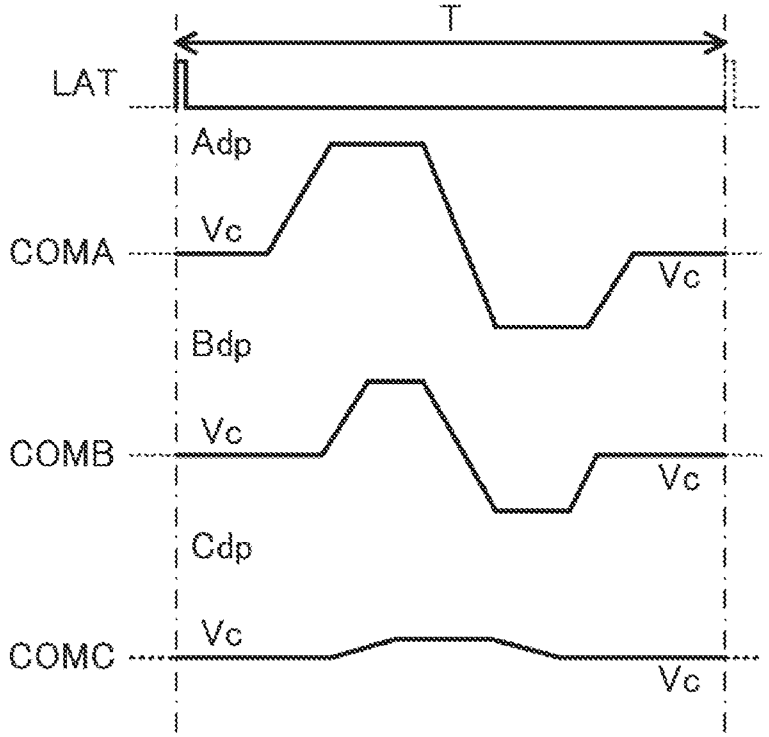
FIG. 3 is a diagram that illustrates an example of signal waveforms included in drive signals COMA, COMB, and COMC.

FIG. 3 is a diagram that illustrates an example of signal waveforms included in the drive signals COMA, COMB, and COMC. As illustrated in FIG. 3, the drive signal COMA includes a trapezoidal waveform Adp arranged within a cycle T that is from a rising of the latch signal LAT to the next rising of the latch signal LAT. The trapezoidal waveform Adp is a signal waveform for, by being supplied to one end of the piezoelectric element 60, ejecting a predetermined amount of ink from the ejecting portion 600 corresponding to this piezoelectric element 60. The drive signal COMB includes a trapezoidal waveform Bdp arranged within the cycle T. The trapezoidal waveform Bdp is a signal waveform the voltage amplitude of which is less than that of the trapezoidal waveform Adp and which is used for, by being supplied to one end of the piezoelectric element 60, ejecting ink the amount of which is smaller than the predetermined amount from the ejecting portion 600 corresponding to this piezoelectric element 60. The drive signal COMC includes a trapezoidal waveform Cdp arranged within the cycle T. The trapezoidal waveform Cdp is a signal waveform the voltage amplitude of which is less than that of the trapezoidal waveform Adp, Bdp and which is used for, by being supplied to one end of the piezoelectric element 60, causing ink vibration in the neighborhood of a nozzle orifice to an extent that no ink is ejected from the ejecting portion 600 corresponding to this piezoelectric element 60. By being supplied to the piezoelectric element 60, the trapezoidal waveform Cdp causes ink vibration in the neighborhood of the nozzle orifice of the ejecting portion 600 including this piezoelectric element 60. This reduces the risk that the viscosity of the ink in the neighborhood of the nozzle orifice will increase.

That is, the drive signal COMA is a signal for driving the piezoelectric element 60 such that ink will be ejected, the drive signal COMB is a signal for driving the piezoelectric element 60 such that ink will be ejected, and the drive signal COMC is a signal for driving the piezoelectric element 60 such that ink will not be ejected. The amount of ink ejected from the liquid ejecting module 20 including the ejecting module 23 when the drive signal COMA described above is supplied to the piezoelectric element 60 is different from the amount of ink ejected from the liquid ejecting module 20 including the ejecting module 23 when the drive signal COMB described above is supplied to the piezoelectric element 60.

At the timing of the start and the timing of the end of each of the trapezoidal waveforms Adp, Bdp, and Cdp, the voltage value of all of the trapezoidal waveforms Adp, Bdp, and Cdp is Vc, meaning a common voltage level. That is, each of the trapezoidal waveforms Adp, Bdp, and Cdp is a signal waveform starting at the voltage level Vc and ending at the voltage level Vc.

In the description below, the amount of ink that is ejected from the ejecting portion 600 corresponding to the piezoelectric element 60 when the trapezoidal waveform Adp is supplied to the one end of the piezoelectric element 60 may sometimes be referred to as a relatively large amount, and the amount of ink that is ejected from the ejecting portion 600 corresponding to the piezoelectric element 60 when the trapezoidal waveform Bdp is supplied to the one end of the piezoelectric element 60 may sometimes be referred to as a relatively small amount. Ink vibration caused in the neighborhood of the nozzle orifice to an extent that no ink is ejected from the ejecting portion 600 corresponding to the piezoelectric element 60 when the trapezoidal waveform Cdp is supplied to the one end of this piezoelectric element 60 may sometimes be referred to as slight vibration.

In FIG. 3, a case where each of the drive signals COMA, COMB, and COMC includes one trapezoidal waveform within the cycle T is illustrated; however, each of the drive signals COMA, COMB, and COMC may include two or more successive trapezoidal waveforms within the cycle T. In this case, a signal that specifies the timing of switching between the two or more trapezoidal waveforms is inputted to the drive signal selection circuit 200, and the ejecting portion 600 ejects ink more than once within the cycle T. Then, ink ejected more than once within the cycle T lands onto the medium P and merges, thereby forming a single dot on the medium P. This makes it possible to increase the number of tones of a dot formed on the medium P.

In the liquid ejecting apparatus 1 according to the first embodiment, however, it is assumed that each of the drive signals COMA, COMB, and COMC is a signal that includes one trapezoidal waveform within the cycle T. This makes it possible to make the cycle T of forming a dot on the medium P shorter and thus realize high-speed image forming on the medium P and, in addition, realize an increase in the number of tones of a dot formed on the medium P by supplying the drive signals COMA, COMB, and COMC to the liquid ejecting module 20 in parallel. The cycle T that is from a rising of the latch signal LAT to the next rising of the latch signal LAT may sometimes be referred to as a dot forming cycle of forming a dot of a desired size on the medium P.

The signal waveforms included in the drive signals COMA, COMB, and COMC are not limited to the signal waveforms illustrated as an example in FIG. 3; various signal waveforms may be used depending on the type of ink ejected from the ejecting portion 600, the number of the piezoelectric elements 60 driven by the drive signals COMA, COMB, and COMC, the length of wiring via which the drive signals COMA, COMB, and COMC propagate, or the like. That is, the drive signals COMA1 to COMAm illustrated in FIG. 2 may include signal waveforms different from one another. Similarly, the drive signals COMB1 to COMBm may include signal waveforms different from one another, and the drive signals COMC1 to COMCm may include signal waveforms different from one another.

Figure 4:
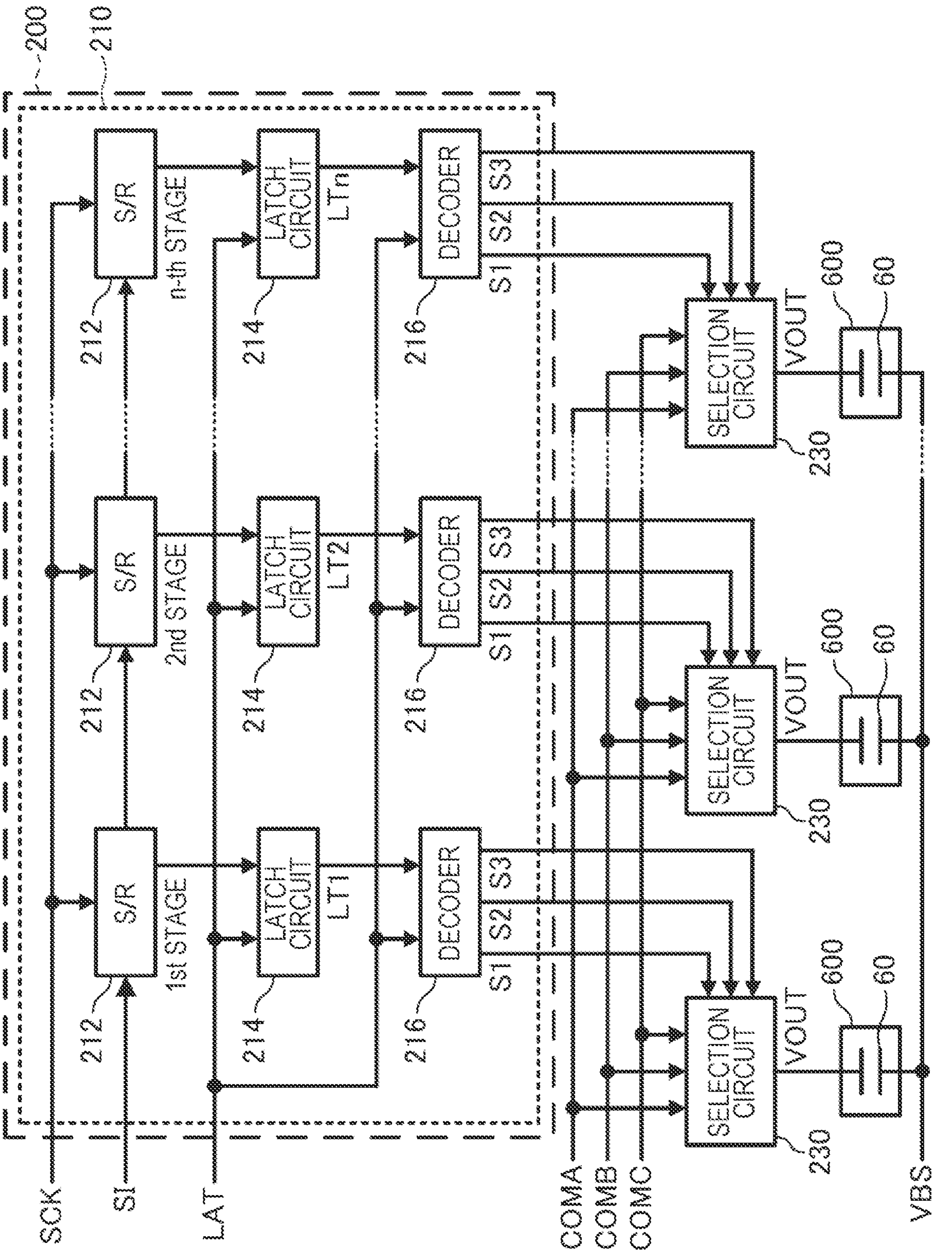
FIG. 4 is a diagram that illustrates a functional configuration of a drive signal selection circuit.

Next, the configuration and operation of the drive signal selection circuit 200 that outputs a drive signal VOUT by putting each of the drive signals COMA, COMB, and COMC into a selected or non-selected state will now be described. FIG. 4 is a diagram that illustrates a functional configuration of the drive signal selection circuit 200. As illustrated in FIG. 4, the drive signal selection circuit 200 includes a selection control circuit 210 and a plurality of selection circuits 230.

The print data signal SI, the latch signal LAT, and the clock signal SCK are inputted to the selection control circuit 210. The selection control circuit 210 includes, correspondingly for each of the plurality of ejecting portions 600, the number of which is n, a group made up of a shift register (S/R) 212, a latch circuit 214, and a decoder 216. That is, the drive signal selection circuit 200 includes the shift registers 212 the number of which is n, the latch circuits 214 the number of which is n, and the decoders 216 the number of which is n, where n is the same as the total number of the ejecting portions 600.

The print data signal SI is a signal that is in sync with the clock signal SCK and contains 2-bit print data [SIH, SIL] for specifying the size of a dot that is formed using ink ejected from each of the n ejecting portions 600 as any one of "large dot LD", "small dot SD", "not ejected ND", and "slight vibration BSD". The print data signal SI is stored into the shift register 212 corresponding to the ejecting portion 600 for each 2-bit print data [SIH, SIL].

Specifically, the n shift registers 212 corresponding to the ejecting portions 600 are connected in cascade to one another. The print data signal SI inputted serially is transferred sequentially from one to the next one of the shift registers 212 connected in cascade in accordance with the clock signal SCK. Then, upon the stopping of the supply of the clock signal SCK, 2-bit print data [SIH, SIL] corresponding to the ejecting portion 600 corresponding to the shift register 212 is stored into each of the n shift registers 212. In FIG. 4, for the purpose of distinguishing the n shift registers 212 connected in cascade from one another, they are sequentially labeled with the first stage, the second stage, . . . , the n-th stage from the upstream side toward the downstream side in the sequential flow of the input of the print data signal SI.

At the rising of the latch signal LAT, the n latch circuits 214 latch the 2-bit print data [SIH, SIL] stored in the shift registers 212 corresponding thereto all at once.

Figures 5, 6:
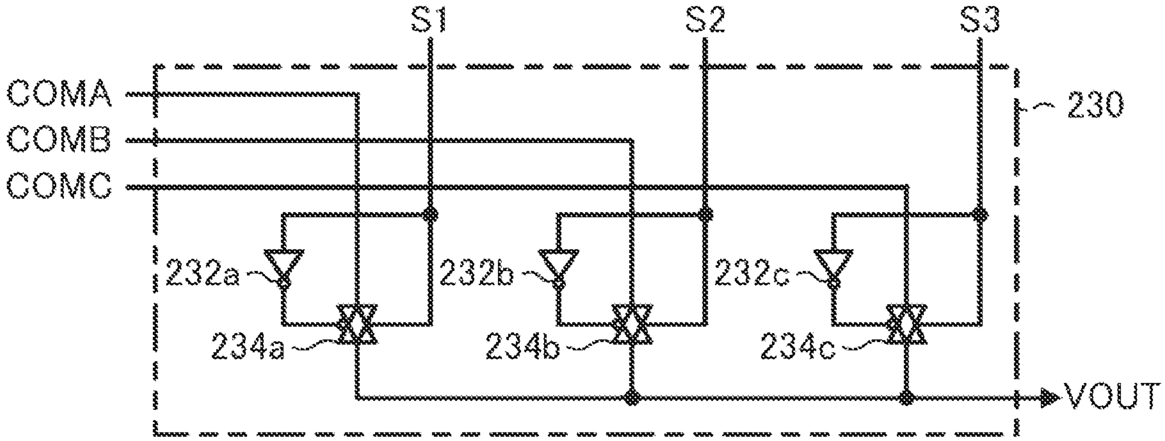
FIG. 5 is a table that shows an example of the content of decoding by a decoder.
FIG. 6 is a diagram that illustrates an example of a configuration of a selection circuit.

Each of the n decoders 216 decodes the 2-bit print data [SIH, SIL] latched by the corresponding one of the latch circuits 214 and outputs selection signals S1, S2, and S3 whose logical levels correspond to the content of decoding in each cycle T. FIG. 5 is a table that shows an example of the content of decoding by the decoder 216. The decoder 216 outputs the selection signals S1, S2, and S3 whose logical levels are specified by the latched the 2-bit print data [SIH, SIL] and by the content of decoding illustrated in FIG. 5. For example, when the 2-bit print data [SIH, SIL] latched by the corresponding one of the latch circuits 214 is [1, 0], the decoder 216 according to the first embodiment specifies the respective logical levels of the selection signals S1, S2, and S3 as L, H, and L in the cycle T.

Each of the selection circuits 230 is provided for the corresponding one of the n ejecting portions 600. That is, the drive signal selection circuit 200 includes the n selection circuits 230. To the selection circuit 230, the selection signals S1, S2, and S3 outputted by the decoder 216 corresponding to the same ejecting portion 600 and the drive signals COMA, COMB, and COMC are inputted. Then, based on the selection signals S1, S2, and S3 and the drive signals COMA, COMB, and COMC, the selection circuit 230 generates a drive signal VOUT by putting each of the drive signals COMA1, COMB1, and COMC1 into a selected or non-selected state, and supplies it to the corresponding one of the ejecting portions 600.

FIG. 6 is a diagram that illustrates an example of a configuration of the selection circuit 230 corresponding to one of the ejecting portions 600. As illustrated in FIG. 6, the selection circuit 230 includes inverters 232*a*, 232*b*, and 232*c* and transfer gates 234*a*, 234*b*, and 234*c*.

The selection signal S1 is inputted into the positive control terminal without a circle mark of the transfer gate 234*a*, and is, on the other side, inputted into the negative control terminal with a circle mark of the transfer gate 234*a* through logical inversion by the inverter 232*a*. The drive signal COMA is supplied to the input terminal of the transfer gate 234*a*. The transfer gate 234*a* provides an electrical continuity between the input terminal and the output terminal when the selection signal S1 inputted thereto is at the H level, and provides no electrical continuity between the input terminal and the output terminal when the selection signal S1 inputted thereto is at the L level. That is, the transfer gate 234*a* outputs the drive signal COMA to the output terminal when the selection signal S1 is at the H level, and does not output the drive signal COMA to the output terminal when the selection signal S1 is at the L level.

The selection signal S2 is inputted into the positive control terminal without a circle mark of the transfer gate 234*b*, and is, on the other side, inputted into the negative control terminal with a circle mark of the transfer gate 234*b* through logical inversion by the inverter 232*b*. The drive signal COMB is supplied to the input terminal of the transfer gate 234*b*. The transfer gate 234*b* provides an electrical continuity between the input terminal and the output terminal when the selection signal S2 inputted thereto is at the H level, and provides no electrical continuity between the input terminal and the output terminal when the selection signal S2 inputted thereto is at the L level. That is, the transfer gate 234*b* outputs the drive signal COMB to the output terminal when the selection signal S2 is at the H level, and does not output the drive signal COMB to the output terminal when the selection signal S2 is at the L level.

The selection signal S3 is inputted into the positive control terminal without a circle mark of the transfer gate 234*c*, and is, on the other side, inputted into the negative control terminal with a circle mark of the transfer gate 234*c* through logical inversion by the inverter 232*c*. The drive signal COMC is supplied to the input terminal of the transfer gate 234*c*. The transfer gate 234*c* provides an electrical continuity between the input terminal and the output terminal when the selection signal S3 inputted thereto is at the H level, and provides no electrical continuity between the input terminal and the output terminal when the selection signal S3 inputted thereto is at the L level. That is, the transfer gate 234*c* outputs the drive signal COMC to the output terminal when the selection signal S3 is at the H level, and does not output the drive signal COMC to the output terminal when the selection signal S3 is at the L level.

The output terminals of the transfer gates 234*a*, 234*b*, and 234*c* are connected in a common-line-shared manner. That is, the drive signals COMA, COMB, and COMC selected or non-selected by the selection signals S1, S2, and S3 are supplied to the output terminals of the transfer gates 234*a*, 234*b*, and 234*c* that are connected in a common-line-shared manner. The selection circuit 230 outputs a signal supplied to these output terminals connected in a common-line-shared manner as the drive signal VOUT to the corresponding one of the ejecting portions 600.

Figure 7:
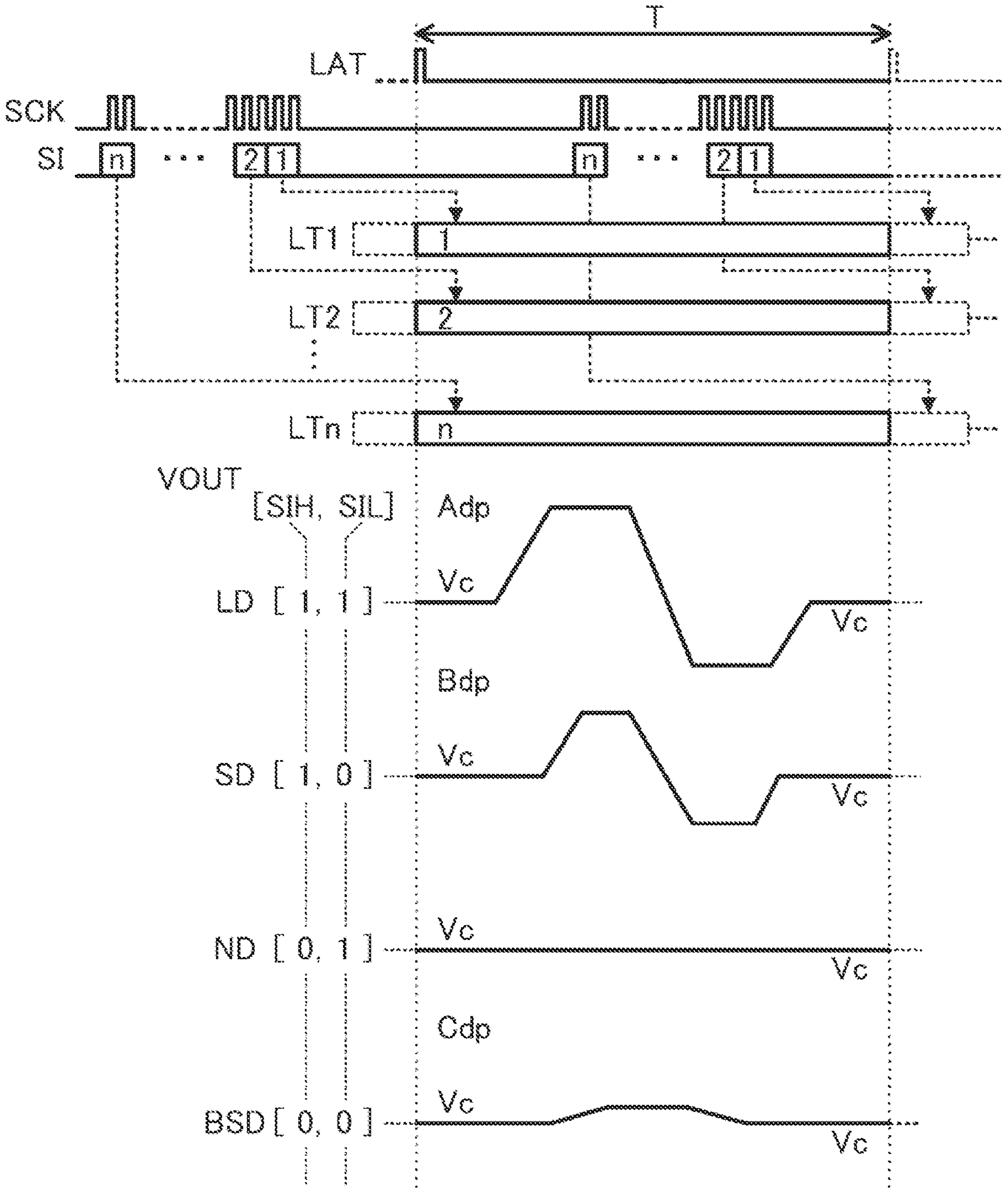
FIG. 7 is a diagram for explaining operation of the drive signal selection circuit.

The operation of the drive signal selection circuit 200 will now be described. FIG. 7 is a diagram for explaining the operation of the drive signal selection circuit 200. The print data signal SI is inputted serially in sync with the clock signal SCK and is sequentially transferred through the shift registers 212 corresponding to the ejecting portions 600. Then, upon the stopping of the input of the clock signal SCK, the pieces of 2-bit print data [SIH, SIL] corresponding respectively to the ejecting portions 600 are stored into the shift registers 212 corresponding thereto.

After that, upon the rising of the latch signal LAT, the pieces of 2-bit print data [SIH, SIL] stored in the shift registers 212 are latched by the latch circuits 212 all at once. In FIG. 7, LT1, LT2, . . . , LTn denote the pieces of 2-bit print data [SIH, SIL] latched by the latch circuits 214 and corresponding to the first stage, the second stage, . . . , the n-th stage of the shift registers 212.

The decoder 216 outputs the selection signals S1, S2, and S3 whose logical levels correspond to a dot size specified by the latched the 2-bit print data [SIH, SIL].

Specifically, when the print data [SIH, SIL] is [1, 1], the decoder 216 outputs the selection signals S1, S2, and S3 with their logical levels specified as H, L, and L to the selection circuit 230 in the cycle T. As a result, the selection circuit 230 selects the trapezoidal waveform Adp in the cycle T and outputs the drive signal VOUT corresponding to "large dot LD". When the print data [SIH, SIL] is [1, 0], the decoder 216 outputs the selection signals S1, S2, and S3 with their logical levels specified as L, H, and L to the selection circuit 230 in the cycle T. As a result, the selection circuit 230 selects the trapezoidal waveform Bdp in the cycle T and outputs the drive signal VOUT corresponding to "small dot SD". When the print data [SIH, SIL] is [0, 1], the decoder 216 outputs the selection signals S1, S2, and S3 with their logical levels specified as L, L, and L to the selection circuit 230 in the cycle T. As a result, the selection circuit 230 selects none of the trapezoidal waveforms Adp, Bdp, and Cdp in the cycle T and outputs the drive signal VOUT corresponding to "not ejected ND", which is constant at the voltage level Vc. When the print data [SIH, SIL] is [0, 0], the decoder 216 outputs the selection signals S1, S2, and S3 with their logical levels specified as L, L, and H to the selection circuit 230 in the cycle T. As a result, the selection circuit 230 selects the trapezoidal waveform Cdp in the cycle T and outputs the drive signal VOUT corresponding to "slight vibration BSD".

When the selection circuit 230 selects none of the trapezoidal waveforms Adp, Bdp, and Cdp, the voltage Vc that was supplied to the piezoelectric element 60 immediately before the current period is retained at one end of the piezoelectric element 60 corresponding thereto due to the capacitive component of the piezoelectric element 60. That is, the meaning of "the selection circuit 230 outputs the drive signal VOUT that is constant at the voltage level Vc" encompasses a case where, when none of the trapezoidal waveforms Adp, Bdp, and Cdp is selected as the drive signal VOUT, the immediately-preceding voltage Vc retained due to the capacitive component of the piezoelectric element 60 is supplied as the drive signal VOUT to the piezoelectric element 60.

As has been described above, based on the print data signal SI, the latch signal LAT, and the clock signal SCK, the drive signal selection circuit 200 generates the drive signal VOUT corresponding to each of the plurality of ejecting portions 600 by putting each of the drive signals COMA, COMB, and COMC into a selected or non-selected state, and outputs it to the corresponding one of the ejecting portions 600. By this means, an amount of ink ejected from each of the plurality of ejecting portions 600 is controlled individually.

1.3 Configuration of Liquid Ejecting Module

Figure 8:
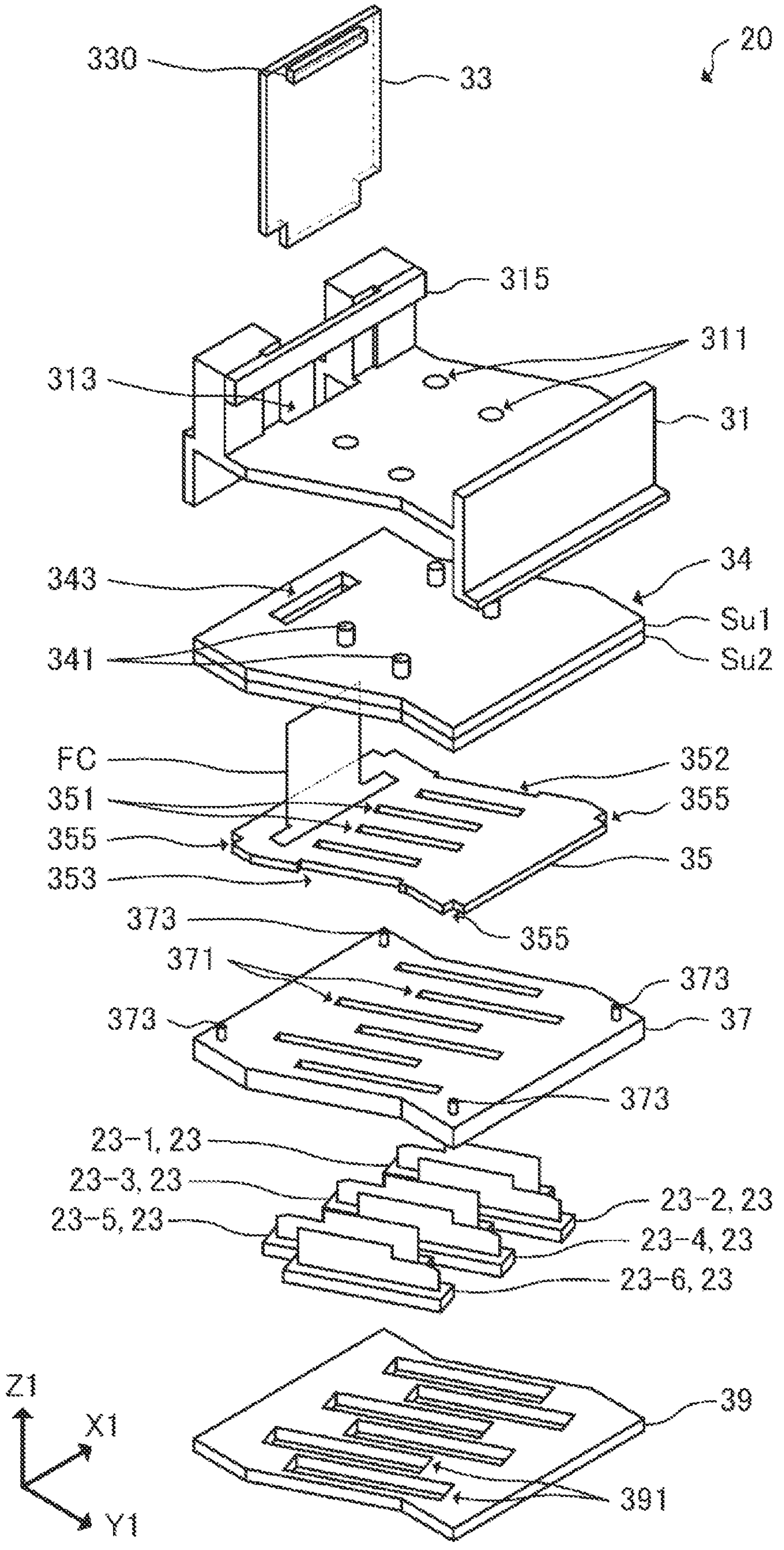
FIG. 8 is a diagram that illustrates a structure of a liquid ejecting module.
Figure 9:
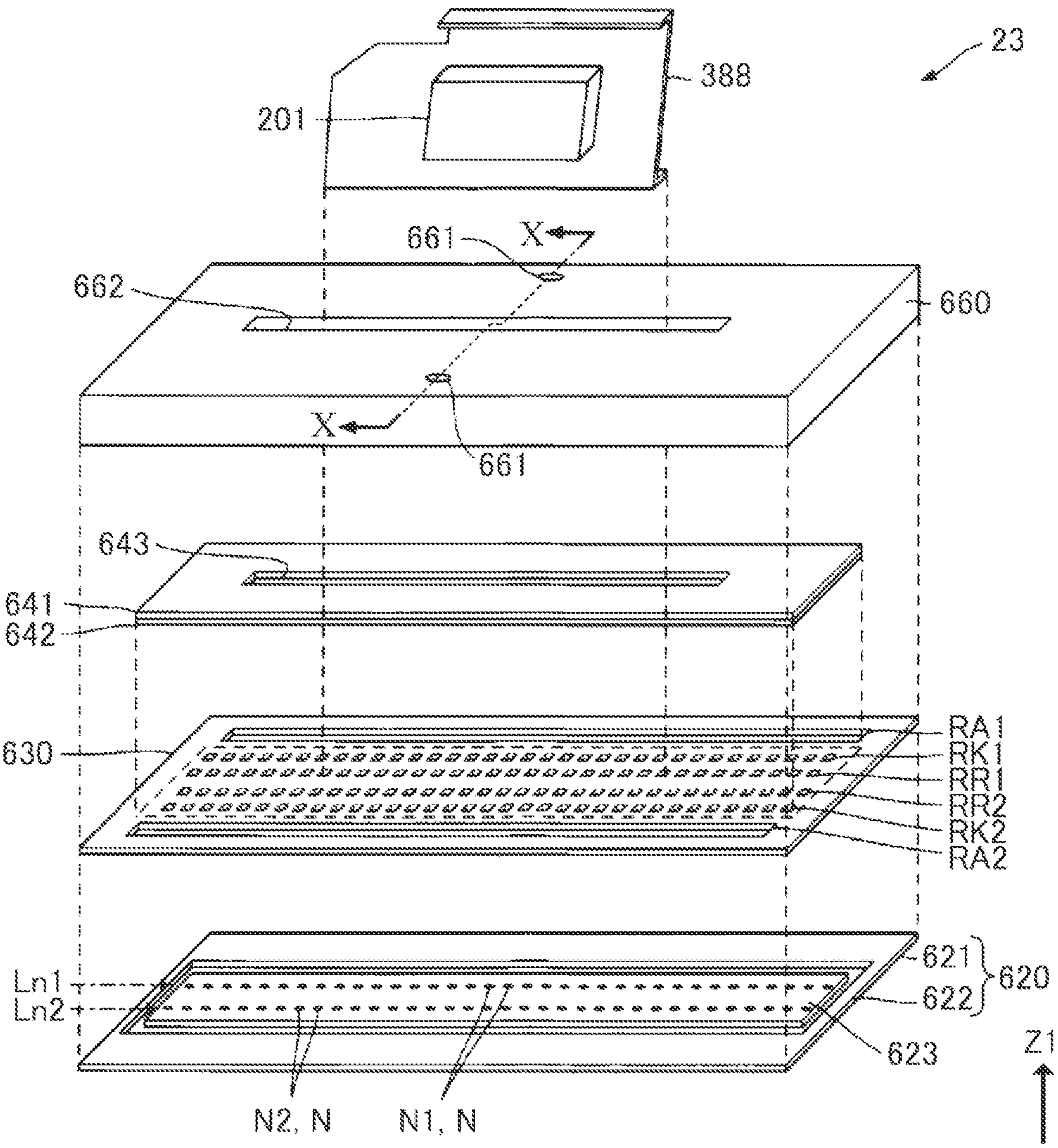
FIG. 9 is a diagram that illustrates an example of a structure of an ejecting module.
Figure 10:
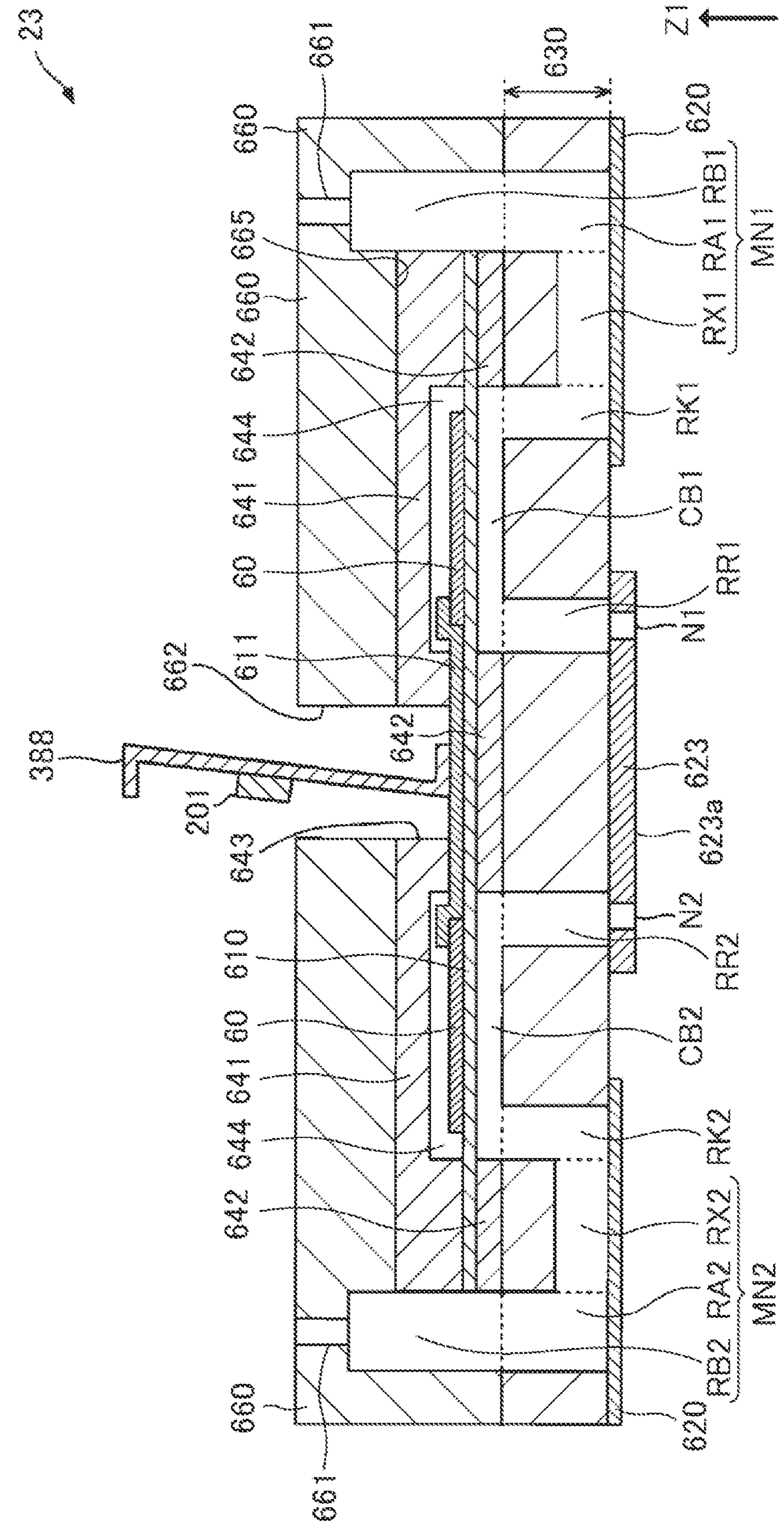
FIG. 10 is a cross-sectional view, taken along the line X-X of FIG. 9, of the ejecting module.

Next, with reference to FIGS. 8 to 10, a structure of the liquid ejecting module 20 will now be described. FIG. 8 is a diagram that illustrates a structure of the liquid ejecting module 20. For explaining the structure of the liquid ejecting module 20, arrows that indicate X1, Y1, and Z1 directions orthogonal to one another are illustrated in FIGS. 8 to 10. In the description to be made with reference to FIGS. 8 to 10, the side corresponding to the tail of an arrow that indicates the X1 direction may sometimes be referred to as −X1 side, and the side corresponding to the head of this arrow may sometimes be referred to as +X1 side, the side corresponding to the tail of an arrow that indicates the Y1 direction may sometimes be referred to as −Y1 side, and the side corresponding to the head of this arrow may sometimes be referred to as +Y1 side, the side corresponding to the tail of an arrow that indicates the Z1 direction may sometimes be referred to as −Z1 side, and the side corresponding to the head of this arrow may sometimes be referred to as +Z1 side. In addition, in the description below, it is assumed that the liquid ejecting module 20 of the liquid ejecting apparatus 1 according to the first embodiment includes six ejecting modules 23, and, when these six ejecting modules 23 need to be distinguished from one another, they may be referred to as "ejecting modules 23-1 to 23-6".

The liquid ejecting module 20 includes a housing 31, a collective board 33, a flow passage structure body 34, a head substrate 35, a distributing flow passage member 37, a fixing plate 39, and the ejecting modules 23-1 to 23-6. In the liquid ejecting module 20, the flow passage structure body 34, the head substrate 35, the distributing flow passage member 37, and the fixing plate 39 are oriented from the −Z1 side toward the +Z1 side along the Z1 direction, the fixing plate 39, the distributing flow passage member 37, the head substrate 35, and the flow passage structure body 34 are stacked in this order, and the housing 31 is located around the flow passage structure body 34, the head substrate 35, the distributing flow passage member 37, and the fixing plate 39 in such a way as to support the flow passage structure body 34, the head substrate 35, the distributing flow passage member 37, and the fixing plate 39. The collective board 33 is provided upright on the +Z1 side with respect to the housing 31 in a state of being supported by the housing 31, and the six ejecting modules 23 are located between the distributing flow passage member 37 and the fixing plate 39 in such a way as to be partially exposed to the outside of the liquid ejecting module 20.

Prior to describing the structure of the liquid ejecting module 20, the structure of the ejecting module 23 included in the liquid ejecting module 20 will now be described first. FIG. 9 is a diagram that illustrates an example of a structure of the ejecting module 23. FIG. 10 is a diagram that illustrates an example of a cross section of the ejecting module 23. FIG. 10 is a cross-sectional view, taken along the line X-X of FIG. 9, of the ejecting module 23 illustrated in FIG. 9. The line corresponding to the section X-X of FIG. 10 is a virtual line segment passing through inlet passages 661 of the ejecting module 23 and through nozzles N1 and N2.

As illustrated in FIGS. 9 and 10, the ejecting module 23 includes a plurality of nozzles N1 arranged in a row and a plurality of nozzles N2 arranged in a row. The sum of the number of the nozzles N1 and the number of the nozzles N2 of the ejecting module 23 is n, which is equal to the number of the ejecting portions 600 of the ejecting module 23. In the first embodiment, it is assumed that the number of the nozzles N1 of the ejecting module 23 is equal to the number of the nozzles N2 thereof. That is, it is assumed that the ejecting module 23 includes the nozzles N1 the number of which is n/2 and the nozzles N2 the number of which is n/2. In the description below, when there is no need to distinguish the nozzles N1 and the nozzles N2 from each other, they may be simply referred to as "nozzles N".

The ejecting module 23 includes a wiring member 388, a case 660, a protection substrate 641, a flow passage forming substrate 642, a communication plate 630, a compliance substrate 620, and a nozzle plate 623.

In the flow passage forming substrate 642, pressure compartments CB1 separated from one another by a plurality of partitioning walls are provided next to one another correspondingly for the nozzles N1 by performing anisotropic etching from one surface side, and pressure compartments CB2 separated from one another by a plurality of partitioning walls are provided next to one another correspondingly for the nozzles N2 by performing anisotropic etching from one surface side. In the description below, when there is no need to distinguish the pressure compartments CB1 and the pressure compartments CB2 from each other, they may be simply referred to as "pressure compartments CB".

The nozzle plate 623 is located on the −Z1 side with respect to the flow passage forming substrate 642. A nozzle row Ln1 formed of the plurality of nozzles N1, the number of which is n/2, and a nozzle row Ln2 formed of the plurality of nozzles N2, the number of which is n/2, are provided in the nozzle plate 623. In the description below, the −Z1-side surface of the nozzle plate 623 having the openings of the nozzles N may sometimes be referred to as a liquid ejecting surface 623*a*.

The communication plate 630 is located on the −Z1 side with respect to the flow passage forming substrate 642 and on the +Z1 side with respect to the nozzle plate 623. Nozzle communication passages RR1 for communication between the pressure compartments CB1 and the nozzles N1 and nozzle communication passages RR2 for communication between the pressure compartments CB2 and the nozzles N2 are provided in the communication plate 630. In addition, pressure compartment communication passages RK1 for communication between the end of the pressure compartments CB1 and a manifold MN1 and pressure compartment communication passages RK2 for communication between the end of the pressure compartments CB2 and a manifold MN2 are provided independently in such a way as to correspond to the pressure compartments CB1 and the pressure compartments CB2 respectively.

The manifold MN1 includes a supply communication passage RA1 and a connection communication passage RX1. The supply communication passage RA1 is provided in such a way as to go through the communication plate 630 in the Z1 direction. The connection communication passage RX1 is provided in such a way as to go halfway in the Z1 direction, without going through the communication plate 630 in the Z1 direction, with an opening at the nozzle-plate (623) side of the communication plate 630. Similarly, the manifold MN2 includes a supply communication passage RA2 and a connection communication passage RX2. The supply communication passage RA2 is provided in such a way as to go through the communication plate 630 in the Z1 direction. The connection communication passage RX2 is provided in such a way as to go halfway in the Z1 direction, without going through the communication plate 630 in the Z1 direction, with an opening at the nozzle-plate (623) side of the communication plate 630. The connection communication passage RX1 included in the manifold MN1 is in communication with the pressure compartments CB1 via the pressure compartment communication passages RK1 corresponding thereto. The connection communication passage RX2 included in the manifold MN2 is in communication with the pressure compartments CB2 via the pressure compartment communication passages RK2 corresponding thereto.

In the description below, when there is no need to distinguish the nozzle communication passages RR1 and the nozzle communication passages RR2 from each other, they may be simply referred to as "nozzle communication passages RR". When there is no need to distinguish the manifold MN1 and the manifold MN2 from each other, they may be simply referred to as "manifold MN". When there is no need to distinguish the supply communication passage RA1 and the supply communication passage RA2 from each other, they may be simply referred to as "supply communication passage RA". When there is no need to distinguish the connection communication passage RX1 and the connection communication passage RX2 from each other, they may be simply referred to as "connection communication passage RX".

A diaphragm 610 is located on the +Z1-side surface of the flow passage forming substrate 642. On the +Z1-side surface of the diaphragm 610, the piezoelectric elements 60 are formed in two rows corresponding to the nozzles N1 and the nozzles N2. One of the electrodes of the piezoelectric element 60 and a piezoelectric layer are formed for each of the pressure compartments CB. The other of the electrodes of the piezoelectric element 60 is configured as a common electrode shared by the pressure compartments CB. The drive signal VOUT is supplied from the drive signal selection circuit 200 to the one of the electrodes of the piezoelectric element 60. The reference voltage signal VBS is supplied to the common electrode, which is the other of the electrodes of the piezoelectric element 60.

The protection substrate 641 is bonded to the +Z1-side surface of the flow passage forming substrate 642. The protection substrate 641 forms a protection space 644 for protecting the piezoelectric elements 60. A through hole 643 that goes in the Z1 direction is provided in the protection substrate 641. The end portion of a lead electrode 611 routed from the electrode of the piezoelectric element 60 extends in such a way as to be exposed inside the through hole 643. The wiring member 388 is electrically coupled to the end portion of the lead electrode 611 exposed inside the through hole 643.

The case 660 that forms a part of the manifold MN that is in communication with the plurality of pressure compartments CB is fixed to the protection substrate 641 and the communication plate 630. The case 660 is bonded to the protection substrate 641 and to the communication plate 630. Specifically, the case 660 has, in its −Z1-side surface, a recessed portion 665 for housing the flow passage forming substrate 642 and the protection substrate 641 inside. The recessed portion 665 has an opening area that is larger than an area of bonding of the protection substrate 641 to the flow passage forming substrate 642. In a state in which the flow passage forming substrate 642 and the like are housed in the recessed portion 665, the −Z1-side opening of the recessed portion 665 is sealed by the communication plate 630. By this means, supply communication passages RB1 and RB2 are formed at a peripheral portion of the flow passage forming substrate 642 by the case 660, the flow passage forming substrate 642, and the protection substrate 641. When there is no need to distinguish the supply communication passage RB1 and the supply communication passage RB2 from each other, they may be simply referred to as "supply communication passage RB".

A compliance substrate 620 is provided at, of the communication plate 630, a surface where the supply communication passage RA and the connection communication passage RX are open. The opening of the supply communication passage RA and the connection communication passage RX is sealed by the compliance substrate 620. Such a compliance substrate 620 includes a sealing film 621 and a fixing substrate 622. The sealing film 621 is made of, for example, a thin film that is flexible. The fixing substrate 622 is made of a hard material such as metal, for example, stainless steel.

The inlet passages 661 through which ink is supplied to the manifolds MN are provided in the case 660. In addition, a connection opening 662, which is a Z1-directional through-hole opening that is in communication with the through hole 643 of the protection substrate 641 and through which the wiring member 388 is inserted, is provided in the case 660.

The wiring member 388 is a flexible member for electric coupling between the ejecting module 23 and the head substrate 35; for example, an FPC can be used. An integrated circuit 201 is mounted on the wiring member 388 by means of COF (Chip On Film). At least a part of the drive signal selection circuit 200 described earlier is mounted on the integrated circuit 201.

In the ejecting module 23 that has the structure described above, the drive signal VOUT outputted by the drive signal selection circuit 200 via the wiring member 388 and the reference voltage signal VBS are supplied to the piezoelectric element 60. Then, based on a change in potential difference between the drive signal VOUT and the reference voltage signal VBS, the piezoelectric element 60 is driven. In accordance with the driving of the piezoelectric element 60, the diaphragm 610 vibrates in the vertical direction, and the internal pressure of the pressure compartment CB changes. Then, due to the change in the internal pressure of the pressure compartment CB, ink stored in the pressure compartment CB is ejected from the nozzle N. In the ejecting module 23, a structure that includes the nozzle N, the nozzle communication passage RR, the pressure compartment CB, the piezoelectric element 60, and the diaphragm 610 corresponds to the ejecting portion 600 described above.

Referring back to FIG. 8, the fixing plate 39 is located on the −Z1 side with respect to the ejecting modules 23. The fixing plate 39 fixes six ejecting modules 23. Specifically, the fixing plate 39 has six openings 391 going through the fixing plate 39 in the Z2 direction. The liquid ejecting surface 623*a* of the ejecting module 23 is exposed through each of these six openings 391. That is, the six ejecting modules 23 are fixed to the fixing plate 39 such that the liquid ejecting surface 623*a* of each of them is exposed through the corresponding one of the openings 391.

The distributing flow passage member 37 is located on the +Z1 side with respect to the ejecting modules 23. On the +Z1-side surface of the distributing flow passage member 37, four inlets 373 are provided. The four inlets 373 are flow passage pipes protruding toward the +Z1 side in the Z1 direction from the +Z1-side surface of the distributing flow passage member 37 and are in communication with non-illustrated flow passage holes formed in the −Z1-side surface of the flow passage structure body 34. Non-illustrated flow passage pipes that are in communication with the four inlets 373 are located on the −Z1-side surface of the distributing flow passage member 37. The non-illustrated flow passage pipes located on the −Z1-side surface of the distributing flow passage member 37 are in communication with the inlet passages 661 of each of the six ejecting modules 23. The distributing flow passage member 37 has six openings 371 going through itself in the Z1 direction. The wiring members 388 included in the six ejecting modules 23 respectively are inserted through the six openings 371.

The head substrate 35 is located on the +Z1 side with respect to the distributing flow passage member 37. A wiring member FC that is electrically coupled to the collective board 33 to be described later is fixed to the head substrate 35. Four openings 351 and cut portions 352 and 353 are formed in the head substrate 35. The wiring members 388 of the ejecting modules 23-2 to 23-5 are inserted through the four openings 351. Each of the wiring members 388 of the ejecting modules 23-2 to 23-5 inserted through the four openings 351 is electrically coupled to the head substrate 35 by soldering or the like. The wiring member 388 of the ejecting modules 23-1 is disposed in such a way as to pass through the cut portion 352, and the wiring member 388 of the ejecting modules 23-6 is disposed in such a way as to pass through the cut portion 353. Each of the wiring members 388 of the ejecting modules 23-1 and 23-6 disposed in such a way as to pass through the cut portions 352 and 353 is electrically coupled to the head substrate 35 by soldering or the like.

Four cut portions 355 are formed at four corners of the head substrate 35. The inlets 373 are disposed in such a way as to pass through the four cut portions 355. The four inlets 373 disposed in such a way as to pass through the cut portions 355 are connected to the flow passage structure body 34, which is located on the +Z1 side with respect to the head substrate 35.

The flow passage structure body 34 includes a flow passage plate Su1 and a flow passage plate Su2. The flow passage plate Su1 and the flow passage plate Su2 are stacked in the Z1 direction in a state in which the flow passage plate Su1 is located on the +Z1 side and the flow passage plate Su2 is located on the −Z1 side, and are bonded to each other by means of an adhesive or the like.

The flow passage structure body 34 includes, on its +Z1-side surface, four inlets 341 protruding toward the +Z1 side in the Z1 direction. The four inlets 341 are in communication with the non-illustrated flow passage holes formed in the −Z1-side surface of the flow passage structure body 34 through ink flow passages formed inside the flow passage structure body 34. The non-illustrated flow passage holes formed in the −Z1-side surface of the flow passage structure body 34 are in communication with the four inlets 373. A through hole 343 that goes in the Z1 direction is formed in the flow passage structure body 34. The wiring member FC for electric coupling to the head substrate 35 is inserted through the through hole 343. In addition to the ink flow passages for communication between the inlets 341 and the non-illustrated flow passage holes formed in the −Z1-side surface, filters for catching foreign objects contained in ink flowing through the ink flow passages, etc. may be provided inside the flow passage structure body 34.

The housing 31 is located in a covering manner around the flow passage structure body 34, the head substrate 35, the distributing flow passage member 37, and the fixing plate 39 and supports the flow passage structure body 34, the head substrate 35, the distributing flow passage member 37, and the fixing plate 39. The housing 31 includes four openings 311, a collective board insertion portion 313, and a holding member 315.

The four inlets 341 of the flow passage structure body 34 are inserted through the four openings 311 respectively. Ink is supplied from the liquid container 3 through non-illustrated tubes or the like to the four inlets 341 inserted through the four openings 311.

The holding member 315 clamps the collective board 33 in a state in which a part of the collective board 33 is inserted through the collective board insertion portion 313. A coupling portion 330 is provided on the collective board 33. Various signals such as the data signal DATA, the drive signals COMA, COMB, and COMC, the reference voltage signal VBS, and other signals such as power-supply voltage that are outputted by the head driving module 10 are inputted to the coupling portion 330. In addition, the wiring member FC of the head substrate 35 is electrically coupled to the collective board 33. By this means, the collective board 33 is electrically coupled to the head substrate 35. A semiconductor device that includes the restoration circuit 220 described earlier may be provided on the collective board 33. Though a case where the collective board 33 includes a single coupling portion 330 is illustrated in FIG. 8, if the liquid ejecting apparatus 1 includes a plurality of wiring members 30 and further if various signals such as the data signal DATA, the drive signals COMA, COMB, and COMC, the reference voltage signal VBS, and other signals such as power-supply voltage that are outputted by the head driving module 10 are inputted to the collective board 33 through the plurality of wiring members 30, the collective board 33 may include a plurality of coupling portions 330 corresponding respectively to the plurality of wiring members 30.

To the liquid ejecting module 20 having the structure described above, ink contained in the liquid container 3 is supplied due to the communication of the liquid container 3 with the inlets 341 through the non-illustrated tubes or the like. Then, the ink having been supplied to the liquid ejecting module 20 flows through the ink flow passages formed inside the flow passage structure body 34 to the non-illustrated flow passage holes formed in the −Z1-side surface of the flow passage structure body 34 and is thereafter supplied to the four inlets 373 of the distributing flow passage member 37. The ink having been supplied to the distributing flow passage member 37 through the four inlets 373 is distributed correspondingly for the six ejecting modules 23 through the non-illustrated ink flow passages formed inside the distributing flow passage member 37 and is thereafter supplied each to the inlet passages 661 of the corresponding one of the ejecting modules 23. Then, the ink having been supplied to the ejecting module 23 through the inlet passages 661 is stored in the pressure compartments CB included in the ejecting portions 600.

The head driving module 10 and the liquid ejecting module 20 are electrically coupled to each other via one or more wiring members 30. Via this coupling, various signals that include the drive signals COMA, COMB, and COMC, the reference voltage signal VBS, and the data signal DATA that are outputted by the head driving module 10 are supplied to the liquid ejecting module 20. The various signals that include the drive signals COMA, COMB, and COMC, the reference voltage signal VBS, and the data signal DATA having been inputted to the liquid ejecting module 20 propagate through the collective board 33 and the head substrate 35. In this process, the restoration circuit 220 generates the clock signals SCK1 to SCK6, the print data signals SI1 to SI6, and the latch signals LAT1 to LAT6 that correspond respectively to the ejecting modules 23-1 to 23-6 from the data signal DATA. Then, by the integrated circuit 201 including the drive signal selection circuit 200 provided on the wiring member 388, the drive signal VOUT corresponding to each of the n ejecting portions 600 is generated and is supplied to the piezoelectric element 60 included in the ejecting portion 600 corresponding thereto. As a result, the piezoelectric element 60 is driven, and ink stored in the pressure compartment CB is ejected.

1.4 Structure of Head Driving Module

Next, with reference to FIGS. 11 to 18, a structure of the head driving module 10 according to the present embodiment will now be described. Arrows that indicate X2, Y2, and Z2 directions independent of the above-described X1, Y1, and Z1 directions and orthogonal to one another are illustrated in FIGS. 11 to 17. In the description to be made with reference to FIGS. 11 and 12, the side corresponding to the tail of an arrow that indicates the X2 direction may sometimes be referred to as −X2 side, and the side corresponding to the head of this arrow may sometimes be referred to as +X2 side, the side corresponding to the tail of an arrow that indicates the Y2 direction may sometimes be referred to as −Y2 side, and the side corresponding to the head of this arrow may sometimes be referred to as +Y2 side, the side corresponding to the tail of an arrow that indicates the Z2 direction may sometimes be referred to as −Z2 side, and the side corresponding to the head of this arrow may sometimes be referred to as +Z2 side.

Figure 11:
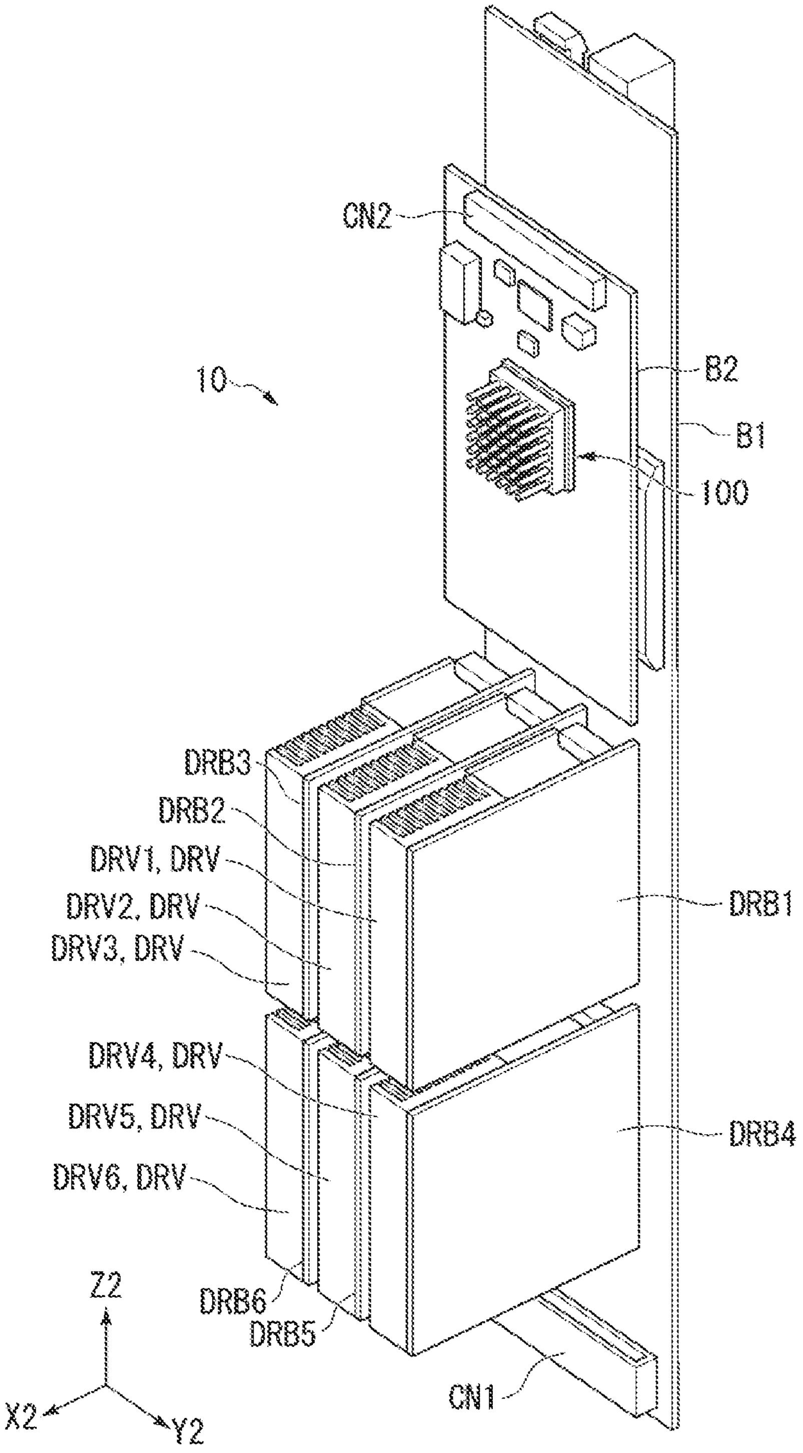
FIG. 11 is a perspective view illustrating an appearance of a head driving module according to a first embodiment of the present disclosure.

FIG. 11 is a perspective view illustrating an appearance of the head driving module 10 according to the present embodiment. The head driving module 10 includes a base board B1, a conversion circuit board B2, and six drive signal output circuits DRV. The six drive signal output circuits DRV is made up of a drive signal output circuit DRV1, a drive signal output circuit DRV2, a drive signal output circuit DRV3, a drive signal output circuit DRV4, a drive signal output circuit DRV5, and a drive signal output circuit DRV6. The six drive signal output circuits DRV correspond to a case where m is six in the drive signal output circuits 50-1 to **50-*m* illustrated in FIG. 2**.

The drive signal output circuit DRV1, the drive signal output circuit DRV2, the drive signal output circuit DRV3, the drive signal output circuit DRV4, the drive signal output circuit DRV5, and the drive signal output circuit DRV6 have the same structure as one another. Therefore, in the description below, the drive signal output circuit DRV1 may sometimes be described representatively for any one of the drive signal output circuit DRV1, the drive signal output circuit DRV2, the drive signal output circuit DRV3, the drive signal output circuit DRV4, the drive signal output circuit DRV5, and the drive signal output circuit DRV6.

The base board B1 is disposed such that the base board B1 extends in the Z2 direction. That is, the base board B1 is disposed such that the base board B1 extends in a direction intersecting with a nozzle surface. The conversion circuit board B2 and the six drive signal output circuits DRV are disposed on the base board B1. The conversion circuit board B2 is fastened to the base board B1 with a plurality of screws. The conversion circuit board B2 is a substrate on which the control circuit 100 is disposed. The control circuit 100 includes the conversion circuit 120 illustrated in FIG. 2.

The drive signal output circuit DRV1 includes a drive circuit board DRB1. Drive circuits that generates drive signals are mounted on the drive circuit board DRB1. The drive signal output circuit DRV1 is coupled to the base board B1 by B-to-B coupling of the drive circuit board DRB1 to the base board B1. The term "B-to-B coupling" means coupling using a B-to-B connector. The drive circuit board DRB1 is disposed in an upright position with respect to the base board B1 by being B-to-B coupled to the base board B1.

Similarly, the drive signal output circuits DRV2 to DRV6 include drive circuit boards DRB2 to DRB6 respectively. Each of the drive circuit boards DRB1 to DRB6 is disposed in an upright position with respect to the base board B1 by being B-to-B coupled to the base board B1. Each of the drive circuit boards DRB1 to DRB6 is coupled to another board by being B-to-B coupled to the base board B1 only.

The drive signal output circuit DRV1 and the drive signal output circuit DRV2 are spaced from each other in the Y2 direction. That is, the drive signal output circuit DRV1 and the drive signal output circuit DRV2 are spaced from each other in a direction orthogonal to a first direction that is the opposite of ejecting orifices of a liquid ejecting head unit.

The drive signal output circuit DRV2 and the drive signal output circuit DRV3 are spaced from each other in the Y2 direction. That is, the drive signal output circuit DRV2 and the drive signal output circuit DRV3 are spaced from each other in a direction orthogonal to the first direction that is the opposite of the ejecting orifices of the liquid ejecting head unit. The drive signal output circuit DRV4 and the drive signal output circuit DRV5 are spaced from each other in the Y2 direction. That is, the drive signal output circuit DRV4 and the drive signal output circuit DRV5 are spaced from each other in a direction orthogonal to the first direction that is the opposite of the ejecting orifices of the liquid ejecting head unit. The drive signal output circuit DRV5 and the drive signal output circuit DRV6 are spaced from each other in the Y2 direction. That is, the drive signal output circuit DRV5 and the drive signal output circuit DRV6 are spaced from each other in a direction orthogonal to the first direction that is the opposite of the ejecting orifices of the liquid ejecting head unit.

The base board B1 includes a drive-circuit-unit-side first connector CN1. The drive-circuit-unit-side first connector CN1 is located along a −Z2-side edge of the base board B1. One end of the wiring member 30 is attached to the drive-circuit-unit-side first connector CN1. The opposite end of the wiring member 30 is coupled to a head-side connector of the liquid ejecting module 20. That is, signals that include the drive signals COMA1 to COMA6, COMB1 to COMB6, and COMC1 to COMC6 and the data signal DATA that are outputted by the head driving module 10 are supplied to the liquid ejecting module 20 through the drive-circuit-unit-side first connector CN1 and the wiring member 30. Therefore, the drive-circuit-unit-side first connector CN1 is coupled to the head-side connector, with the wiring member 30 provided therebetween.

The drive signal generated by the drive signal output circuit DRV1 is supplied from the drive circuit board DRB1 to the drive-circuit-unit-side first connector CN1 via the base board B1. That is, the drive signal generated by the drive signal output circuit DRV1 is supplied to the liquid ejecting module 20 via the base board B1.

A drive-circuit-unit-side second connector CN2 is located along a +Z2-side edge of the conversion circuit board B2. A non-illustrated cable that is electrically coupled to the control unit 2 is attached to the drive-circuit-unit-side second connector CN2. Signals that include the image information signal IP outputted by the control unit 2 are supplied through this cable to the head driving module 10. The head driving module 10 and the control unit 2 may be coupled to each other by means of, for example, a flexible flat cable (FFC), a universal serial bus (USB) cable, or a high-definition multimedia interface (HDMI®) cable. In this case, a USB connector or an HDMI® connector corresponding to the type of the cable for coupling therebetween is used as the drive-circuit-unit-side second connector CN2. The head driving module 10 and the control unit 2 may be electrically coupled to each other directly, not via a cable. In this case, for example, a B-to-B (Board to Board) connector can be used as the drive-circuit-unit-side second connector CN2.

Figure 12:
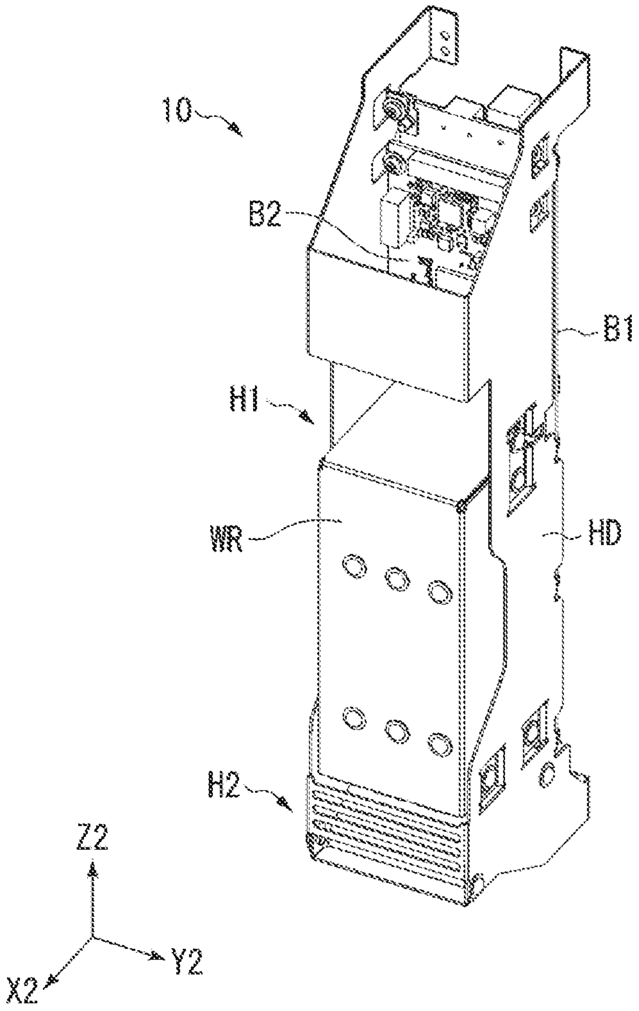
FIG. 12 is a perspective view illustrating an appearance of the head driving module in a state in which a frame member according to the first embodiment of the present disclosure is attached thereto.

FIG. 12 is a perspective view illustrating an appearance of the head driving module 10 in a state in which a frame member according to the present embodiment is attached thereto. FIG. 12 depicts a state in which a frame member HD and an air guide WR are attached to the head driving module 10 illustrated in FIG. 11. The frame member HD and the air guide WR are provided for the purpose of preventing the head driving module 10 from dust. The frame member HD has an air guiding vent H1 and an air guiding vent H2. The air guiding vent H1 and the air guiding vent H2 enhance heat-releasing performance of the head driving module 10. In addition, the air guiding vent H1 and the air guiding vent H2 let external air in to cool the head driving module 10. The air guiding vent H1 and the air guiding vent H2 may be omitted from the configuration of the air guide WR.

Figure 13:
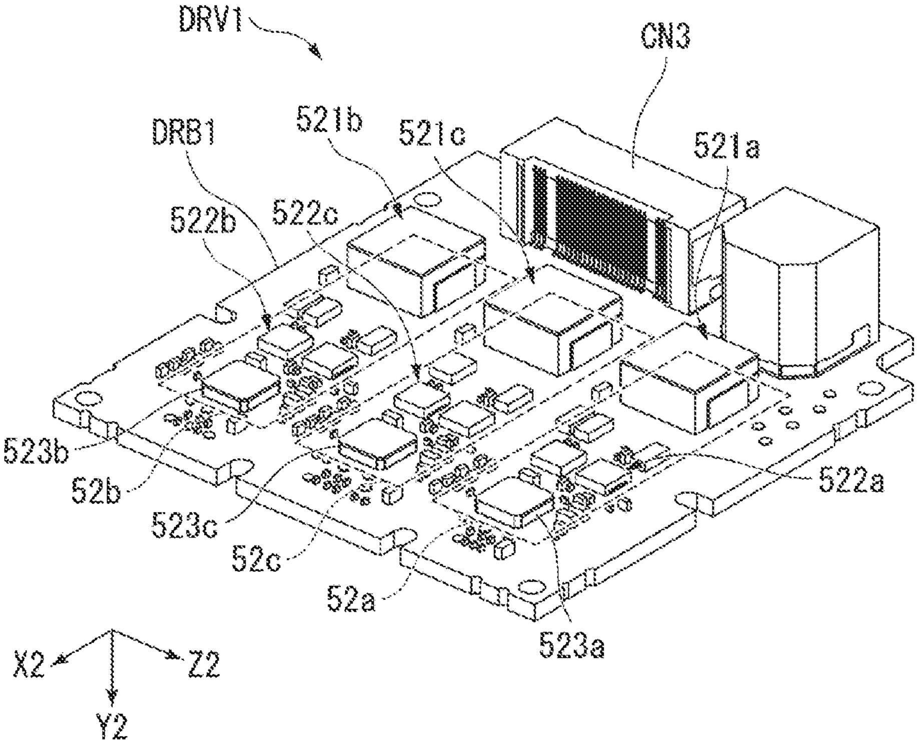
FIG. 13 is a diagram that illustrates a configuration of a drive signal output circuit according to the first embodiment of the present disclosure.

With reference to FIG. 13, a configuration of the drive signal output circuit DRV will now be described. FIG. 13 is a diagram that illustrates a configuration of the drive signal output circuit DRV according to the present embodiment. In FIG. 13, among the six drive signal output circuits DRV, the drive signal output circuit DRV1 is taken as an example to explain the configuration of the drive signal output circuit DRV; however, a similar description holds true for the drive signal output circuits DRV2 to DRV6.

The drive circuit board DRB1 may have a greater length in the Z2 direction than in the Y2 direction. That is, the drive circuit board DRB1 may have a greater length in the first direction that is the opposite of the ejecting orifices of the liquid ejecting head unit than in both directions orthogonal to the first direction.

The drive circuits mounted on the drive circuit board DRB1 include the drive circuit 52*a* that generates the drive signal COMA1 illustrated in FIG. 2, the drive circuit 52*b* that generates the drive signal COMB1 illustrated therein, and the drive circuit 52*c* that generates the drive signal COMC1 illustrated therein. The drive circuit 52*a* includes a coil 521*a*, a field effect transistor (FET) 522*a*, and an integrated circuit (IC) 523*a*. The drive circuit 52*b* includes a coil 521*b*, a field effect transistor 522*b*, and an integrated circuit 523*b*. The drive circuit 52*c* includes a coil 521*c*, a field effect transistor 522*c*, and an integrated circuit 523*c*.

Each of the drive circuits 52*a*, 52*b*, and 52*c* is a class-D amplifier that includes an integrated circuit, a transistor, and a coil. An amount of heat generation of a class-D amplifier is smaller than that of a class-AB amplifier, etc. Therefore, in each of the drive circuits 52*a*, 52*b*, and 52*c*, it is possible to make the size of a member for heat dissipation such as a heatsink smaller than in a class-AB amplifier, etc. Consequently, the size of the mount area of the drive signal output circuit DRV1 decreases, making it possible to further reduce the size of the head driving module 10.

The drive circuit board DRB1 includes a coupling connector CN3. The coupling connector CN3 is coupled to the base board B1. The drive circuit board DRB1 is B-to-B coupled to the base board B1 by means of the coupling connector CN3. The configuration of terminals provided in the coupling connector CN3 will be described later.

The distance between the coupling connector CN3 and the coil 521*a* is shorter than the distance between the coupling connector CN3 and the integrated circuit 523*a*. The distance between the coupling connector CN3 and the coil 521*b* is shorter than the distance between the coupling connector CN3 and the integrated circuit 523*b*. The distance between the coupling connector CN3 and the coil 521*c* is shorter than the distance between the coupling connector CN3 and the integrated circuit 523*c*. Because of this configuration, in the head driving module 10, it is possible to dispose the coils near the connector. Therefore, in the head driving module 10, wiring through which the signal COM specifying the ejection waveform flows is short, making it possible to increase ejection stability.

The drive signal COMC1 is a slight vibration signal for causing liquid vibration to an extent that no liquid is ejected from a nozzle provided in the head. The drive circuit 52*c* is a slight vibration generating circuit that generates the slight vibration signal. Therefore, the drive circuit board DRB1 includes a slight vibration generating circuit that generates the slight vibration signal. Because of this configuration, in the head driving module 10, it is possible to prevent an increase in ink viscosity. The drive circuit 52*c* may be omitted from the drive circuit board DRB1.

Figure 14:
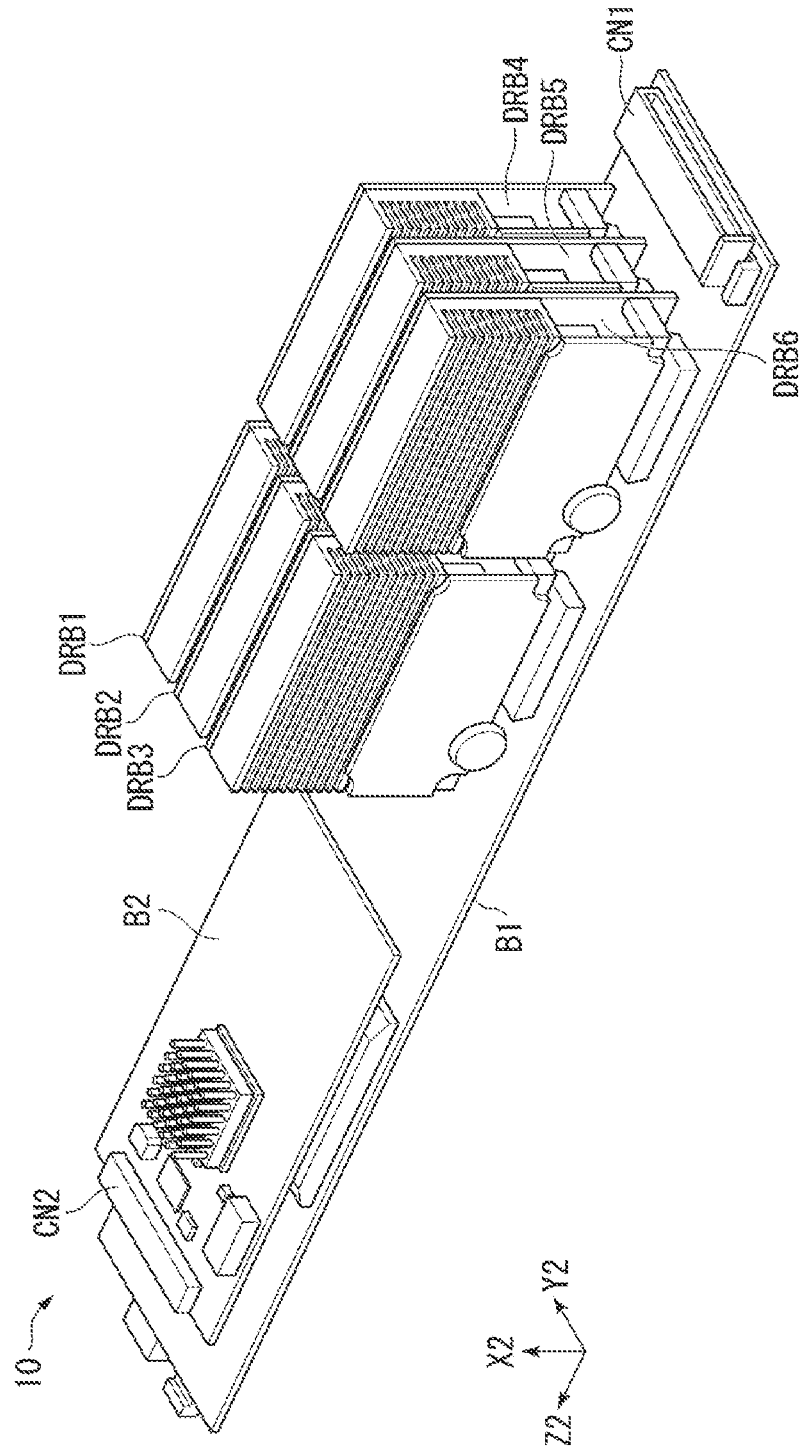
FIG. 14 is a perspective view illustrating a configuration of a drive circuit board disposed in an upright position with respect to a base board according to the first embodiment of the present disclosure.
Figure 15:
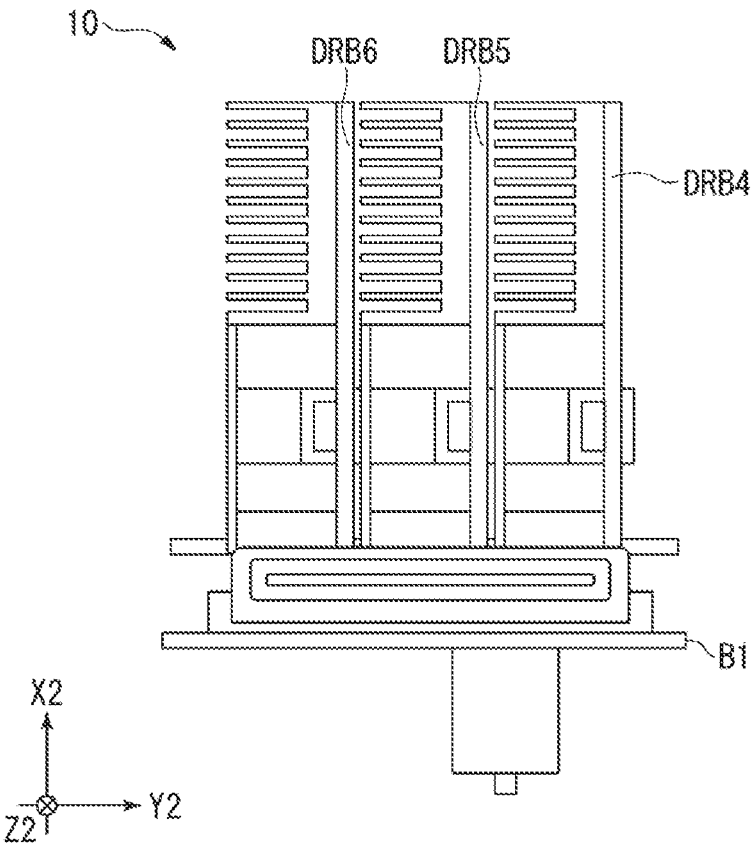
FIG. 15 is a bottom view illustrating a configuration of the drive circuit board disposed in an upright position with respect to the base board according to the first embodiment of the present disclosure.

With reference to FIGS. 14 and 15, a structure in which the drive circuit board DRB is disposed in an upright position with respect to the base board B1 will now be described. FIG. 14 is a perspective view illustrating a configuration of the drive circuit board DRB disposed in an upright position with respect to the base board B1 according to the present embodiment. FIG. 15 is a bottom view illustrating a configuration of the drive circuit board DRB disposed in an upright position with respect to the base board B1 according to the present embodiment. Each of the six drive circuit boards DRB is disposed in an upright position with respect to the base board B1. The six drive circuit boards DRB are disposed substantially in parallel with one another in an upright position with respect to the base board B1.

The base board B1 is disposed such that a surface of the base board B1 overlaps with a first virtual plane intersecting with the nozzle surface. The nozzle surface is a surface in which the nozzles included in the plurality of ejecting portions 600 described above are arranged. The first virtual plane is a plane whose normal line goes in the X2 direction. The first virtual plane is, in other words, a plane that includes a direction in which the base board B1 extends. The direction in which the base board B1 extends means, in particular, the length direction of the base board B1.

Therefore, the six drive circuit boards DRB are coupled to the base board B1 in a direction intersecting with the direction in which the base board B1 extends. Because of this configuration, in the head driving module 10, it is possible to increase the efficiency of use of space when coupling each of the six drive circuit boards DRB to the base board B1 by means of the coupling connector CN3, without an increase in size in the direction in which the base board B1 extends. For example, when each of the six drive circuit boards DRB were coupled to the base board B1 with the surfaces of the six drive circuit boards DRB arranged substantially in parallel with the surface of the base board B1 on the base board B1, the efficiency of use of space would decrease when coupling each of the six drive circuit boards DRB to the base board B1 by means of the coupling connector CN3. Moreover, the six drive circuit boards DRB are coupled to the base board B1 such that the six drive circuit boards DRB extend in a direction substantially perpendicular to the nozzle surface. Because of this configuration, in the head driving module 10, it is possible to increase the efficiency of use of space over the base board B1, without an increase in size in the direction in which the base board B1 extends. As has been described above, in the head driving module 10, the six drive circuit boards DRB are disposed in an upright position with respect to the base board B1. Therefore, the size of the head driving module 10 is not large in the direction in which the base board B1 extends.

The direction in which the six drive circuit boards DRB extend in a state in which the six drive circuit boards DRB are coupled to the base board B1 is not limited to the direction described above. The direction in which the six drive circuit boards DRB extend may be inclined with respect to the direction substantially perpendicular to the nozzle surface. The six drive circuit boards DRB may extend in directions different from one another. The six drive circuit boards DRB do not necessarily have to be disposed in an upright position with respect to the base board B1 as long as they are disposed on the base board B1. The number of the drive circuit boards DRB may be any number, instead of six.

Figure 16:
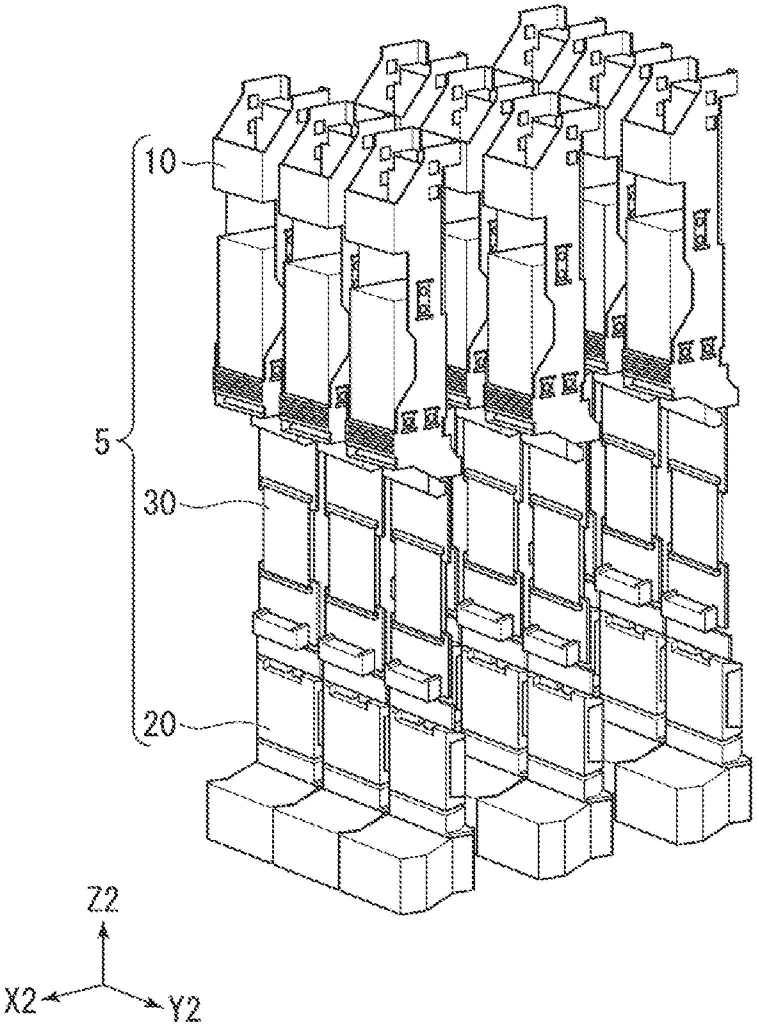
FIG. 16 is a perspective view illustrating a configuration of a plurality of ejecting units according to the first embodiment of the present disclosure.

Next, with reference to FIGS. 16 and 17, a configuration in which ejecting units including head driving modules 10 are arranged will now be described. FIG. 16 is a perspective view illustrating a configuration of a plurality of ejecting units according to the present embodiment. In FIG. 16, nine ejecting units are illustrated as an example. The nine ejecting units have the same structure as one another. The ejecting unit 5 is one of the nine ejecting units.

In the ejecting unit 5, the head driving module 10 and the liquid ejecting module 20 are electrically coupled to each other via one or more wiring members 30. In a state of being assembled as a component of the ejecting unit 5, the head driving module 10 is located on the opposite side in relation to the ejecting orifices of the liquid ejecting module 20. In the ejecting unit 5, for the purpose of realizing high-speed high-definition printing, the head driving module 10 is disposed just above the liquid ejecting module 20.

In the ejecting unit 5, for the purpose of realizing high-speed high-definition printing, a structure in which the liquid ejecting modules 20 are arranged densely is adopted. The liquid ejecting module 20 corresponds to a head. The liquid ejecting module 20 includes the ejecting portion 600 and a collective board. Upon receiving a drive signal, the ejecting portion 600 ejects liquid from a nozzle provided in the nozzle surface. The collective board includes a head-side connector.

A structure in which the liquid ejecting modules 20 are arranged densely is also called a line head structure. Three ejecting units are arranged next to one another in the main scanning direction. The main scanning direction is the Y2 direction in FIG. 16. Therefore, the plural liquid ejecting modules 20 are arranged in a first direction parallel to the nozzle surface. Three rows each made up of three ejecting units arranged next to one another in the main scanning direction are arranged in the transportation direction. The transportation direction is the X2 direction in FIG. 16. The main scanning direction is also called a sheet width direction. The transportation direction is also called a sheet feeding direction.

Figure 17:
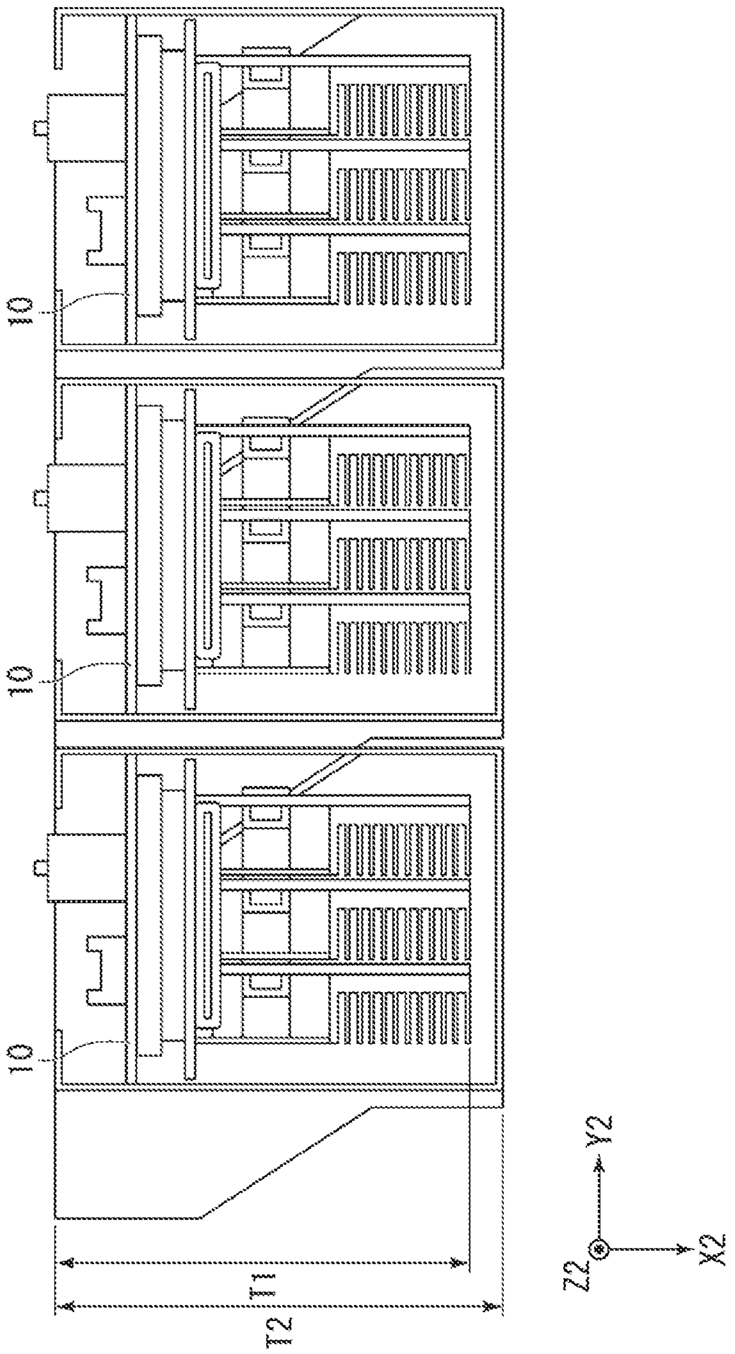
FIG. 17 is a top view illustrating a configuration of the plurality of ejecting units according to the first embodiment of the present disclosure.

FIG. 17 is a top view illustrating a configuration of a plurality of ejecting units according to the present embodiment. With reference to FIG. 17, the size of the head driving module 10 in a thickness direction will now be described. The thickness direction is the X2 direction in FIG. 17. In FIG. 17, the size of the head driving module 10 in the thickness direction is denoted as a thickness T1.

In the head driving module 10, as has been described above, an increase in size in the direction in which the base board B1 extends is suppressed by coupling the six drive circuit boards DRB to the base board B1 in an upright position with respect thereto. On the other hand, in the head driving module 10, the thickness T1 increases because the six drive circuit boards DRB are coupled to the base board B1 in an upright position with respect thereto. The meaning of "the thickness T1 increases" is a greater thickness as compared with a case where the drive circuits mounted on each of the six drive circuit boards DRB were mounted on the base board B1. In the head driving module 10, the thickness T1 is designed to be within a range of not exceeding a thickness T2 of the liquid ejecting module 20. That is, the thickness T1 is designed to be within a range of not exceeding the outside dimensions of the head.

Figure 18:
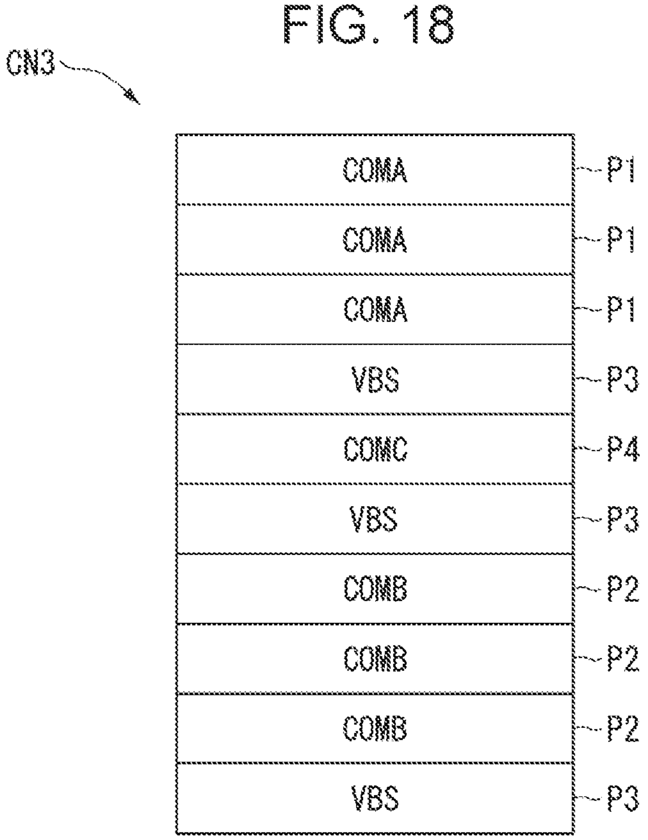
FIG. 18 is a diagram that illustrates a layout of terminals provided in a coupling connector according to the first embodiment of the present disclosure.

With reference to FIG. 18, the layout of terminals provided in the coupling connector CN3 will now be described. FIG. 18 is a diagram that illustrates a layout of terminals provided in the coupling connector CN3 according to the present embodiment. The coupling connector CN3 includes COMA terminals P1, COMB terminals P2, VBS terminals P3, and a COMC terminal P4. In FIG. 18, a part of the terminals provided in the coupling connector CN3 is illustrated.

The COMA terminal P1 is a terminal through which the drive signal COMA1 propagates to an upper electrode included in the piezoelectric element 60 of the head. The COMB terminal P2 is a terminal through which the drive signal COMB1 propagates to the upper electrode included in the piezoelectric element 60. The VBS terminal P3 is a terminal through which a constant voltage signal propagates to a lower electrode included in the piezoelectric element 60. The constant voltage signal is the reference voltage signal VBS1. The COMC terminal P4 is a terminal through which the drive signal COMC1 propagates. As has been described above, the drive signal COMC1 is a slight vibration signal for causing liquid vibration to an extent that no liquid is ejected from a nozzle provided in the head.

As illustrated in FIG. 18, a part of terminals between the COMA terminals P1 and the COMB terminals P2 is the VBS terminal P3 or the COMC terminal P4. The layout of terminals provided in the coupling connector CN3 illustrated in FIG. 18 is a non-limiting example. However, in order to achieve a reduction in inductance, it is preferable if the layout of terminals provided in the coupling connector CN3 satisfies the following conditions.

The VBS terminals P3 are disposed next to the COMA terminal P1 and the COMB terminal P2 respectively. That is, the VBS terminal P3 is disposed between the COMA terminal P1 and the COMB terminal P2. This configuration makes it possible to achieve a reduction in inductance by arranging the VBS terminal P3, through which the reference voltage signal VBS1 with a current flow in the opposite direction in relation to the drive signals COMA1 and COMB1 propagates, between the COMA terminal P1, through which the drive signal COMA1 propagates, and the COMB terminal P2, through which the drive signal COMB1 propagates.

As illustrated in FIG. 18, the COMC terminal P4 is disposed between the COMA terminal P1 and the COMB terminal P2. Each of the drive signals COMA1 and COMB1 is a relatively large current in comparison with the drive signals COMC1. Since the COMC terminal P4, through which the drive signal COMC1 flows, is disposed between the COMA terminal P1, through which the drive signal COMA1 flows, and the COMB terminal P2, through which the drive signal COMB1 flows, it is possible to achieve a reduction in inductance.

As has been described above, a drive circuit unit according to the present embodiment is a drive circuit unit provided in a head unit together with a head and configured to generate a drive signal for driving the head. The drive circuit unit includes a base board B1 and a plurality of drive circuit boards. The base board B1 includes a drive-circuit-unit-side connector coupled to a head-side connector. A drive circuit configured to generate a drive signal is mounted on each of the plurality of drive circuit boards. The base board B1 is disposed such that the base board B1 extends in a direction intersecting with a nozzle surface of the head. The plurality of drive circuit boards is disposed on the base board B1.

With this configuration, in the drive circuit unit according to the present embodiment, since the plurality of drive circuit boards is disposed on the base board B1, the size of the drive circuit unit is not large in a direction intersecting with a nozzle surface. In the drive circuit unit according to the present embodiment, the size in the length direction of the base board B1 supporting chip-by-chip driving is suppressed. The drive circuit unit according to the present embodiment is advantageous for forming a high-definition image because of dense head arrangement in the main scanning direction.

The liquid ejecting apparatus 1 is not limited to a piezoelectric-type apparatus that ejects liquid by driving its piezoelectric element. The present disclosure may be applied to a liquid ejecting apparatus of any other scheme such as a so-called thermal scheme. Moreover, the liquid ejecting apparatus 1 may be an apparatus that ejects liquid with relative movement of the ejecting unit 5 and the medium P or may be configured to move the ejecting unit 5 without moving the medium P.

For the drive-circuit-unit-side first connector CN1, the drive-circuit-unit-side second connector CN2, and the coupling connector CN3, a straight-angle connector may be used instead of a right-angle connector. When the drive-circuit-unit-side first connector CN1 is a straight-angle connector, the drive-circuit-unit-side first connector CN1 may be coupled sideways to, of the liquid ejecting module 20, a portion that is convex toward the Z2 side. The drive-circuit-unit-side first connector CN1 may be referred to as a first connector. The head-side connector may be referred to as a head connector.

2. Second Embodiment

2.1 Cooling of Drive Circuits by Cooling Unit

Figure 19:
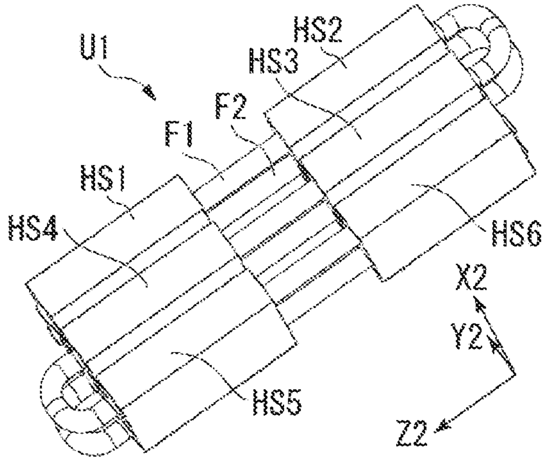
FIG. 19 is a perspective view illustrating a configuration of a cooling unit according to a second embodiment of the present disclosure.

Next, with reference to FIGS. 19 to 28, as a second embodiment, a structure for cooling drive circuits by a cooling unit will now be described. FIG. 19 is a perspective view illustrating a configuration of a cooling unit U1 according to the present embodiment. The cooling unit U1 cools drive circuits by circulating liquid through flow passages. An example of the liquid is water. Another name for the liquid is a coolant. Circulating the liquid through the flow passages will be referred to also as causing the liquid to flow through the flow passages.

The cooling unit U1 includes six heatsink portions HS, a flow passage F1, a flow passage F2, and a non-illustrated controller C1. The six heatsink portions HS are made up of a heatsink portion HS1, a heatsink portion HS2, a heatsink portion HS3, a heatsink portion HS4, a heatsink portion HS5, and a heatsink portion HS6. The heatsink portion may be referred to as a box.

The heatsink portion HS1, the heatsink portion HS2, the heatsink portion HS3, the heatsink portion HS4, the heatsink portion HS5, and the heatsink portion HS6 have the same function as one another. Therefore, in the description below, the heatsink portion HS1 may be taken as a representative example in order to explain the function of the six heatsink portions HS.

The flow passage F1 communicates the heatsink portion HS1, the heatsink portion HS2, the heatsink portion HS3, the heatsink portion HS4, the heatsink portion HS5, and the heatsink portion HS6 in this order. The flow passage F1 has straight-line portions, which extend straight, and bent portions, which are curved. The flow passage F1 communicates the heatsink portion HS1 and the heatsink portion HS2 via its straight-line portion. The flow passage F1 communicates the heatsink portion HS2 and the heatsink portion HS3 via its bent portion. The flow passage F1 communicates the heatsink portion HS3 and the heatsink portion HS4 via its straight-line portion. The flow passage F1 communicates the heatsink portion HS4 and the heatsink portion HS5 via its bent portion. The flow passage F1 communicates the heatsink portion HS5 and the heatsink portion HS6 via its straight-line portion.

The flow passage F2 has the same shape as that of the flow passage F1. The flow passage F2 is provided at a level different from the flow passage F1. The term "level" means a position in the X2 direction in FIG. 19. The flow passage F2, similarly to the flow passage F1, communicates the heatsink portion HS1, the heatsink portion HS2, the heatsink portion HS3, the heatsink portion HS4, the heatsink portion HS5, and the heatsink portion HS6 in this order.

The controller C1 performs control on the circulation of the liquid through the flow passage F1. The controller C1 performs control on the circulation of the liquid through the flow passage F2. The controller C1 is capable of controlling the circulation of the liquid through the flow passage F1 and controlling the circulation of the liquid through the flow passage F2 independently of each other. For example, the controller C1 is capable of performing the control such that the direction of the circulation of the liquid through the flow passage F1 is the same as the direction of the circulation of the liquid through the flow passage F2. Alternatively, the controller C1 is capable of performing the control such that the direction of the circulation of the liquid through the flow passage F1 and the direction of the circulation of the liquid through the flow passage F2 are different from each other. A detailed explanation of the control on the circulation of the liquid by the controller C1 will be given later.

Figure 20:
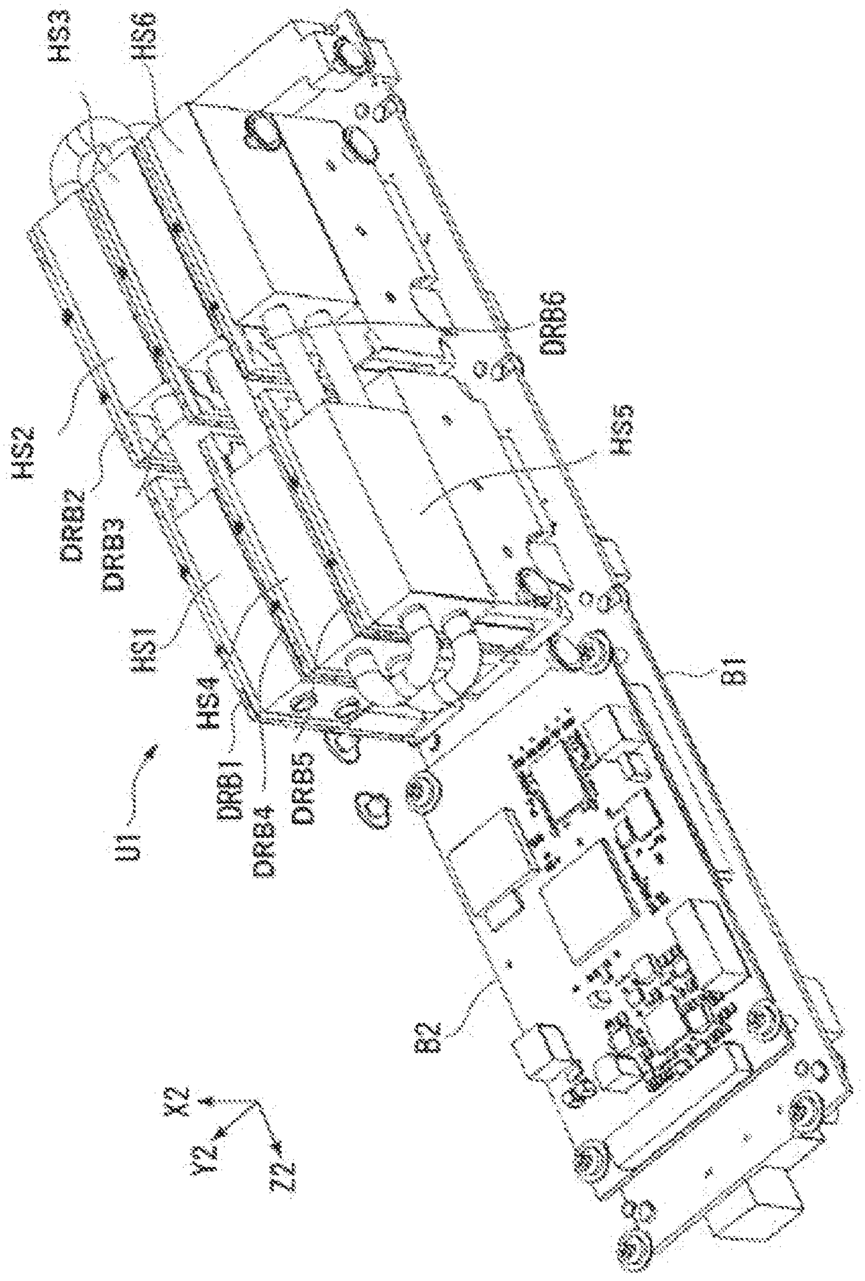
FIG. 20 is a perspective view illustrating a state in which the cooling unit according to the second embodiment of the present disclosure is attached to drive signal output circuits.

FIG. 20 is a perspective view illustrating a state in which the cooling unit U1 according to the present embodiment is attached to the drive signal output circuits DRV. The heatsink portion HS1 is in contact with the drive circuit board DRB1. Similarly, the heatsink portion HS2 is in contact with the drive circuit board DRB2. The heatsink portion HS3 is in contact with the drive circuit board DRB3. The heatsink portion HS4 is in contact with the drive circuit board DRB4. The heatsink portion HS5 is in contact with the drive circuit board DRB5. The heatsink portion HS6 is in contact with the drive circuit board DRB6.

Therefore, in the cooling unit U1, the heatsink portion HS1 through which the liquid flows is located between the drive circuit board DRB1 and the drive circuit board DRB2. The heatsink portion HS2 through which the liquid flows is located between the drive circuit board DRB4 and the drive circuit board DRB3. The heatsink portion HS3 through which the liquid flows is located between the drive circuit board DRB3 and the drive circuit board DRB6. The heatsink portion HS4 through which the liquid flows is located between the drive circuit board DRB5 and the drive circuit board DRB5.

The cooling unit U1 causes the liquid to flow through the heatsink portion HS1, the heatsink portion HS2, the heatsink portion HS3, the heatsink portion HS4, the heatsink portion HS5, and the heatsink portion HS6 in this order. In the cooling unit U1, for example, the heatsink portion HS5 is located for liquid communication through itself on, of the drive circuit board DRB5, the opposite side in relation to the drive circuit board DRB4. The heatsink portion HS4 is in contact with the drive circuit board DRB4, and the drive circuit board DRB5 is in contact with, of the heatsink portion HS4, the opposite side in relation to the drive circuit board DRB4. As described here, the heatsink portion is not limited to a heatsink portion that is in contact with, and cools, the drive circuit on one side; it may be in contact with, and cools, the drive circuits on both sides. The meaning of the term "contact" as used herein encompasses not only direct contact but also indirect contact, with a thermal conductive material or a substrate interposed therebetween. The cooling unit U1 causes the liquid having passed through the portion between the drive circuit board DRB4 and the drive circuit board DRB5 to make a turn and then flow through the portion that is on, of the drive circuit board DRB5, the opposite side in relation to the drive circuit board DRB4. Because of this configuration, in the head driving module 10, even when the cooling unit U1 is attached, the length in the Z2 direction, that is, the first direction that is the opposite of the ejecting orifices of the liquid ejecting head unit, does not increase. Moreover, because of this configuration, in the head driving module 10, even when the cooling unit U1 is attached, the width in the Y2 direction, that is, the direction that is orthogonal to the first direction, does not increase. In the head driving module 10, even when the cooling unit U1 is attached, the efficiency of use of space does not decrease. In other words, it is possible to achieve both cooling and compact size.

Moreover, in the cooling unit U1, a common flow passage is used for cooling the plurality of drive circuit boards provided in the head driving module 10. Therefore, in the cooling unit U1, as compared with a case where a plurality of flow passages and a plurality of pumps are provided for cooling a plurality of drive circuit boards, it is possible to make the number of pumps smaller and make the space occupied by the pumps smaller. Furthermore, in the cooling unit U1, since a common flow passage is used for cooling the plurality of drive circuit boards, it is possible to make the number of members smaller and make the efficiency of use of space higher.

Figure 21:
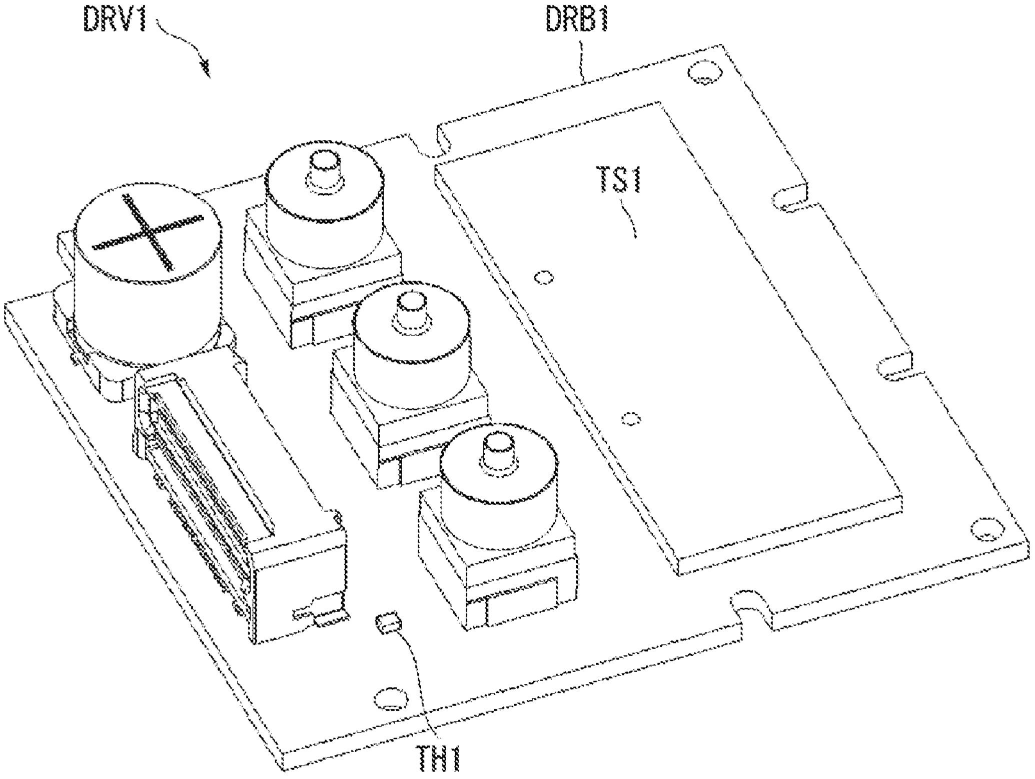
FIG. 21 is a perspective view illustrating a configuration of a drive circuit board on which a thermal conductive sheet according to the second embodiment of the present disclosure is provided.
Figure 22:
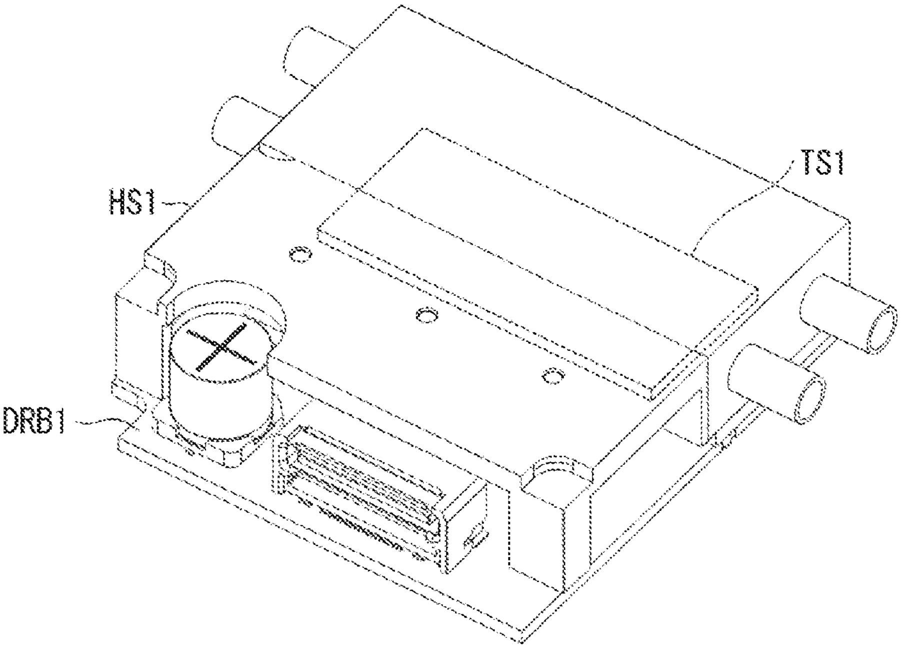
FIG. 22 is a perspective view illustrating a state in which a heatsink portion according to the second embodiment of the present disclosure is in contact with the drive circuit board.
Figure 23:
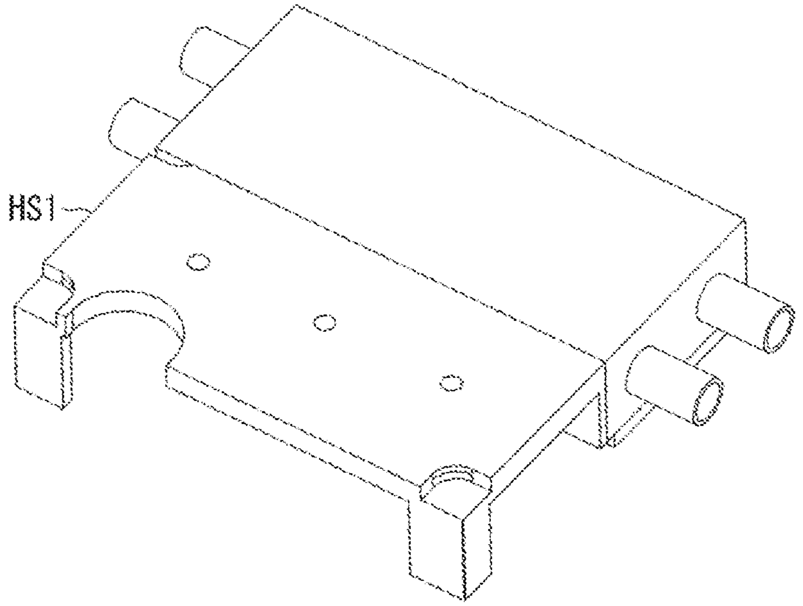
FIG. 23 is a perspective view illustrating a shape of the heatsink portion according to the second embodiment of the present disclosure when viewed from a front-surface side.
Figure 24:
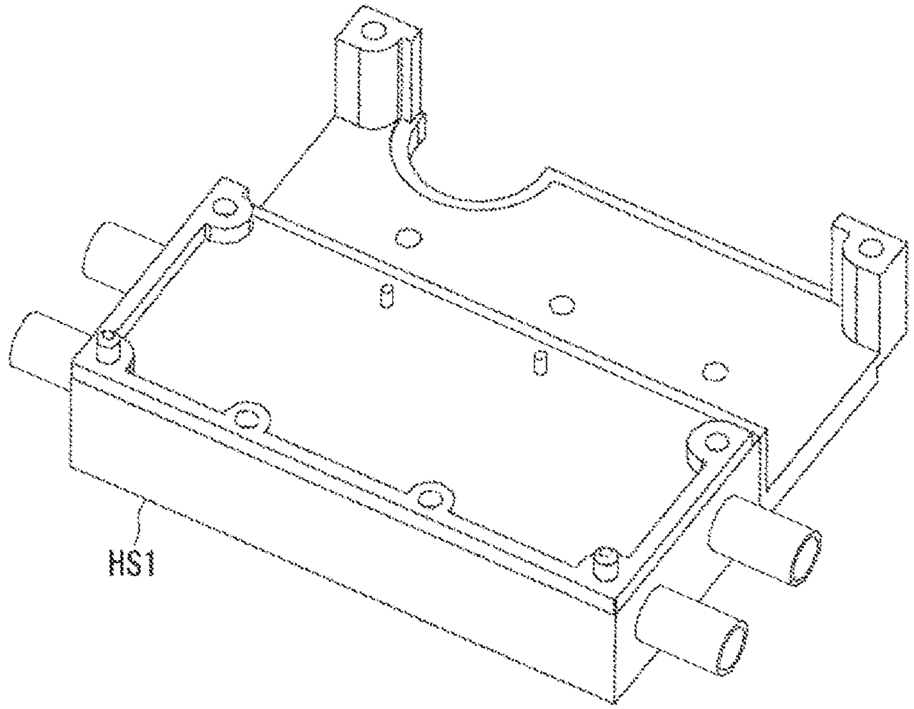
FIG. 24 is a perspective view illustrating a shape of the heatsink portion according to the second embodiment of the present disclosure when viewed from a back-surface side.

In the present embodiment, as illustrated in FIG. 21, a thermal conductive sheet TS1 is provided on the drive circuit board DRB1. The thermal conductive sheet TS1 is disposed in contact with the field effect transistor and the integrated circuit among the drive circuits mounted on the drive circuit board DRB1. The heatsink portion HS1 is in contact with the drive circuit board DRB1 by being in contact with the thermal conductive sheet TS1 disposed on the drive circuit board DRB1. FIG. 22 illustrates a state in which the heatsink portion HS1 is in contact with the drive circuit board DRB1. FIG. 23 is a perspective view illustrating a shape of the heatsink portion HS1 when viewed from a front-surface side. FIG. 24 is a perspective view illustrating a shape of the heatsink portion HS1 when viewed from a back-surface side.

One of the two surfaces of the thermal conductive sheet TS1 is in contact with the drive circuits mounted on the drive circuit board DRB1. The other surface is in contact with the heatsink portion HS1. That is, the heatsink portion HS1 is in contact with the thermal conductive sheet TS1 on the side that is the opposite of the side where the drive circuits are mounted on the drive circuit board DRB1. Similarly, for example, a thermal conductive sheet TS4 is provided on the drive circuit board DRB4. One of the two surfaces of the thermal conductive sheet TS4 is in contact with the drive circuits mounted on the drive circuit board DRB4. The other surface is in contact with the heatsink portion HS4. That is, the heatsink portion HS4 is in contact with the thermal conductive sheet TS4 on the side that is the opposite of the side where the drive circuits are mounted on the drive circuit board DRB4. Similarly, for example, a thermal conductive sheet TS5 is provided on the drive circuit board DRB5. The thermal conductive sheet TS5 is disposed in contact with the drive circuits mounted on the drive circuit board DR5. The heatsink portion HS5 is in contact with the opposite-side surface, which is the opposite of the surface that is on the drive circuit board DR5, of the thermal conductive sheet TS5. The thermal conductive sheet may be referred to as a thermal conductive material. A temperature sensor TH1 is provided near the drive circuit on the drive circuit board DRB1. The temperature sensor TH1 detects the temperature of the drive circuit. The temperature sensor TH1 is, for example, a thermistor.

Figure 25:
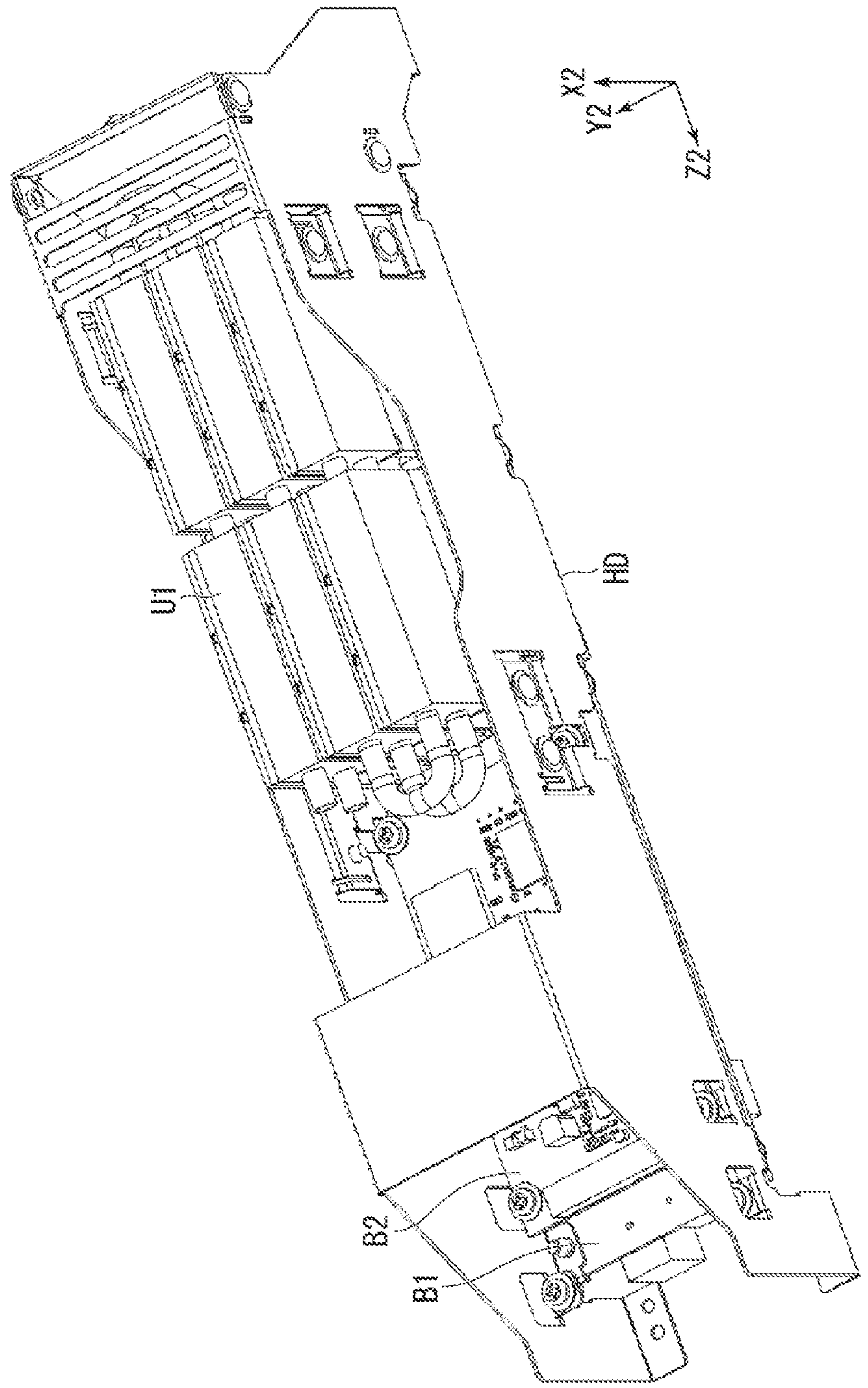
FIG. 25 is a perspective view illustrating a configuration of a head driving module in a state in which the cooling unit according to the second embodiment of the present disclosure and a frame member are attached thereto.
Figure 26:
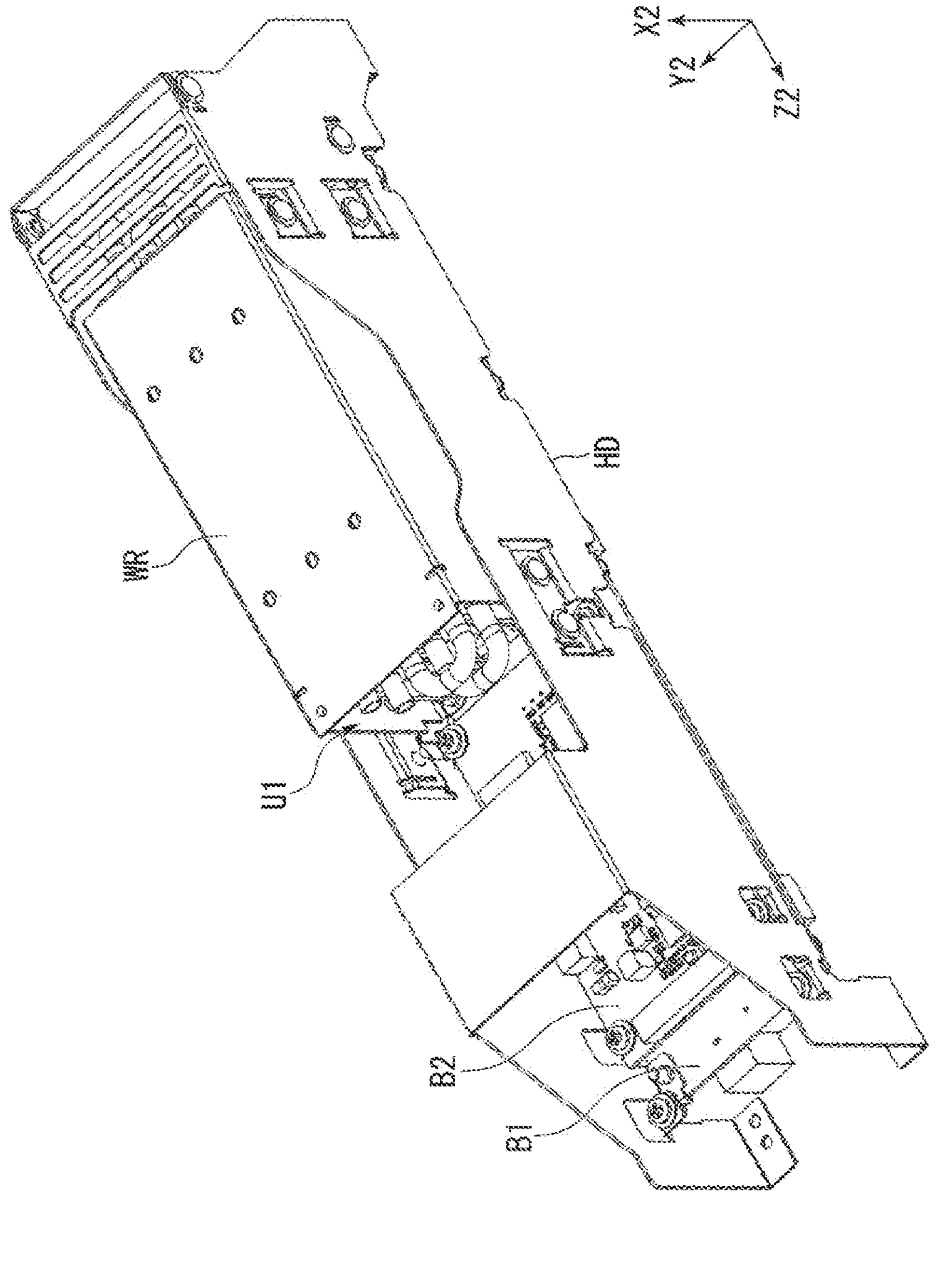
FIG. 26 is a perspective view illustrating a configuration of the head driving module in a state in which the cooling unit according to the second embodiment of the present disclosure, the frame member, and an air guide are attached thereto.

FIG. 25 is a perspective view illustrating a configuration of the head driving module 10 in a state in which the cooling unit U1 according to the present embodiment and the frame member HD are attached thereto. FIG. 26 is a perspective view illustrating a configuration of the head driving module 10 in a state in which the cooling unit U1 according to the present embodiment, the frame member HD, and the air guide WR are attached thereto. As has been described above, the cooling unit U1 is attached to the inside of the head driving module 10 by disposing the heatsink portion between a drive circuit board and another drive circuit board. Therefore, even when the cooling unit U1 is attached, there is no change in the outside dimensions of the head driving module 10. Accordingly, it is possible to attach the frame member HD and the air guide WR to the head driving module 10 even in a state in which the cooling unit U1 is attached.

Figure 27:
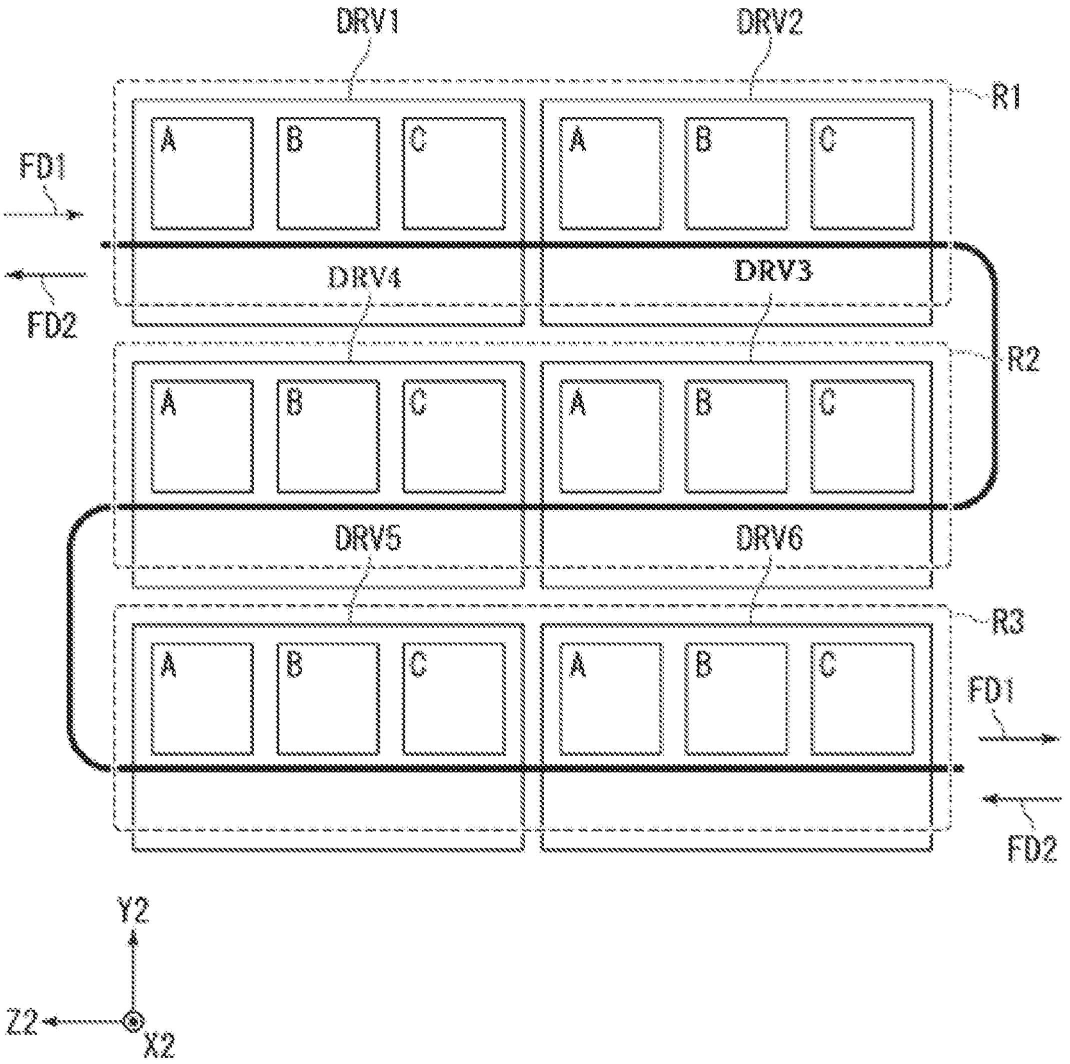
FIG. 27 is a diagram that illustrates control on circulation of liquid according to the second embodiment of the present disclosure.

Next, with reference to FIG. 27, control on the circulation of the liquid by the controller C1 will now be described. FIG. 27 is a diagram that illustrates control on the circulation of the liquid according to the present embodiment. In FIG. 27, a top view of the six drive signal output circuits DRV is schematically illustrated. In this figure, "A", "C", and "B" denote each drive circuit configured to generate the drive signal COMA, each drive circuit configured to generate the drive signal COMC, and each drive circuit configured to generate the drive signal COMB respectively, among the drive circuits mounted on the six drive circuit boards DRB.

When the drive signal COMA or the drive signal COMB is used, the load is heavier and the amount of heat generation is larger than when the drive signal COMC is used. For this reason, the controller C1 commands that the liquid should be directed to flow in descending order of the use percentage of the drive signal COMA or the drive signal COMB among the six drive signal output circuits DRV.

Suppose that, for example, the use percentage of the drive signal COMA or the drive signal COMB at the drive signal output circuit DRV1 and the drive signal output circuit DRV2 that are included in a region R1 is high, and the use percentage of the drive signal COMA or the drive signal COMB at the drive signal output circuit DRV5 and the drive signal output circuit DRV6 that are included in a region R3 is low. That is, when the amount of heat generated at the region R1 is larger than the amount of heat generated at the region R3, the controller C1 commands that the liquid should be directed to flow in the order of the region R1, a region R2, and the region R3 in each of the flow passage F1 and the flow passage F2. That is, in this case, the controller C1 performs the control such that the circulation direction of the liquid through the flow passage F1 and the circulation direction of the liquid through the flow passage F2 are the same as each other. This direction is indicated by a circulation-direction arrow FD1 in FIG. 27. The direction indicated by the circulation-direction arrow FD1 is the first direction that is the opposite of the ejecting orifices of the liquid ejecting head unit, that is, the −Z2 direction. Therefore, the cooling unit U1 causes the liquid to flow between the drive circuit board DRB1 and the drive circuit board DRB4 in the first direction.

Suppose that the use percentage of the drive signal COMA or the drive signal COMB at the drive signal output circuit DRV1 and the drive signal output circuit DRV2 that are included in the region R1 is low, and the use percentage of the drive signal COMA or the drive signal COMB at the drive signal output circuit DRV5 and the drive signal output circuit DRV6 that are included in the region R3 is high. That is, when the amount of heat generated at the region R3 is larger than the amount of heat generated at the region R1, the controller C1 commands that the liquid should be directed to flow in the order of the region R3, the region R2, and the region R1 in each of the flow passage F1 and the flow passage F2. That is, in this case, the controller C1 performs the control such that the circulation direction of the liquid through the flow passage F1 and the circulation direction of the liquid through the flow passage F2 are the same as each other. This direction is indicated by a circulation-direction arrow FD2 in FIG. 27. The direction indicated by the circulation-direction arrow FD2 is the direction that is the opposite of the first direction that is the opposite of the ejecting orifices of the liquid ejecting head unit, that is, the Z2 direction. Therefore, the cooling unit U1 causes the liquid to flow between the drive circuit board DRB1 and the drive circuit board DRB4 in the direction that is the opposite of the first direction.

Suppose that the use percentage of the drive signal COMA or the drive signal COMB at the drive signal output circuit DRV1 and the drive signal output circuit DRV2 that are included in the region R1 is approximately the same as the use percentage of the drive signal COMA or the drive signal COMB at the drive signal output circuit DRV5 and the drive signal output circuit DRV6 that are included in the region R3. That is, when the amount of heat generated at the region R1 is approximately the same as the amount of heat generated at the region R3, the controller C1 commands that the liquid should be directed to flow in the order of the region R1, the region R2, and the region R3 in the flow passage F1 and in the order of the region R3, the region R2, and the region R1 in the flow passage F2. That is, in this case, the controller C1 performs the control such that the circulation direction of the liquid through the flow passage F1 and the circulation direction of the liquid through the flow passage F2 are different from each other.

In the above example, a case where, as the target of comparison of the amount of heat generation, the comparison is made for a region and a region each of which includes two drive signal output circuits DRV has been described. However, the scope of the present disclosure is not limited to this example. The target of comparison of the amount of heat generation may be portions on drive circuits mounted on the drive circuit board DRB.

When an amount of heat generated at a first portion on a drive circuit is larger than an amount of heat generated at a second portion on a drive circuit, the controller C1 performs first control of circulating the liquid through a thermal conductive member that is in contact with the first portion and a thermal conductive member that is in contact with the second portion in this order in the flow passage F1. Each of the heatsink portions HS1 to HS6 is an example of a thermal conductive member. When an amount of heat generated at a second portion on a drive circuit is larger than an amount of heat generated at a first portion on a drive circuit, the controller C1 performs second control of circulating the liquid through a thermal conductive member that is in contact with the second portion and a thermal conductive member that is in contact with the first portion in this order in the flow passage F1.

The control performed by the controller C1 for circulating the liquid through the flow passage F2 is the same as the control performed by the controller C1 for circulating the liquid through the flow passage F1. That is, when an amount of heat generated at a first portion on a drive circuit is larger than an amount of heat generated at a second portion on a drive circuit, the controller C1 performs first control of circulating the liquid through a thermal conductive member that is in contact with the first portion and a thermal conductive member that is in contact with the second portion in this order in the flow passage F2. When an amount of heat generated at a second portion on a drive circuit is larger than an amount of heat generated at a first portion on a drive circuit, the controller C1 performs second control of circulating the liquid through a thermal conductive member that is in contact with the second portion and a thermal conductive member that is in contact with the first portion in this order in the flow passage F2. With this configuration, in the liquid ejecting apparatus according to the present embodiment, it is possible to perform control of circulating the liquid through the two flow passages in descending order of the amounts of heat generation relatively at portions on drive circuits. Therefore, in the liquid ejecting apparatus according to the present embodiment, it is possible to perform cooling more efficiently than when the number of flow passages is one.

When an amount of heat generated at a second portion on a drive circuit is approximately the same as an amount of heat generated at a first portion on a drive circuit, the controller C1 performs third control of circulating the liquid through the flow passage F1 and circulating the liquid through the flow passage F2 such that the direction of the circulation of the liquid through the flow passage F1 and the direction of the circulation of the liquid through the flow passage F2 are different from each other. With this configuration, in the liquid ejecting apparatus according to the present embodiment, when the amount of heat generated at the second portion on the drive circuit is approximately the same as the amount of heat generated at the first portion on the drive circuit, it is possible to cool the first portion and the second portion equally. Therefore, in the liquid ejecting apparatus according to the present embodiment, it is possible to perform cooling more efficiently than when the direction of the circulation of the liquid through the flow passage F1 and the direction of the circulation of the liquid through the flow passage F2 are the same as each other.

Based on the result of detection by the temperature sensor TH1, for example, the controller C1 acquires temperature information, which is information indicating how much heat is generated at the portion on the drive circuit. The temperature sensor TH1 is, for example, provided on each of the plurality of drive circuit boards DRB. Based on the temperature information acquired from the temperature sensor TH1, the controller C1 switches its control. That is, based on the temperature information about the first portion on the drive circuit and the temperature information about the second portion on the drive circuit, the controller C1 performs switching between the first control and the second control. The controller C1 performs the first control when, based on the temperature information, the amount of heat generated at the first portion on the drive circuit is larger than the amount of heat generated at the second portion on the drive circuit. On the other hand, the controller C1 performs the second control when, based on the temperature information, the amount of heat generated at the second portion on the drive circuit is larger than the amount of heat generated at the first portion on the drive circuit. With this configuration, in the liquid ejecting apparatus according to the present embodiment, based on the temperature information, it is possible to perform cooling in descending order of the amounts of heat generated at the first portion and at the second portion; therefore, it is possible to perform cooling more efficiently than when the cooling is performed not based on the temperature information.

The duty of portions on drive circuits differs according to a pattern that is printed. The controller C1 may, based on print content information, perform switching between the first control and the second control. The print content information is information that indicates the load of the pattern that is printed. That is, the controller C1 performs the first control when, based on the print content information, the amount of heat generated at the first portion on the drive circuit is larger than the amount of heat generated at the second portion on the drive circuit. On the other hand, the controller C1 performs the second control when, based on the print content information, the amount of heat generated at the second portion on the drive circuit is larger than the amount of heat generated at the first portion on the drive circuit. With this configuration, in the liquid ejecting apparatus according to the present embodiment, based on the pattern that is printed, it is possible to perform cooling in descending order of the amounts of heat generated at the first portion and at the second portion; therefore, it is possible to perform cooling more efficiently than when the cooling is performed not based on the pattern that is printed.

As has been described above, when the drive signal COMA or the drive signal COMB is used, the load is heavier and the amount of heat generation is larger than when the drive signal COMC is used. The output waveform of a drive circuit differs according to the type of a drive signal. Therefore, based on the output waveform of a drive circuit, it is possible to acquire an amount of heat generated by the drive circuit. The controller C1 may, based on the output waveform of a first drive circuit and the output waveform of a second drive circuit, perform switching between the first control and the second control. With this configuration, in the liquid ejecting apparatus according to the present embodiment, based on the output waveforms, it is possible to perform cooling in descending order of the amounts of heat generation of the first drive circuit and the second drive circuit; therefore, it is possible to perform cooling more efficiently than when the cooling is performed not based on the output waveforms.

Based on information that indicates the duty of an electric power amount or an electric current amount of a drive circuit, the controller C1 may perform the control. As has been described above, the controller C1 gathers information about the operation status of a drive circuit, and, based on the operation status of the drive circuit, the controller C1 estimates the temperature of the drive circuit. The controller C1 may change the number of flow passages through which the liquid is circulated in addition to changing the direction in which the liquid is circulated through the flow passages. The controller C1 may control either one of, or both of, the direction in which the liquid is circulated through the flow passages and the number of flow passages through which the liquid is circulated.

Figure 28:
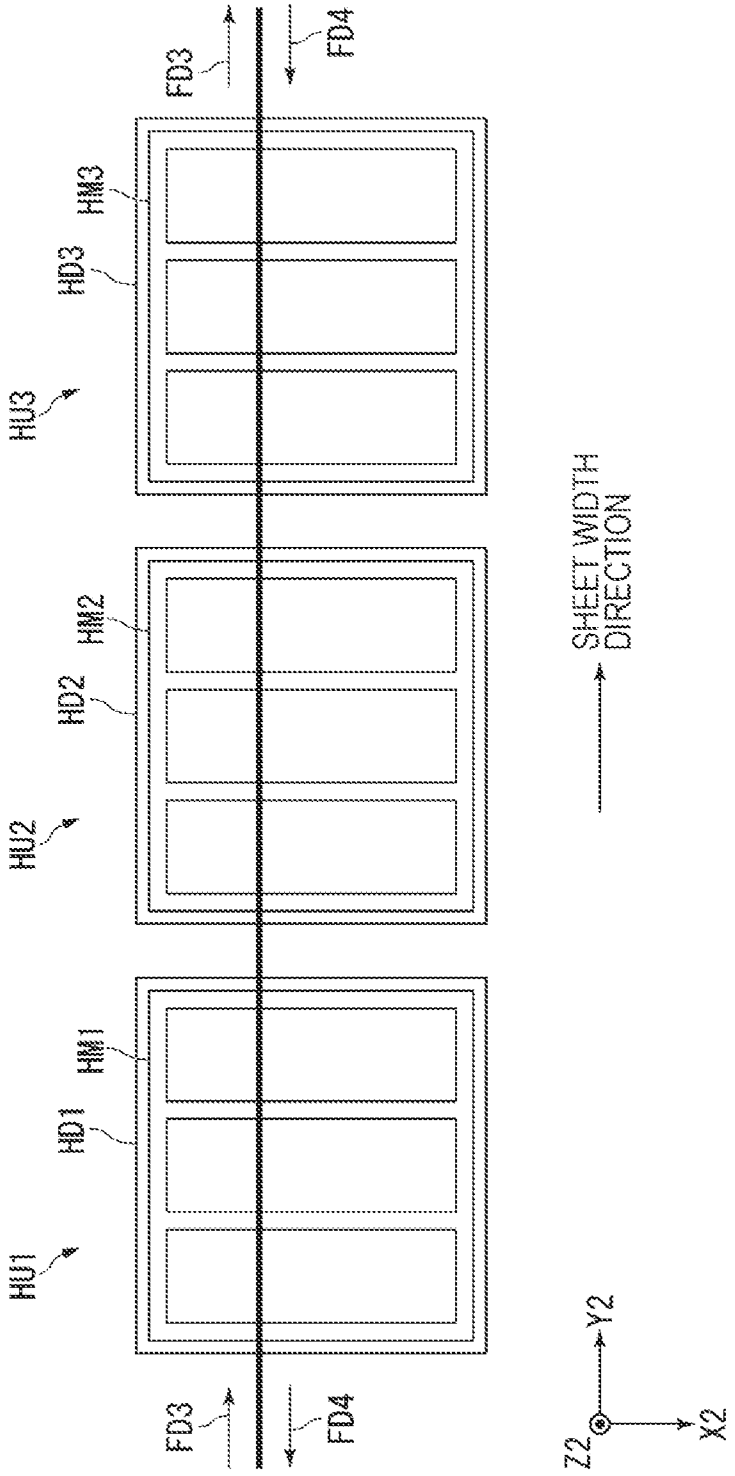
FIG. 28 is a schematic view illustrating cooling of a plurality of head units according to the second embodiment of the present disclosure.

Next, with reference to FIG. 28, a case where a plurality of head units is cooled will now be described. FIG. 28 is a schematic view illustrating cooling of a plurality of head units according to the present embodiment. In FIG. 28, a top view of a plurality of head units is schematically illustrated. As illustrated in FIG. 28, plural ejecting units, specifically, an ejecting unit HU1, an ejecting unit HU2, and an ejecting unit HU3, are arranged in the main scanning direction. The ejecting unit HU1 and the ejecting unit HU2 are arranged next to each other. The ejecting unit HU2 and the ejecting unit HU3 are arranged next to each other.

The ejecting unit HU1 includes a head unit HD1 and a head driving module HM1. The ejecting unit HU2 includes a head unit HD2 and a head driving module HM2. The ejecting unit HU3 includes a head unit HD3 and a head driving module HM3. Therefore, plural head units, specifically, the head unit HD1, the head unit HD2, and the head unit HD3, are arranged in the main scanning direction. The head unit HD1, the head unit HD2, and the head unit HD3 eject ink respectively toward areas arranged next to one another in this order.

Six drive circuits are provided in each of the head driving module HM1, the head driving module HM2, and the head driving module HM3. A non-illustrated heatsink portion is in contact with each of the six drive circuits. The flow passage F1 communicates the non-illustrated heatsink portions that are respectively in contact with the six drive circuits provided in the head driving module HM1, the six drive circuits provided in the head driving module HM2, and the six drive circuits provided in the head driving module HM3. For example, a drive circuit provided in the head driving module HM1 will be referred to as a third drive circuit, and a heatsink portion that is in contact with the third drive circuit will be referred to as a third thermal conductive member. A drive circuit provided in the head driving module HM3 will be referred to as a fourth drive circuit, and a heatsink portion that is in contact with the fourth drive circuit will be referred to as a fourth thermal conductive member. Therefore, through the flow passage F1, the third thermal conductive member and the fourth thermal conductive member are in communication with each other. When the amount of heat generated by the third drive circuit provided in the head driving module HM1 is larger than the amount of heat generated by the fourth drive circuit provided in the head driving module HM3, the controller C1 commands that the liquid should be circulated through the third thermal conductive member that is in contact with the third drive circuit and the fourth thermal conductive member that is in contact with the fourth drive circuit in this order in the flow passage F1. This direction is indicated by a circulation-direction arrow FD3 in FIG. 28. On the other hand, when the amount of heat generated by the fourth drive circuit provided in the head driving module HM3 is larger than the amount of heat generated by the third drive circuit provided in the head driving module HM1, the controller C1 commands that the liquid should be circulated through the fourth thermal conductive member that is in contact with the fourth drive circuit and the third thermal conductive member that is in contact with the third drive circuit in this order in the flow passage F1. This direction is indicated by a circulation-direction arrow FD4 in FIG. 28.

As has been described above, in the head driving module 10, the third thermal conductive member and the fourth thermal conductive member are in communication with each other through the flow passage F1. With this configuration, in the liquid ejecting apparatus according to the present embodiment, it is possible to cool the plurality of drive circuits provided in each of the plurality of head driving modules by providing the common flow passage F1; therefore, it is possible to make the configuration simpler than when a plurality of flow passages is provided. Moreover, the liquid ejecting apparatus according to the present embodiment is more compact than when a plurality of flow passages is provided.

Therefore, the liquid sent from the cooling unit provided in the head driving module HM1, which generates a drive signal for driving the ejecting unit HU1 located next to the ejecting unit HU2, flows through the cooling unit provided in the head driving module HM2. Moreover, the cooling unit U1 discharges the liquid to the cooling unit provided in the head driving module HM3, which generates a drive signal for driving the ejecting unit HU3 located next to the ejecting unit HU2 on the side that is the opposite of the ejecting unit HU1.

The cooling unit provided in the head driving module HM2 will be described as the cooling unit U1 mentioned above. The cooling unit U1 causes the liquid having been sent from the cooling unit provided in the head driving module HM1 to flow through the heatsink portion HS1, the heatsink portion HS4, the heatsink portion HS5, the heatsink portion HS2, the heatsink portion HS3, and the heatsink portion HS6 in this order, and thereafter discharges this liquid to the cooling unit provided in the head driving module HM3.

As has been described above, in the ejecting unit HU1, the ejecting unit HU2, and the ejecting unit HU3, plural head units, specifically, the head unit HD1, the head unit HD2, and the head unit HD3, are arranged in the main scanning direction. With this configuration, in the liquid ejecting apparatus according to the present embodiment, it is possible to increase nozzle density in the main scanning direction, which is advantageous forming a high-definition image in line head printing.

Figure 29:
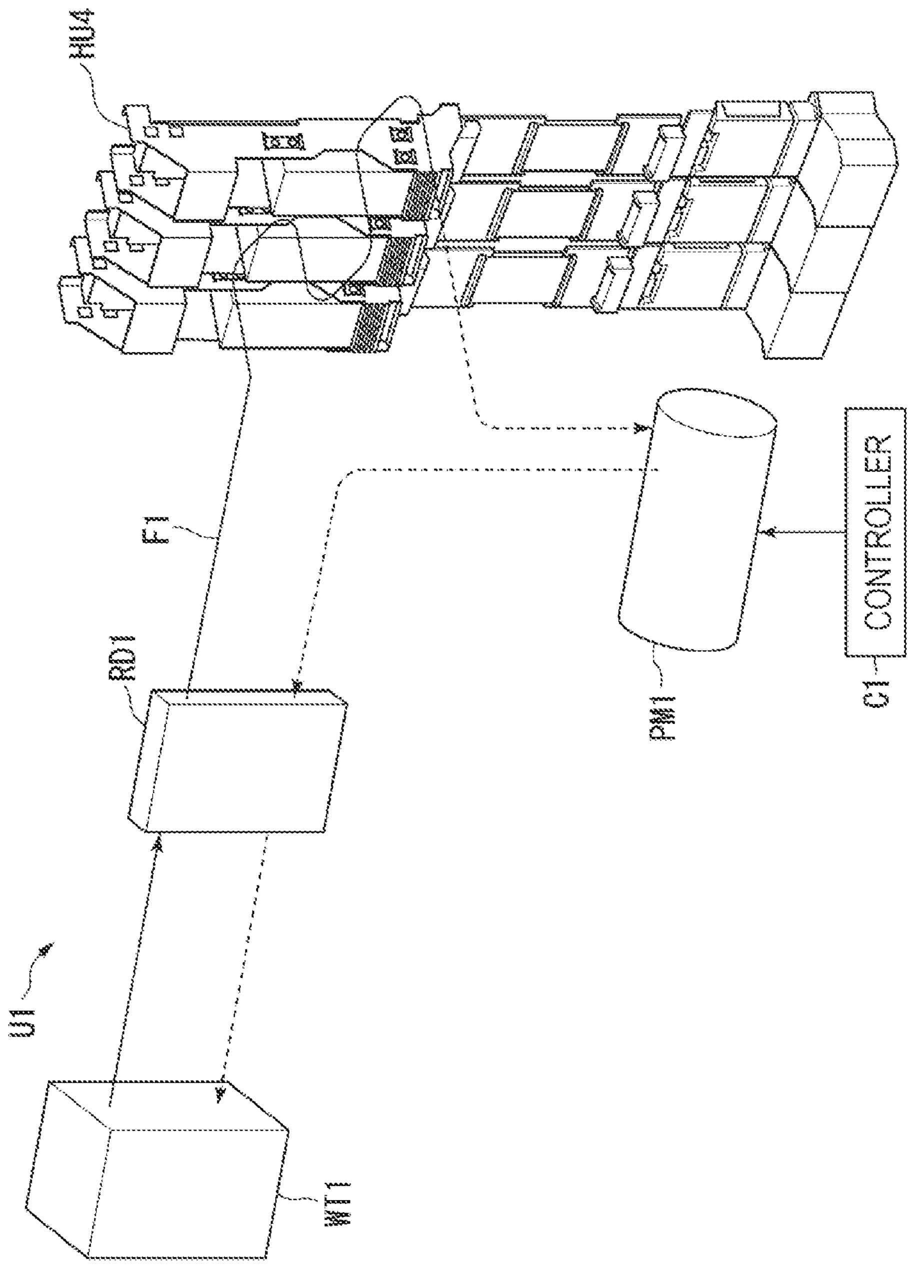
FIG. 29 is a diagram that illustrates an example of an overall configuration of the cooling unit according to the second embodiment of the present disclosure.

Next, with reference to FIG. 29, an overall configuration of the cooling unit U1 will now be described. FIG. 29 is a diagram that illustrates an example of an overall configuration of the cooling unit U1 according to the present embodiment. The cooling unit U1 includes the flow passage F1, a reservoir WT1, a radiator RD1, a pump PM1, and the controller C1. The cooling unit U1 may include the flow passage F2 in addition to the flow passage F1 as in the above-described embodiment. In FIG. 29, an ejecting unit HU4 having a line head structure is illustrated as a head unit that includes a head driving module to be cooled by the cooling unit U1.

The reservoir WT1 is in communication with the flow passage F1. The radiator RD1 cools the liquid contained in the reservoir WT1. The pump PM1 causes the liquid contained in the reservoir WT1 to circulate through the flow passage F1.

By controlling the pump PM1, the controller C1 performs control on the circulation of the liquid through the flow passage F1. The controller C1 switches the direction in which the pump PM1 causes the liquid to flow between a forward direction and a reverse direction, which is the opposite of the forward direction. The forward direction is, for example, the first direction. As has been described above, the controller C1 may switch the direction in which the pump PM1 causes the liquid to flow between the forward direction and the reverse direction in accordance with the temperature of the drive circuit. If this is the case, for example, the controller C1 switches the direction in which the pump PM1 causes the liquid to flow between the forward direction and the reverse direction in accordance with the temperature of the drive circuit detected by the temperature sensor TH1. Alternatively, as has been described above, the controller C1 may switch the direction in which the pump PM1 causes the liquid to flow between the forward direction and the reverse direction in accordance with the temperature of the drive circuit estimated based the operation status of the drive circuit. The controller C1 includes a CPU, and a random access memory (RAM) as a main memory, and performs control based on a program loaded into the main memory.

The configuration of the head driving module 10 cooled by the cooling unit U1 is not limited to the foregoing examples. For example, the configuration of the head driving module 10 is not limited to a configuration that includes the six drive signal output circuits DRV. Moreover, the drive signal output circuit DRV does not necessarily have to be disposed in an upright position with respect to the base board B1. In the present embodiment, the drive circuit may be disposed on the base board B1. Based on the amounts of heat generated at the portions on the drive circuit, the cooling unit U1 changes the direction in which the liquid flows through the flow passage. As has been described above, a thermal conductive member such as a heatsink is in contact with the portion on the drive circuit. Based on the amounts of heat generated at the portions on the drive circuit, the cooling unit U1 determines which one of the thermal conductive members should be the first in the order of liquid circulation.

As has been described above, a liquid ejecting apparatus according to the present embodiment includes a head, a drive circuit, and a cooling unit U1. The head includes an ejecting portion that, upon receiving a drive signal, ejects liquid from a nozzle provided in a nozzle surface. The drive circuit is coupled to the head and generates a drive signal. The cooling unit U1 cools the drive circuit. The cooling unit U1 includes a first thermal conductive member that is in contact with a first portion on the drive circuit, a second thermal conductive member that is in contact with a second portion on the drive circuit, a first flow passage through which the first thermal conductive member and the second thermal conductive member are in communication with each other, and a controller C1 that performs control on circulation of liquid through the first flow passage. The controller C1 performs first control of circulating liquid through the first thermal conductive member and the second thermal conductive member in this order in the first flow passage when an amount of heat generated at the first portion is larger than an amount of heat generated at the second portion, and performs second control of circulating liquid through the second thermal conductive member and the first thermal conductive member in this order in the first flow passage when an amount of heat generated at the second portion is larger than an amount of heat generated at the first portion.

With this configuration, in the liquid ejecting apparatus according to the present embodiment, it is possible to provide a liquid-based cooling mechanism and change the circulation direction of liquid depending on the amount of heat generated by a heat source; therefore, it is possible to perform efficient cooling. "Efficient cooling" means, for example, sequential cooling of portions in descending order of amounts of heat generation, in accordance with heat-generating status of a drive apparatus such as duty. When cooling is performed just above a head by providing a fan or the like, a position where an ink droplet ejected from a nozzle lands might be influenced. By contrast, in the liquid ejecting apparatus according to the present embodiment, cooling does not influence a position where an ink droplet ejected from a nozzle lands. In the liquid ejecting apparatus according to the present embodiment, cooling does not cause an influence of ink mist drifting just above the head.

In the present embodiment, the ejecting unit 5 is an example of a liquid ejecting apparatus. The liquid ejecting module 20 is an example of a head. A drive circuit mounted on each of the six drive circuit boards DRB is an example of a first portion or a second portion on a drive circuit. Each of the heatsink portions HS1 to HS6 is an example of a first thermal conductive member or a second thermal conductive member. One or more heatsink portions, that is, one or more thermal conductive members, may be referred to as a water cooling mechanism. The flow passage F1 is an example of a first flow passage.

Each of the first portion and the second portion is not limited to a drive circuit mounted on each of the six drive circuit boards DRB. Each of the first portion and the second portion may be any portion of the six drive circuit boards DRB. However, in the liquid ejecting apparatus according to the present embodiment, the first portion and the second portion are a first drive circuit and a second drive circuit respectively. Each of the first drive circuit and the second drive circuit is a drive circuit mounted on each of the six drive circuit boards DRB. For example, the first drive circuit is a drive circuit mounted on the drive circuit board DRB1, and the second drive circuit is a drive circuit mounted on the drive circuit board DRB2. It is considered that a difference in amount of heat generation between a first drive circuit and a second drive circuit as measured on a drive-circuit-by-drive-circuit basis tends to be greater than a difference in amount of heat generation between a first portion and a second portion as measured on a drive circuit on an arbitrary-portion-by-arbitrary-portion basis. For example, it is considered that a difference in amount of heat generation between a first drive circuit and a second drive circuit tends to be greater than a difference in amount of heat generation between a first portion and a second portion on an identical drive circuit. In the liquid ejecting apparatus according to the present embodiment, it is possible to change the order of cooling on a drive-circuit-by-drive-circuit basis; therefore, it is possible to perform cooling more efficiently than when cooling is performed on a drive circuit on an arbitrary-portion-by-arbitrary-portion basis.

Though some exemplary embodiments of the present disclosure have been described in detail above while referring to the accompanying drawings, their specific configuration is not limited to what has been described above; various modifications in design, etc. can be made within a range of not departing from the spirit of the present disclosure.

Additional Note 1

[1]

A drive circuit unit provided in a head unit together with a head and configured to generate a drive signal for driving the head, the drive circuit unit comprising:

a base board that includes a drive-circuit-unit-side connector coupled to a head-side connector; and a plurality of drive circuit boards on each of which a drive circuit configured to generate a drive signal is mounted, wherein the base board is disposed such that the base board extends in a direction intersecting with a nozzle surface of the head, and the plurality of drive circuit boards is disposed on the base board.

[2]

The drive circuit unit according to [1], wherein the plurality of drive circuit boards is coupled to the base board in a direction intersecting with the direction in which the base board extends.

[3]
The drive circuit unit according to [2], wherein
the plurality of drive circuit boards is coupled to the base board such that the plurality of drive circuit boards extends in a direction substantially perpendicular to the nozzle surface.

[4]
The drive circuit unit according to any of [1] to [3], wherein
the drive circuit is a class-D amplifier that includes an integrated circuit, a transistor, and a coil.

[5]
The drive circuit unit according to any of [1] to [4], wherein
the drive circuit board includes a coupling connector coupled to the base board, and
a distance between the coupling connector and the coil is shorter than a distance between the coupling connector and the integrated circuit.

[6]
The drive circuit unit according to [5], wherein
the coupling connector includes
a first terminal through which a drive signal propagates to an upper electrode included in a piezoelectric element provided in the head,
a second terminal through which a drive signal having an amplitude different from that of the drive signal propagating through the first terminal propagates to the upper electrode, and
a third terminal through which a constant voltage signal propagates to a lower electrode included in the piezoelectric element, and
the third terminal is disposed between the first terminal and the second terminal.

[7]
The drive circuit unit according to [5] or [6], wherein
the drive circuit board further includes a slight vibration generating circuit that generates a slight vibration signal for causing liquid vibration to an extent that no liquid is ejected from a nozzle provided in the head,
the coupling connector includes
a fourth terminal through which a drive signal propagates to an upper electrode included in a piezoelectric element provided in the head,
a fifth terminal through which a drive signal having an amplitude different from that of the drive signal propagating through the fourth terminal propagates to the upper electrode, and
a sixth terminal through which the slight vibration signal propagates, and
the sixth terminal is disposed between the fourth terminal and the fifth terminal.

[8]
The drive circuit unit according to any of [1] to [6], wherein
the drive circuit board further includes a slight vibration generating circuit that generates a slight vibration signal for causing liquid vibration to an extent that no liquid is ejected from a nozzle provided in the head.

[9]
A head unit, comprising:
a drive circuit unit; and
a head,
the head including
an ejecting portion that, upon receiving a drive signal supplied from the drive circuit unit, ejects liquid from a nozzle provided in a nozzle surface, and
a collective board that includes a head-side connector,
the drive circuit unit including
a base board that includes a drive-circuit-unit-side connector coupled to the head-side connector; and
a plurality of drive circuit boards on each of which a drive circuit configured to generate the drive signal is mounted, wherein
the base board is disposed such that the base board extends in a direction intersecting with the nozzle surface, and
the plurality of drive circuit boards is disposed on the base board.

[10]
A liquid ejecting apparatus, comprising:
a plurality of sets each including a plurality of head units and a transportation unit, the head unit including a drive circuit unit and a head,
the head including
an ejecting portion that, upon receiving a drive signal supplied from the drive circuit unit, ejects liquid from a nozzle provided in a nozzle surface, and
a collective board that includes a head-side connector,
the drive circuit unit including
a base board that includes a drive-circuit-unit-side connector coupled to the head-side connector; and
a plurality of drive circuit boards on each of which a drive circuit configured to generate the drive signal is mounted, wherein
the base board is disposed such that the base board extends in a direction intersecting with the nozzle surface,
the plurality of drive circuit boards is disposed on the base board, and
the plurality of head units is arranged in a first direction parallel to the nozzle surface.

Additional Note 2

[1]
A liquid ejecting apparatus, comprising:
a head that includes an ejecting portion that, upon receiving a drive signal, ejects liquid from a nozzle provided in a nozzle surface;
a drive circuit that is coupled to the head and generates a drive signal; and
a cooling unit that cools the drive circuit, the cooling unit including
a first thermal conductive member that is in contact with a first portion on the drive circuit,
a second thermal conductive member that is in contact with a second portion on the drive circuit,
a first flow passage through which the first thermal conductive member and the second thermal conductive member are in communication with each other, and
a controller that performs control on circulation of liquid through the first flow passage, wherein
the controller performs first control of circulating liquid through the first thermal conductive member and the second thermal conductive member in this order in the first flow passage when an amount of heat generated at the first portion is larger than an amount of heat generated at the second portion, and performs second control of circulating liquid through the second thermal conductive member and the first thermal conductive member in this order in the first flow passage when an amount of heat generated at the second portion is larger than an amount of heat generated at the first portion.

[2]

The liquid ejecting apparatus according to [1], wherein the cooling unit further includes a second flow passage through which the first thermal conductive member and the second thermal conductive member are in communication with each other, and the controller performs first control of circulating liquid through the first thermal conductive member and the second thermal conductive member in this order in the second flow passage when an amount of heat generated at the first portion is larger than an amount of heat generated at the second portion, and performs second control of circulating liquid through the second thermal conductive member and the first thermal conductive member in this order in the second flow passage when an amount of heat generated at the second portion is larger than an amount of heat generated at the first portion.

[3]

The liquid ejecting apparatus according to [2], wherein when an amount of heat generated at the second portion is approximately the same as an amount of heat generated at the first portion, the controller performs third control of circulating liquid through the first flow passage and circulating liquid through the second flow passage such that a direction of circulation of the liquid through the first flow passage and a direction of circulation of the liquid through the second flow passage are different from each other.

[4]

The liquid ejecting apparatus according to [3], wherein based on print content information, the controller performs switching between the first control and the second control.

[5]

The liquid ejecting apparatus according to any of [1] to [4], wherein based on temperature information about the first portion and temperature information about the second portion, the controller performs switching between the first control and the second control.

[6]

The liquid ejecting apparatus according to any of [1] to [5], wherein the drive circuit includes a first drive circuit and a second drive circuit, the first portion is the first drive circuit, and the second portion is the second drive circuit.

[7]

The liquid ejecting apparatus according to [6], wherein based on an output waveform of the first drive circuit and an output waveform of the second drive circuit, the controller performs switching between the first control and the second control.

[8]

The liquid ejecting apparatus according to any of [1] to [7], wherein a head unit includes the head and the drive circuit, and the plurality of head units, each of which is the head unit, is arranged in a sheet width direction.

[9]

The liquid ejecting apparatus according to [8], wherein a third drive circuit and a fourth drive circuit are included in the drive circuit provided in each of the plurality of head units, the cooling unit includes a third thermal conductive member that is in contact with a third portion on the third drive circuit, and a fourth thermal conductive member that is in contact with a fourth portion on the fourth drive circuit, and the third thermal conductive member and the fourth thermal conductive member are in communication with each other through the first flow passage.

[10]

A cooling unit configured to cool a drive circuit provided in a liquid ejecting apparatus, the liquid ejecting apparatus including a head and the drive circuit, the head including an ejecting portion that, upon receiving a drive signal, ejects liquid from a nozzle provided in a nozzle surface, the drive circuit being coupled to the head and generating a drive signal, the cooling unit comprising:

a first thermal conductive member that is in contact with a first portion on the drive circuit;

a second thermal conductive member that is in contact with a second portion on the drive circuit;

a first flow passage through which the first thermal conductive member and the second thermal conductive member are in communication with each other; and a controller that performs control on circulation of liquid through the first flow passage, wherein the controller performs first control of circulating liquid through the first thermal conductive member and the second thermal conductive member in this order in the first flow passage when an amount of heat generated at the first portion is larger than an amount of heat generated at the second portion, and performs second control of circulating liquid through the second thermal conductive member and the first thermal conductive member in this order in the first flow passage when an amount of heat generated at the second portion is larger than an amount of heat generated at the first portion.

Additional Note 3

[1]

A drive unit located on an opposite side in relation to an ejecting orifice of a liquid ejecting head unit, the drive unit comprising:

a first board including a first connector coupled to a head connector of the liquid ejecting head unit; and a second board on which a drive circuit configured to generate a drive signal is mounted, wherein the second board is disposed in an upright position with respect to the first board by being B-to-B coupled to the first board, and the drive signal is supplied from the second board to the first connector via the first board.

[2]

The drive unit according to [1], wherein the second board is coupled to another board by being B-to-B coupled to the first board only.

[3]

The drive unit according to [1] or [2], wherein the second board has a greater length in a first direction that is an opposite of the ejecting orifice of the liquid ejecting head unit than in both directions orthogonal to the first direction.

[4]

The drive unit according to any of [1] to [3], further comprising:

a third board disposed in an upright position with respect to the first board by being B-to-B coupled to the first board, wherein a drive signal generated by a drive circuit mounted on the third board is supplied to the liquid ejecting head unit via the first board.

[5]

The drive unit according to [4], wherein the second board and the third board are spaced from each other in a direction orthogonal to a first direction that is an opposite of the ejecting orifice of the liquid ejecting head unit.

[6]

The drive unit according to [5], further comprising:

a water cooling mechanism located between the second board and the third board and configured to cause liquid to flow between the second board and the third board, wherein the second board is in contact with a second thermal conductive material, and the water cooling mechanism is in contact with, of the second thermal conductive material, an opposite side in relation to the second board.

[7]

The drive unit according to [6], wherein the water cooling mechanism causes the liquid to flow between the second board and the third board in the first direction or in a direction that is an opposite of the first direction.

[8]

The drive unit according to [6] or [7], wherein the water cooling mechanism is located on, of the third board, an opposite side in relation to the second board, and causes the liquid to flow on, of the third board, the opposite side in relation to the second board, the third board is in contact with a third thermal conductive material, and the water cooling mechanism is in contact with, of the third thermal conductive material, an opposite side in relation to the third board.

[9]

The drive unit according to [7] or [8], wherein the water cooling mechanism causes liquid after flowing between the second board and the third board to flow on, of the third board, the opposite side in relation to the second board.

[10]

A liquid ejecting head unit, comprising:

a drive unit; and a head, the head including an ejecting orifice that, upon receiving a drive signal supplied from the drive unit, ejects liquid from a nozzle provided in a nozzle surface, and a collective board that includes a head connector, the drive unit being located on an opposite side in relation to the ejecting orifice and including a first board including a first connector coupled to the head connector, and a second board on which a drive circuit configured to generate a drive signal is mounted, wherein the second board is disposed in an upright position with respect to the first board by being B-to-B coupled to the first board, and the drive signal is supplied from the second board to the first connector via the first board.

[11]

A liquid ejecting apparatus, comprising:

a plurality of sets each including a plurality of liquid ejecting head units and a transportation unit, the liquid ejecting head unit including a drive unit and a head, the head including an ejecting orifice that, upon receiving a drive signal supplied from the drive unit, ejects liquid from a nozzle provided in a nozzle surface, and a collective board that includes a head connector, the drive unit being located on an opposite side in relation to the ejecting orifice and including a first board including a first connector coupled to the head connector, and a second board on which a drive circuit configured to generate a drive signal is mounted, wherein the second board is disposed in an upright position with respect to the first board by being B-to-B coupled to the first board, and the drive signal is supplied from the second board to the first connector via the first board.

Additional Note 4

[1]

A drive unit configured to generate a drive signal for driving a liquid ejecting head unit, the drive unit comprising:

a drive board on which a drive circuit configured to generate the drive signal is mounted;

a thermal conductive material that is in contact with the drive circuit on an opposite side in relation to the drive board;

a water cooling mechanism that is in contact with the thermal conductive material on an opposite side in relation to the drive circuit;

a pump that causes liquid in the water cooling mechanism to flow; and a control circuit that controls operation of the pump, wherein the control circuit switches a direction in which the pump causes the liquid to flow between a forward direction and a reverse direction that is an opposite of the forward direction.

[2]

The drive unit according to [1], wherein the control circuit switches the direction in which the pump causes the liquid to flow between the forward direction and the reverse direction in accordance with a temperature of the drive circuit.

[3]

The drive unit according to [2], wherein the drive board includes a temperature sensor that detects the temperature of the drive circuit near the drive circuit, and the control circuit switches the direction in which the pump causes the liquid to flow between the forward direction and the reverse direction in accordance with the temperature of the drive circuit detected by the temperature sensor.

[4]

The drive unit according to [2], wherein the control circuit gathers operation status of the drive circuit, based on the operation status of the drive circuit, the control circuit estimates the temperature of the drive circuit, and the control circuit switches the direction in which the pump causes the liquid to flow between the forward direction and the reverse direction in accordance with the estimated temperature of the drive circuit.

[5]

A liquid ejecting head unit, comprising:

a drive unit configured to generate a drive signal for driving the liquid ejecting head unit; and a head, the head including an ejecting orifice that, upon receiving a drive signal supplied from the drive unit, ejects liquid from a nozzle provided in a nozzle surface, and a collective board that includes a head connector, the drive unit including a drive board on which a drive circuit configured to generate the drive signal is mounted;

a thermal conductive material that is in contact with the drive circuit on an opposite side in relation to the drive board;

a water cooling mechanism that is in contact with the thermal conductive material on an opposite side in relation to the drive circuit;

a pump that causes liquid in the water cooling mechanism to flow; and a control circuit that controls operation of the pump, wherein the control circuit switches a direction in which the pump causes the liquid to flow between a forward direction and a reverse direction that is an opposite of the forward direction.

[6]

A liquid ejecting apparatus, comprising:

a plurality of sets each including a plurality of liquid ejecting head units and a transportation unit, the liquid ejecting head unit including a drive unit and a head, the drive unit being configured to generate a drive signal for driving the liquid ejecting head unit, the head including an ejecting orifice that, upon receiving a drive signal supplied from the drive unit, ejects liquid from a nozzle provided in a nozzle surface, and a collective board that includes a head connector, the drive unit including a drive board on which a drive circuit configured to generate the drive signal is mounted;

a thermal conductive material that is in contact with the drive circuit on an opposite side in relation to the drive board;

a water cooling mechanism that is in contact with the thermal conductive material on an opposite side in relation to the drive circuit;

a pump that causes liquid in the water cooling mechanism to flow; and a control circuit that controls operation of the pump, wherein the control circuit switches a direction in which the pump causes the liquid to flow between a forward direction and a reverse direction that is an opposite of the forward direction.

Additional Note 5

[1]

A first drive unit configured to generate a first drive signal for driving a first liquid ejecting head unit, the first drive unit comprising:

a first drive circuit that generates the first drive signal;

a first thermal conductive material that is in contact with the first drive circuit; and a first water cooling mechanism that is in contact with the first thermal conductive material on an opposite side in relation to the first drive circuit and causes liquid to flow, wherein the first water cooling mechanism causes liquid sent from a second water cooling mechanism to flow, and discharges liquid to a third water cooling mechanism, the second water cooling mechanism is provided in a second drive unit configured to generate a second drive signal for driving a second liquid ejecting head unit located next to the first liquid ejecting head unit, and the third water cooling mechanism is provided in a third drive unit configured to generate a third drive signal for driving a third liquid ejecting head unit located next to the first liquid ejecting head unit on an opposite side in relation to the second liquid ejecting head unit.

[2]

The first drive unit according to [1], further comprising:

a second drive circuit that is different from the first drive circuit and generates a fourth drive signal for driving the first liquid ejecting head unit, wherein the first water cooling mechanism includes a first box that is in contact with the first thermal conductive material, and a second box that is in contact with a second thermal conductive material that is in contact with the second drive circuit, and after causing the liquid sent from the second water cooling mechanism to flow through the first box and the second box in this order, the first water cooling mechanism discharges the liquid to the third water cooling mechanism.

[3]

The first drive unit according to [1] or [2], wherein the second liquid ejecting head unit, the first liquid ejecting head unit, and the third liquid ejecting head unit eject liquid respectively toward areas arranged next to one another in this order.

[4]

A first liquid ejecting head unit, comprising:

a first drive unit configured to generate a first drive signal for driving the first liquid ejecting head unit; and a head, the head including an ejecting orifice that, upon receiving a drive signal supplied from the first drive unit, ejects liquid from a nozzle provided in a nozzle surface, and a collective board that includes a head connector, the first drive unit including a first drive circuit that generates the first drive signal;

a first thermal conductive material that is in contact with the first drive circuit; and a first water cooling mechanism that is in contact with the first thermal conductive material on an opposite side in relation to the first drive circuit and causes liquid to flow, wherein the first water cooling mechanism causes liquid sent from a second water cooling mechanism to flow, and discharges liquid to a third water cooling mechanism, the second water cooling mechanism is provided in a second drive unit configured to generate a second drive signal for driving a second liquid ejecting head unit located next to the first liquid ejecting head unit, and the third water cooling mechanism is provided in a third drive unit configured to generate a third drive signal for driving a third liquid ejecting head unit located next to the first liquid ejecting head unit on an opposite side in relation to the second liquid ejecting head unit.

[5]

A liquid ejecting apparatus, comprising:

a plurality of sets each including a plurality of liquid ejecting head units and a transportation unit, the plurality of liquid ejecting head units including a first liquid ejecting head unit, a second liquid ejecting head unit located next to the first liquid ejecting head unit, and a third liquid ejecting head unit located next to the first liquid ejecting head unit on an opposite side in relation to the second liquid ejecting head unit, the first liquid ejecting head unit including a first drive unit and a head, the first drive unit being configured to generate a first drive signal for driving the first liquid ejecting head unit, the head including an ejecting orifice that, upon receiving a drive signal supplied from the first drive unit, ejects liquid from a nozzle provided in a nozzle surface, and a collective board that includes a head connector, the first drive unit including a first drive circuit that generates the first drive signal;

a first thermal conductive material that is in contact with the first drive circuit; and a first water cooling mechanism that is in contact with the first thermal conductive material on an opposite side in relation to the first drive circuit and causes liquid to flow, wherein the first water cooling mechanism causes liquid sent from a second water cooling mechanism to flow, and discharges liquid to a third water cooling mechanism, the second water cooling mechanism is provided in a second drive unit configured to generate a second drive signal for driving the second liquid ejecting head, and the third water cooling mechanism is provided in a third drive unit configured to generate a third drive signal for driving the third liquid ejecting head unit.

What is claimed is:

1. A drive unit configured to generate a drive signal for driving a liquid ejecting head unit, the drive unit comprising:

a drive board on which a drive circuit configured to generate the drive signal is mounted;

a thermal conductive material including a first surface and a second surface that is opposite to the first surface and faces away from the first surface in an opposite direction, the first surface being in contact with the drive circuit such that the drive circuit is disposed between the thermal conductive material and the drive board in the opposite direction;

a water cooling mechanism that is in contact with the second surface of the thermal conductive material, such that the thermal conducive material is disposed between the drive circuit and the water cooling mechanism in the opposite direction;

a pump that causes liquid in the water cooling mechanism to flow; and a control circuit that controls operation of the pump, wherein the control circuit switches a direction in which the pump causes the liquid to flow between a forward direction and a reverse direction that is an opposite of the forward direction.

2. The drive unit according to claim 1, wherein the control circuit switches the direction in which the pump causes the liquid to flow between the forward direction and the reverse direction in accordance with a temperature of the drive circuit.

3. The drive unit according to claim 2, wherein the drive board includes a temperature sensor that detects the temperature of the drive circuit near the drive circuit, and the control circuit switches the direction in which the pump causes the liquid to flow between the forward direction and the reverse direction in accordance with the temperature of the drive circuit detected by the temperature sensor.

4. The drive unit according to claim 2, wherein the control circuit gathers operation status of the drive circuit, based on the operation status of the drive circuit, the control circuit estimates the temperature of the drive circuit, and the control circuit switches the direction in which the pump causes the liquid to flow between the forward direction and the reverse direction in accordance with the estimated temperature of the drive circuit.

5. A liquid ejecting head unit, comprising:

a drive unit configured to generate a drive signal for driving the liquid ejecting head unit; and a head, the head including an ejecting orifice that, upon receiving a drive signal supplied from the drive unit, ejects liquid from a nozzle provided in a nozzle surface, and a collective board that includes a head connector, the drive unit including a drive board on which a drive circuit configured to generate the drive signal is mounted;

a thermal conductive material including a first surface and a second surface that is opposite to the first surface and faces away from the first surface in an opposite direction, the first surface being in contact with the drive circuit such that the drive circuit is disposed between the thermal conductive material and the drive board in the opposite direction;

a water cooling mechanism that is in contact with the second surface of the thermal conductive material, such that the thermal conducive material is disposed between the drive circuit and the water cooling mechanism in the opposite direction;

a pump that causes liquid in the water cooling mechanism to flow; and a control circuit that controls operation of the pump, wherein the control circuit switches a direction in which the pump causes the liquid to flow between a forward direction and a reverse direction that is an opposite of the forward direction.

6. A liquid ejecting apparatus, comprising:

a plurality of sets each including a plurality of liquid ejecting head units and a transportation unit, the liquid ejecting head unit including a drive unit and a head, the drive unit being configured to generate a drive signal for driving the liquid ejecting head unit, the head including an ejecting orifice that, upon receiving a drive signal supplied from the drive unit, ejects liquid from a nozzle provided in a nozzle surface, and a collective board that includes a head connector, the drive unit including a drive board on which a drive circuit configured to generate the drive signal is mounted;

a thermal conductive material including a first surface and a second surface that is opposite to the first surface and faces away from the first surface in an opposite direction, the first surface being in contact with the drive circuit such that the drive circuit is disposed between the thermal conductive material and the drive board in the opposite direction;

a water cooling mechanism that is in contact with the second surface of the thermal conductive material, such that the thermal conducive material is disposed between the drive circuit and the water cooling mechanism in the opposite direction;

a pump that causes liquid in the water cooling mechanism to flow; and a control circuit that controls operation of the pump, wherein the control circuit switches a direction in which the pump causes the liquid to flow between a forward direction and a reverse direction that is an opposite of the forward direction.

* * * * *